(12) United States Patent
Hanson et al.

(10) Patent No.: US 9,035,003 B2
(45) Date of Patent: May 19, 2015

(54) HIGH CAPACITY MAGNETIC NANOPARTICLES AS SUPPORTS FOR REAGENTS AND CATALYSTS

(75) Inventors: Paul Ronald Hanson, Lawrence, KS (US); Oliver Reiser, Regensburg (DE); Alexander Schätz, Obernzell (DE); Alan Rolfe, Cambridge, MA (US)

(73) Assignee: The University of Kansas, Lawrence, KS (US)

( * ) Notice: Subject to any disclaimer, the term of this patent is extended or adjusted under 35 U.S.C. 154(b) by 503 days.

(21) Appl. No.: 13/222,247

(22) Filed: Aug. 31, 2011

(65) Prior Publication Data

US 2012/0226007 A1    Sep. 6, 2012

Related U.S. Application Data

(63) Continuation-in-part of application No. 13/152,531, filed on Jun. 3, 2011.

(60) Provisional application No. 61/378,778, filed on Aug. 31, 2010.

(51) Int. Cl.
  *C08F 30/04*    (2006.01)
  *C08F 232/08*   (2006.01)

(52) U.S. Cl.
  CPC ............ *C08F 232/08* (2013.01); *Y10S 977/734* (2013.01); *Y10S 977/838* (2013.01)

(58) Field of Classification Search
  CPC .................................................. C08F 232/08
  USPC .................................... 526/241; 977/734, 838
  See application file for complete search history.

(56) References Cited

PUBLICATIONS

Belfield et al. (Norbornene-Functionalized Diblock Copolymers via Ring-Opening Metathesis Polymerization for Magnetic Nanoparticle Stabilization, Chem. Mater. 2006, 18, 5929-5936).*
Schatz et al (Immobilization on a Nanomagnetic Co/C Surface Using ROM Polymerization: Generation of a Hybrid Material as Support for a Recyclable Palladium Catalyst, Advanced Functional Materials, 2010, 20, 4323-4328).*
Biswas et al (Block Copolymer-Meidated Formationof Superparamagnetic Nanocomposites, Chemistry of Materials, 2009, 21, 5644-5653).*
Ahmed et al (Magnetic properties and morphology of block copolymer-cobalt oxide nanocomposites, Journal of magnetism and magnetic materials, 288 (2005) 219-223).*

* cited by examiner

*Primary Examiner* — Wenwen Cai
(74) *Attorney, Agent, or Firm* — Maschoff Brennan, PLLC

(57) ABSTRACT

A magnetic particle-polymer hybrid material can include:
a substance having a structure of Formula 1 or derivative or salt thereof:
$Z(Y\text{-Triazole-}CH_2\text{—}X\text{—}CH_2\text{—}(FP)_n)_m$ (Formula 1), wherein Z is a magnetic particle smaller than 1 mm; n and m are independently integers; Y includes a first linker having an alkyl and/or aryl linked to the magnetic particle; X is $CH_2$ or a heteroatom; FP is a functionalized polymer having: a first structure derived from a first norbornene compound linked to the magnetic particle through the $Y\text{-Triazole-}CH_2\text{—}X\text{—}CH_2$ linker; and one or more monomeric units each including a second structure derived from a second norbornene compound, where one of the monomeric units is linked to the first structure through a saturated or unsaturated alkyl, each monomeric unit includes a functional group capable of binding with another substance.

21 Claims, 8 Drawing Sheets

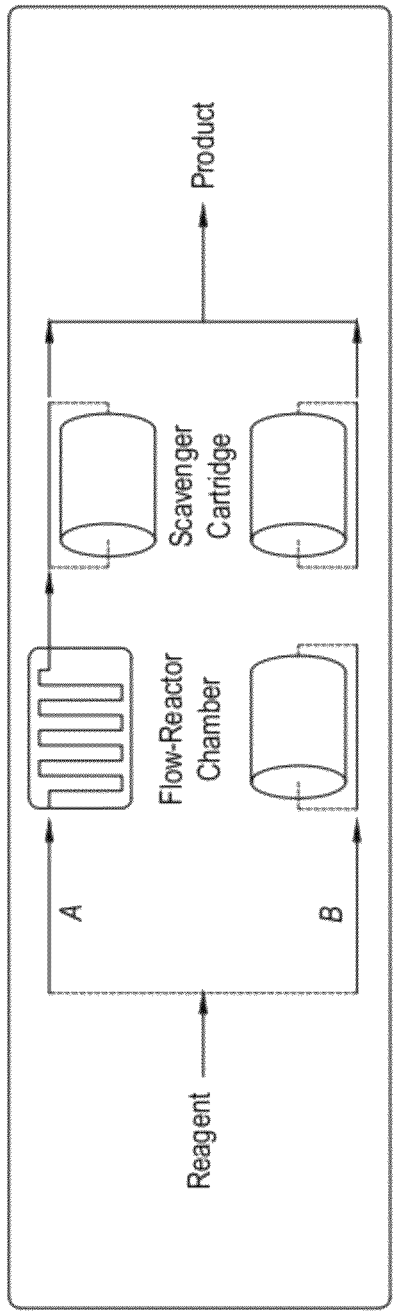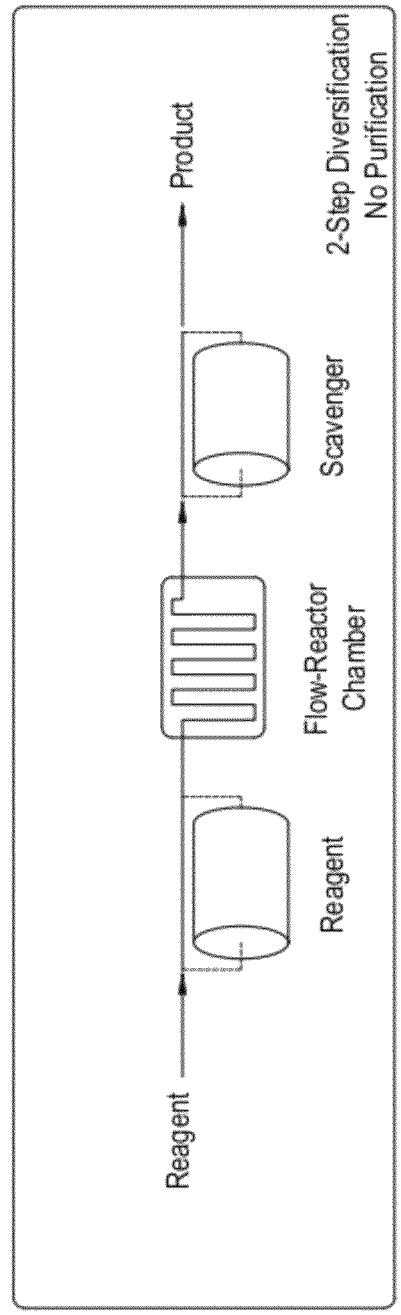

HIGH CAPACITY MAGNETIC NANOPARTICLES AS SUPPORTS FOR REAGENTS AND CATALYSTS

CROSS-REFERENCE TO RELATED APPLICATION

This patent application claims the benefit of U.S. Provisional Application 61/378,778, filed on Aug. 31, 2010, which Provisional Application is incorporated herein by specific reference in its entirety. This application is also a continuation-in-part of U.S. patent application Ser. No. 13/152,531, filed on Jun. 3, 2011, which Patent Application is incorporated herein by specific reference in its entirety.

STATEMENT OF GOVERNMENT SUPPORT

This invention was made with Government support under Grant Nos. NIH-STTR R42 GM097896 and NIH-STTR R41 GM076765 awarded by the National Institutes of Health. The Government has certain rights in this invention.

This invention was made with Government support under Grant DFG RE948/8-1 "GLOBUCAT" awarded by Deutsche Forschungsgemeinschaft. The Government has certain rights in this invention.

BACKGROUND

Development of immobilized reagents, catalysts, and scavengers for application in various chemical protocols continues to be important. Since the introduction of polystyrene immobilized resins, a variety of immobilization agents have been found, such as silica, fluorous, monolith, and polymers generated from ring-opening metathesis polymerization ("ROMP"). Investigations into these types of agents have resulted in surface functionalization of nanoparticles via polymer grafting. This technique provides a method for the preparation of particle-polymeric hybrid materials. Such hybrid materials combine the physical properties of the inorganic shell (e.g., particle size, pore and shape) with the tunable properties of the grafted organic polymer. Grafted-hybrid materials, such as silica-polymer hybrids, may be important and useful as heterogeneous supported catalysts, which can be used in the automotive, electronic, and consumer industries. As such, surface-initiated ROMP can be used as an effective method for the grafting of organic-polymers from inorganic nano-particles, carbon nano-tubes, metal surfaces, and resins.

Also, current asymmetric homogeneous catalysts are difficult to use in large-scale runs, as they are not reusable, and can contaminate the desired products. To address these limitations, the immobilization of these key metal catalysts could be utilized as one method to resolve these limitations, while opening up their key utilization in continuous flow through processing has been the immobilization of such catalysts, specifically through immobilization of the corresponding ligands to anchor the metals to the support. Strong binding of the catalyst to the support prevents metal leaching into product, whilst improving turnover number. In addition, it has been reported that metal catalysts prone to dimerization (e.g. Ruthenium) and hence deactivated can be prevented via immobilization, extending the catalyst life more than just the added cause of recycling.

Though limited, a variety of platforms have been developed for the immobilization of metal catalyst/ligand systems, including fluorous tagged enantiopure phosphine-phosphite ligands, soluble PEG-monophosphite ligands, phosphoramidites, phosphines, silica-grafted phosphite and phosphine ligands, polystyrene-supported phosphine ligands, and other ligand systems. Despite these advancements, difficulties in isolation, recyclability and the inherent low load levels of current immobilized ligands/metal catalysts hampers their application in various chemical synthesis protocols. Thus, these key properties must be optimized in order to improve performance in parallel synthetic methods. Moreover, enhancement in load is absolutely critical for expansion of immobilized ligand/metal catalysts in green, efficient parallel automated technologies.

Therefore, there remains a need in the art to improve immobilization of agents that can be used in catalytic protocols.

BRIEF DESCRIPTION OF THE FIGURES

The foregoing and following information, as well as other features of this disclosure, will become more fully apparent from the following description and appended claims taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 includes a schematic representation of a catalytic reaction and separation environment for use of the immobilized catalysts and immobilized ligands of the present invention;

FIG. 10 includes a schematic representation of a catalytic reaction and separation environment for use of the immobilized catalysts and immobilized ligands of the present invention.

DETAILED DESCRIPTION

Figure 1:
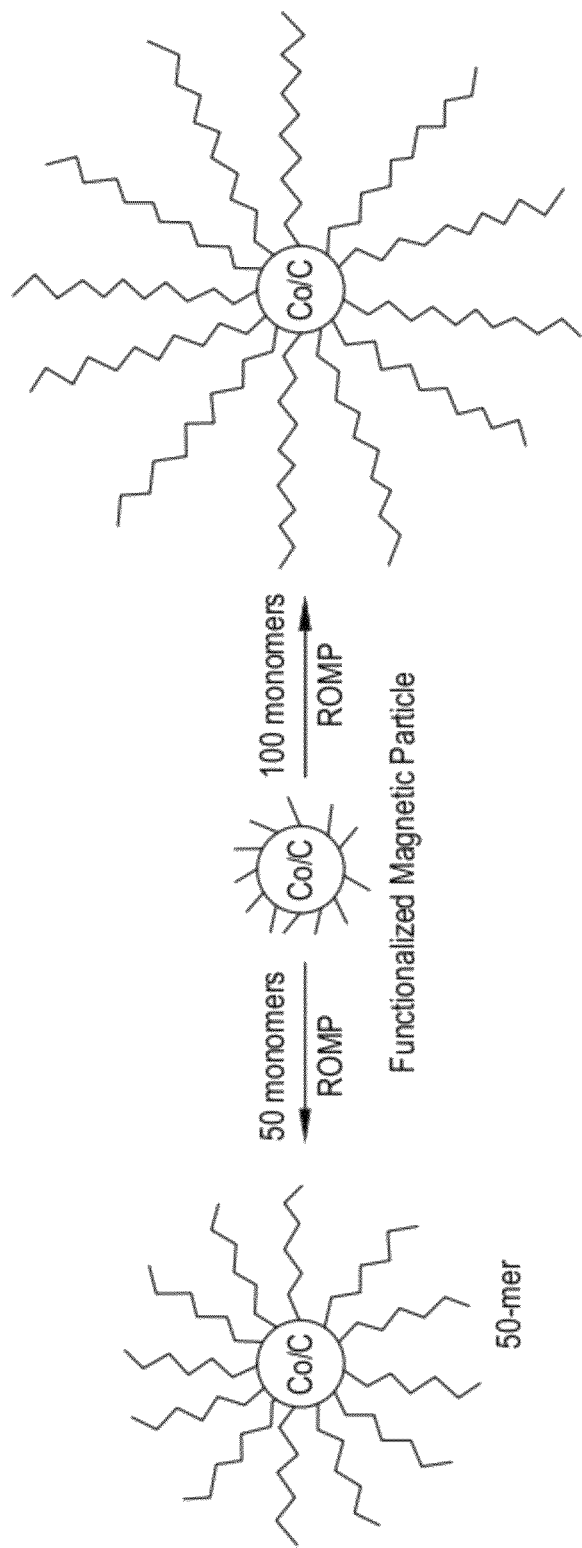
FIG. 1 includes a schematic representation of preparing a recyclable magnetic particle-polymeric hybrid nano-material, where the polymeric reagents can control the number of monomers for each polymeric material linked to a magnetic particle, such as Co/C nanoparticle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention relates to magnetically responsive particles or ferromagnetic particles coupled to functionalized polymeric groups via novel conjugation chemistry. As used herein, the terminology "ferromagnetic" or "magnetically responsive" can be simply referred to as "magnetic," and thereby the ferromagnetic particles of the present invention are magnetic. The magnetic particles can include nickel, iron, cobalt, gadolinium, and their alloys. The magnetic particles can provide for the use of a magnetic field to separate the magnectic particles and thereby any substance bound with the functionalized polymeric groups from various types of compositions. The magnetic particles can facilitate separation from substances that are not susceptible to magnetic fields when the substance is coupled to the magnetic particles.

In one example, the functionalized polymeric groups coupled to the magnetic particles can bind and retain catalysts, and thereby can be used as supports for catalysts. Accordingly, the combination of the magnetic particle and functionalized polymeric groups that are bound to catalysts can be used as catalysts to provide the catalytic activity of the naked catalyst. Also, the magnetic aspect allows for the catalyst bound to the functionalized polymeric groups to be separated from composition using magnetic fields.

In another example, the functionalized polymeric groups can be designed to be a ligand for various types of materials besides catalysts, where various types of metals can be bound to select ligands. As such, a functionalized polymeric group can be tailored to have functional groups to bind to a particular metal. Ligands for metals that are known or developed can thereby be associated with the functionalized polymeric groups, and the ligands can be used to bind with the metal. A magnetic field can then be used to separate or purify the metal once it associates with the ligand of the functionalized polymeric group coupled to the magnetic particle.

Additionally, the functionalized polymeric group coupled to the magnetic particle can be tailored to bind, reversibly or irreversibly, to any type of substance, compound, or molecule. That is, the functionlized polymeric group can include a functional group that binds to a particular substance, compound, or molecule. Functional groups that bind to select materials can be incorporated into the functionlized polymeric group so that the magnetic particle can facilitate separation or purification techniques of the material from a composition of matter.

The magnetic particles having the functionalized polymeric groups can be prepared by having providing norbornenyl-tagged magnetic nanoparticles, and then using ring-opening metathesis (ROM) polymerization (ROMP) followed by an optional hydrogenation of the double bond in the polymeric backbone, with various types of norborneneyl-taged hybrid materials in order to produce magnetic particle-supported polymeric hybrid materials (FIG. 1). The number of monomers that can be coupled to a magnetic particle can be selected when preparing the norbornenyl-tagged magnetic particle, and the number of monomers of the functionalized polymeric group can be determined when using ROMP. The total number of monomers attached to the particle can determine loading potential.

The magnetic particle-supported polymeric hybrid materials can be used as scavengers for catalysts and as recyclable catalysts. The stability of the magnetic particle-supported polymeric hybrid catalyst materials allow for use in a wide variety of catalyzed synthetic protocols. The magnetic particle-supported polymeric hybrid materials can be referred to as magnetic particle-polymeric hybrid nano-materials, or MPPHM, because the magnetic particle-linked polymer is a hybrid material. The particle can of various sizes, however, it can be preferred if the particle is on the nano-scale. The particles can be any type of magnetic particle, such as cobalt (Co) or cobalt-core and carbon-shell (Co/C) particles. The polymer can also be considered to be an oligomer, where reference to oligomers and polymers herein can refer to the same material linked to the particle. Neither the term oligomer, nor polymer, is meant to indicate length or number of monomers of the polymeric material linked to the particle, and these terms can be used interchangeably.

The magnetic nanoparticles can be considered as semi-heterogeneous supports as they are readily dispersed, and have an intrinsically high surface area and excellent accessibility of the surface-bound catalytic sites. Instead of classical catalyst separation by filtration, applying an external magnetic field can efficiently and cleanly recycle magnetic nanoparticles. The magnetic nanoparticles can include Co/C nanoparticles that include a cobalt core having one or more graphene layers, which provides a high level of chemical and thermal stability, thus preventing oxidation of the Co metal core.

These MPPHMs can be derived from magnetic particles that have a plurality of norbornene groups available for surface-initiated ROMP with functionalized materials that include norbornenyl-tagged functional groups. The MPPHMs combine the physical properties of the magnetic particle (e.g., Co/C) with the inherent tunable properties of the ROMP-derived polymers to yield high-load catalyst scavengers and recyclable catalysts. The number of polymers per magnetic particle as well as the number of monomers per polymer can be modulated to vary the theoretical catalyst load. These MPPHMs can include higher loads (e.g., mmol/g) than existing commercial catalysts and catalyst scavengers currently on the market.

The MPPHMs can be used as magetically recyclable immobilized catalysts or as catalyst scavengers for application in catalytic protocols to separate a catalyst from a reaction product. In this regard, MPPHMs have wide application in parallel synthesis (e.g., as free powders), combinatorial chemistry, automated synthesis protocols, solid phase extraction protocols (SPE), flow-through platforms such as flow-through cartridges, and purification free parallel synthesis protocols. The MPPHMs can be useful to facilitate reactions by either providing the catalyst for a reaction or to remove a catalyst from a reaction product. This can allow for increased cost benefits of expensive catalysts by using magnetic fields to extract the catalyst.

Figure 2:
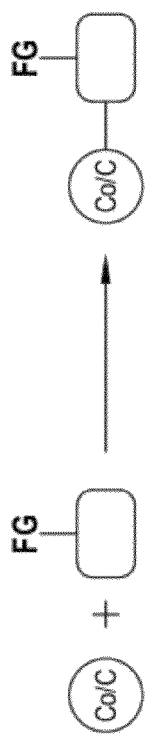
FIG. 2 includes a schematic representation of a standard functionalization of a magnetic nanoparticle.
Figure 3:
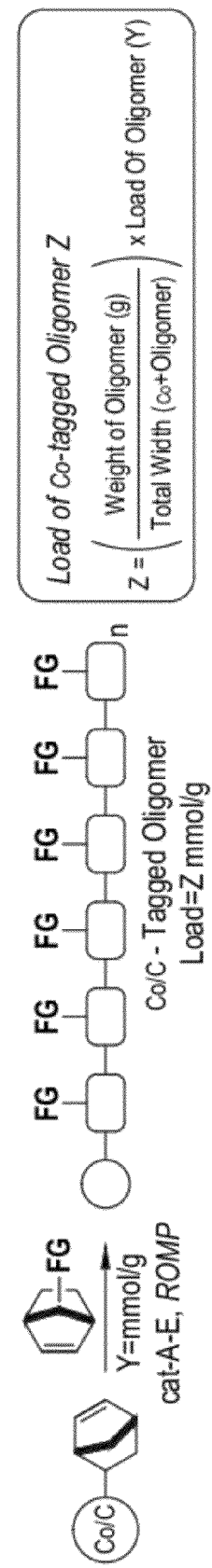
FIG. 3 includes a schematic representation of an embodiment of functionalization of a particle using surface-initiated ROMP chemistry with a magnetic nanoparticle.

Previously, commercially available magnetic particles had not used ROM polymerization in order to functionalize a surface of the particle (see FIG. 2). Now with the present invention, the use of ROM polymerization from the magnetic particle surface can provide a MPPHM (see FIG. 3) with increased load potential for complexing with various compounds or substances, such as catalysts or metals or anything that can bind with a ligand. Increasing the catalytic load of such MPPHMs has an environmental and economic benefit as less catalyst/scavenger substance is required. Also, a novel feature of surface-initiated ROMP reaction schemes of the present invention is that by extending the polymerizing chain length from the magnetic particle, higher loads of catalyst sequestration can be achieved. This allows tailoring the load potential for a particular catalytic process when the MPPHM is used as the catalyst. The variation of polymer chain length can also vary how much catalyst by weight can be extracted by the magnetic field. In some instances, shorter polymer lengths can be beneficial so that the combined weight of the sequestered catalyst does not inhibit the magnetic field separation. Balancing loading potential while retaining response to a magnetic field can be tailored to provide a magnetically responsive MPPHM. The loading can also be tailored depending on the type of substance, such as expensive catalyst, that will be loaded into the polymeric functional groups in order to maintain sufficient magnetic responsiveness.

The synthesis of a MPPHM can be performed with a particle such as a cobalt-core and carbon shell magnetic particle that has been coupled to a norbornene group. The norbornene group can be coupled to the particle through use of a copper(I) catalyzed alkyne/azide cycloaddition (CuAAC) reaction ("Click" reaction) to graft propargylated norbornene groups onto azide functionalized Co/C. The norbornene groups conjugated to the magnetic particle are available for reaction with functionalized reagents that are also tagged with norbornene groups. The ROMP results in the norbornene groups reacting and polymerizing from the magnetic particle, where each polymerized reagent can have a functional group, and thereby each monomer of the polymerized chains from the magnetic particle can include the functional group. As such, the amount of functionalized reagent can be modulated in order to provide a magnetic particle having a desired load potential for sequestration of a substance that associates with the functional group.

The norbornenyl-tagged functionalized groups can be selected based on the solvent or composition into which the MPPHM will be utilized. As such, selection of the norbornenyl-tagged functionalized groups can be performed to be composition-specific, which can allow for tuning the MPPHM for use in various solvents.

In one embodiment, the norbornenyl-tagged functional groups can be included in polymerizable reagents. As such, the polymerizable reagents can include functional substituent motifs that are useful for reagents sequestration or facilitating chemical reactions. Such polymerizable reagents can include: bis-acid chloride (BAC); dichlorotriazine (DCT) generation 1 or generation 2; triphenyl phosphine (TPP); triazole phosphate (TP); carbodiimide (ACC); benzyl phosphate (BP); monoamine (MAm); monoethyl azodicarboxylate (MEAD); benzylethyl azodicarboxylate (BEAD); sulfonyl chloride (SC); benzenesulfonyl chloride (BCS); acetic acid (HAc); pyridine (Py); benzaldehyde (BA); chlorophosphate (PC); dioxyopyrrolidin-1-yl acetate (DA), and Trimercaptotriazine (TMT). Other functional substituents can be used as described below. Growing ROMP-derived polymers from the magnetic particle surfaces that are tagged with norbornene groups can be achieved via surface-initiated ROMP utilizing the norbornenyl-tagged (Nb-tagged) magnetic particles and corresponding norbornenyl (Nb) monomers to generate MPPHM. These MPPHM combine the physical properties of the magnetic particle with the inherent tunable properties of the ROMP-derived polymers to yield high-load reagents, catalysts, and scavengers that are responsive to magnetic fields.

First, a magnetic particle having one or more first norbornenyl groups is obtained. Then, a functionalized reagent having a second norbornenyl group is linked to the magnetic particle through catalyzed reaction between the first and second norbornenyl groups via ROMP. This reaction is conducted to polymerize the functionalized reagent onto the magnetic particle. The amount of functionalized reagent can be selected to determine the number of monomers per polymer chain that extends from the magnetic particle or total number of monomers per magnetic particle. The amount of monomer provides an indication of the amount of loading that can be achieved, where one monomer can scavenge one molecule or particle, such as a catalyst particle like palladium. Thus, the number of available monomers can be tailored in order to obtain a suitable amount of loading.

As a result of the ROMP chemistry with norbornenyl reagents, a composition can be obtained that includes a magnetic particle (e.g., Co or Co/C) and one or more high-load polymers coupled to the particle, the one or more high-load polymers having a linker linked to the particle and having a first norbornenyl reaction product. The polymer coupled to the linker has a plurality of monomers linked together in a chain, each monomer being coupled to another monomer through a second norbornenyl reaction product. The first and second norbornenyl reaction products each result from reacting two different norbornenyl groups, and are exemplified by a cyclopentane. The polymer has at least one loadable functional substituent per monomer. The polymer is opposite of the particle with respect to the linker The polymer extends by additional norbornenyl reactions to result in "n+1" norbornenyl reaction products for an "n" polymer.

In one embodiment, a composition can include: a magnetic particle and one or more high-load polymers coupled to the magnetic particle, the one or more high-load polymers being linked to the magnetic particle through a triazole linker. The linker can link to the polymer through a cycloalkane (e.g., cyclopentane) that is formed from reacting the first and second norbornenyl groups. The polymer is coupled to the cycloalkane (e.g., cyclopentane), and can extend in one or two directions from the cycloalkane. As such, the reaction conditions can determine whether a bi-directionally extended polymer is formed or whether a single-directionally extended polymer is formed with an aliphatic or aryl group opposite from the polymer with respect to the first norbornenyl group that is coupled to the linker. Each monomer of the polymer can have a second cycloalkane (e.g., cyclopentane) group coupled to one or more loadable functional substituents.

In one embodiment, a composition can include: a magnetic particle and one or more high-load polymers (e.g., oligomers) coupled to the magnetic particle, the one or more high-load polymers having an aliphatic or aromatic triazole linker linked to the magnetic particle; a first cycloalkane (e.g., cyclopentane) coupled to the aliphatic or aromatic triazole linker opposite of the magnetic particle; a first polymer chain (e.g., oligomer) coupled to a carbon of the first cycloalkane (e.g., cyclopentane), each monomer of the polymer having a functional substituent as described herein; and a second polymer chain (e.g., oligomer) coupled to another carbon of the first cycloalkane (e.g., cyclopentane), each monomer of the polymer having a functional substituent as described herein.

In one embodiment, a composition can include: a magnetic particle and one or more high-load polymers (e.g., oligomers) coupled to the magnetic particle, the one or more high-load polymers having an aliphatic or aromatic triazole linker linked to the magnetic particle; a first cycloalkane (e.g., cyclopentane) coupled to the aliphatic or aromatic triazole linker opposite of the magnetic particle; a polymer chain (e.g., oligomer) coupled to a carbon of the first cycloalkane (e.g., cyclopentane), each monomer of the polymer having a functional substituent as described herein; and terminal group, such as an alkyl and/or aryl group, coupled to another carbon of the first cycloalkane (e.g., cyclopentane) opposite of the polymer chain. Each monomer of the polymer may include a second cycloalkane (e.g., cyclopentane).

In one embodiment, a composition can include: a magnetic particle and one or more high-load polymers (e.g., oligomers) coupled to the particle, the one or more high-load polymers having a triazole linker linked to the particle; a first cycloalkane (e.g., cyclopentane) coupled to triazole linker opposite of the particle and having an alkenylphenyl (e.g., ethenylphenyl) linked to one carbon of the first cycloalkane (e.g., cyclopentane); and a polymer (e.g., oligomer) coupled to another carbon of the first cycloalkane (e.g., cyclopentane), each monomer of the polymer having a functional substituent as described herein.

Generically, the magnetic particle of the MPPHM can be any type of magnetic particle, which can be represented by "Z" in the chemical structures provided herein, such as in Formula 1. The MPPHM including the particle "Z" can be linked to a polymer through a linker identified as "Y-Triazole-X" herein, such as in Formula 1 or derivative or salt thereof. The derivatives can be prepared as known in the art. The salts can be any salt capable of being formed with the structures shown. The "Y" portion of the linker can be an aliphatic and/or aromatic chain. The "X" portion of the linker can be carbon (C) or any hetero atom, such as oxygen (O), nitrogen (N), phosphorous (P), sulfur (S) or other. The polymer of the PPHM can be any functionalized polymer "FP" as described herein, such as in Formula 1. Thus, Formula 1 provides a generic representation of a MPPHM. In Formula 1, "n" and/or "m" can be any integer, such as from 1 to 10,000,000, or from 1 to 1,000,000, or from 1 to 100,000, or from 1 to 10,000, or from 1 to 1,000, or from 1 to 500, or from 1 to 250, or from 1 to 100, or from 1 to 50, or from 1 to 25, or other range, such as 10 to 25, 50, 75, 100, 150, 200 or 250, or 25 to 50, 75, 100, 150, 200 or 250, as well as 50 to 75, 100, 150, 200 or 250. Also, there can be more than 250 monomers. The size of the particle "Z" can be used to determine the integer for "m." The particle can range from 0.1 nm to 1 mm, or 0.25 nm to 500 microns, or from 0.5 nm to 100 microns, or from 0.75 nm to 50 microns, or from 1 nm to 1 micron, or from 10 nm to 500 nm, or from 25 nm to 100 nm, or from 50 nm to 75 nm. The aliphatic groups can include carbon chains each independently being about 0-20, about 1-10, or about 1-5 carbons, which may be substituted with substituents or unsubstituted, and where the backbone carbon atoms can be substituted with hetero atoms O, N, S, P, or the like. The aromatic group can be any aromatic group that is monocyclic or polycyclic, such as benzene groups, toluene groups, ethylbenzene groups, p-xylene groups, m-xylene groups, mesitylene groups, durene groups, 2-phenylhexane groups, biphenyl groups, phenol groups, aniline groups, nitrobenzene groups, benzoic acid groups, naptholene groups, acenaphthene, acenapthylene, anthracene, chrysene, fluoranthene, fluorine, phenathrene, pyrene, coronene, corannulene, tetracene, pentacene, triphenelene, ovalene, or combinations thereof or derivatives thereof, whether substituted or unsubstituted. When substituted, the substituents can be as described herein. Also, the polymeric backbone of the MPPHM can be saturated or unsaturated, where illustrated double bonds can also be hydrogenated to have a saturated aliphatic backbone.

In order to facilitate preparation of the MPPHM, the particle can be functionalized with a norbornenyl group, generating what is referred to as a norbornenyl-tagged (e.g., Nb-tagged) particle. Formula 2A illustrates an Nb-tagged magnetic particle through a triazole linker. The linker portion "Y" can be of any length as desired and reasonable.

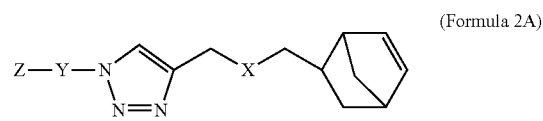
(Formula 2A)

(Formula 2B)

The functionalized polymer "FP" of Formula 1 can be prepared by polymerizing monomers that have norbornenyl groups. The monomers having the norbornenyl groups also include one or more functional groups "FG", such as generally shown in Formula 2B, where the functional group FG can be linked to the norbornenyl group by a single bond or by two bonds with the FG forming a ring with the norbornenyl group.

Examples of the monomers having the norbornenyl group and functional group FG can include: norbornenyl-tagged bis-acid chloride (Nb-BAC); norbornenyl-tagged dichlorotriazine (Nb-DCT); norbornenyl-tagged triphenyl phosphine (Nb-TPP); norbornenyl-tagged alkyl triphenyl phosphine (Nb-alkyl-TPP); norbornenyl-tagged phosphate triphenyl (Nb-PTP); norbornenyl-tagged di-triphenylphosphate (Nb-Di-TPP); norbornenyl-tagged triazole phosphate (Nb-TP); norbornenyl-tagged carbodiimide (Nb-ACC); norbornenyl-tagged alkyl-carbodiimide (Nb-alkyl-ACC); norbornenyl-tagged benzyl phosphate (Nb-BP); norbornenyl-tagged monoamine (Nb-MAm); norbornenyl-tagged alkyl-monoamine (Nb-alkyl-MAm); norbornenyl-tagged methyl-monoamine (Nb-MMAm); norbornenyl-tagged monoethyl azodicarboxylate (Nb-MEAD); norbornenyl-tagged benzyl-ethyl azodicarboxylate (Nb-BEAD); norbornenyl-tagged sulfonyl chloride (Nb-SC); norbornenyl-tagged benzene-sulfonyl chloride (Nb-BCS); norbornenyl-tagged acetic acid (Nb-HAc); norbornenyl-tagged pyridine (Nb-Py); norbornenyl-tagged benzaldehyde (Nb-BA); norbornenyl-tagged chlorophosphate (Nb-PC); norbornenyl-tagged trimercaptotriazine (Nb-TMT); norbornenyl-tagged benzylic sulfonium salts (Nb-OBSPc); norbornenyl-tagged benzyl bromide (Nb-BB); norbornenyl-tagged sulfonylchloride (NB-SC); norbornenyl-tagged amino acids; norbornenyl-tagged amino esters; norbornenyl-tagged biphenol phosphines; norbornenyl-tagged biphenylbisphosphines; norbornenyl-taggedcyclopentadienyls; norbornenyl-tagged N-heterocyclic carbene (Nb-NHC); or others. Any types of functional group substituents can be used that are tagged with a norbornenyl group.

The Nb-tagged magnetic particle (Formula 2A) and Nb-tagged functional group (Formula 2B) can be reacted under conditions described herein for ROMP chemistry in order to produce the MPPHM of the present invention. In one example, the MPPHM can have the structure of Formula 3 or 3A or derivative or salt thereof.

$$Z\text{—}(Y\text{-Triazole-}X\text{—}(FP)_n)_m \qquad \text{(Formula 1)}$$

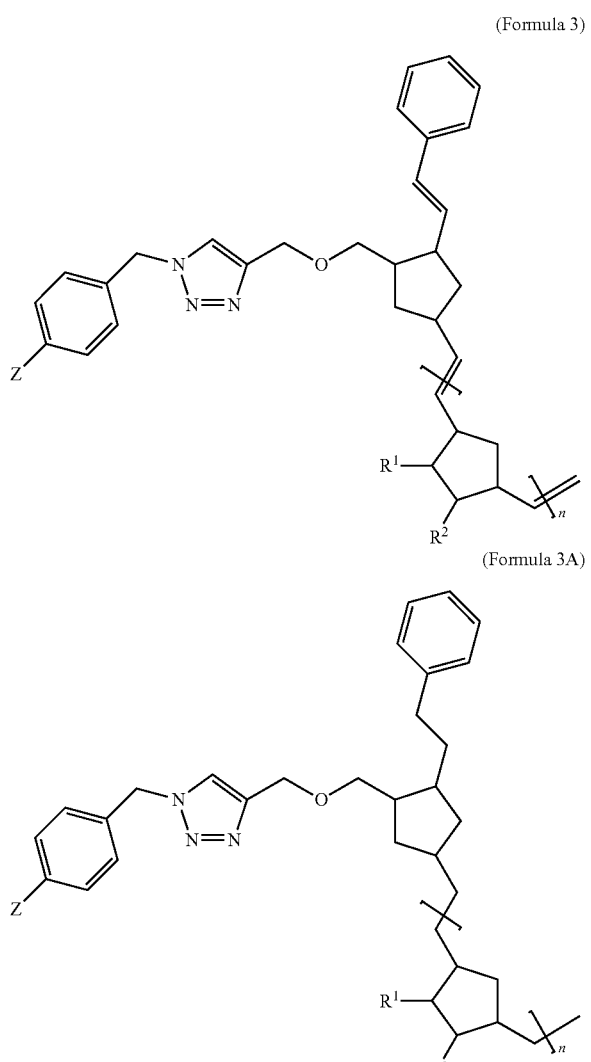

(Formula 3)

(Formula 3A)

In Formula 3 or 3A: Z can be any magnetic particle; each $R^1$ and $R^2$ can be independently selected from hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, derivatives thereof, or combinations thereof as well as other well-known chemical substituents and/or $R^1$ and $R^2$ can independently or in combination include a substituent having a functional group as described herein. That is, at least one of $R^1$ and $R^2$ has a functional group, and in some instance $R^1$ and $R^2$ combine to form a functional group. The aliphatic groups can include carbon chains, each independently being about 0-20, about 1-10, or about 1-5 carbons, which carbons may be substituted with hetero atoms O, N, S, P, or the like. The "n" can be as described herein. In one aspect the substituent having a functional group for $R^1$ and $R^2$ can cooperate to form a ring structure that includes the functional group. When independent, $R^1$ and $R^2$ can both include functional groups, or one can be hydrogen or other non-functional substituent with the other including the functional group. Thus, various combinations of hydrogen, functional substituents, and non-functional substituents can be used for $R^1$ and $R^2$. As shown in Formula 3A, any of the MPPHMs described herein can include a partially or fully hydrogenated polymeric backbone such that any double bonds of Formula 3 can be saturated. Also, the compounds of Formula 3 and 3A can be modified so that the phenyl group opposite of the polymer can be the same as the monomer. In another option, the compounds of Formula 3 and 3A can be cross-coupled so as to form a gel, which gel can include the phenyl group opposite of the polymer or the polymer can extend in both directions from the norbornenyl reaction product. Also, the MPPHM may include more than one magnetic particle linked to the polymers.

In one embodiment, one of $R^1$ or $R^2$ is hydrogen and the other includes a functional group as described herein, or both $R^1$ and $R^2$ are the same functional group or different functional groups.

In one example, $R^1$ and $R^2$ can cooperate to form a ring having a phosphate, where the phosphate group can be substituted or unsubstituted and may or may not have another functional group coupled thereto as a substituent (e.g., benzyl phosphate, BP). As such, $R^1$ and $R^2$ can cooperate to form a benzyl phosphate.

One example of $R^1$ and $R^2$ cooperating can include formation of 2-((benzyl)oxy)-1,3,2-dioxaphosphepane 2-oxide, which may or may not be substituted with $R^5$ as shown in Formula 4A. In Formula 4A, the loose ends couple to the cyclopentyl group of the polymeric backbone. $R^5$ can include hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, derivatives thereof, or combinations thereof, as well as other well-known chemical substituents.

Formula 4A

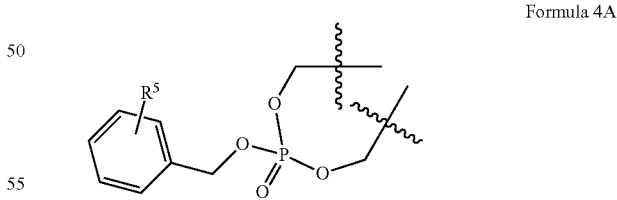

In another example, $R^1$ and $R^2$ can cooperate to form a ring having a phosphate that is linked to a triazole so as to be a triazole phosphate, which may or may not be substituted (e.g., triazole phosphate; TP). One example of $R^1$ and $R^2$ cooperating can include the formation of 2-((1-methyl-1H-1,2,3-triazol-4-yl)methoxy)-1,3,2-dioxaphosphepane-2-oxide, which may or may not be substituted with $R^5$ as shown in Formula 4B. In Formula 4B, the loose ends couple to the cyclopentyl group of the polymeric backbone. $R^5$ can be as defined in connection with Formula 4A.

Formula 4B

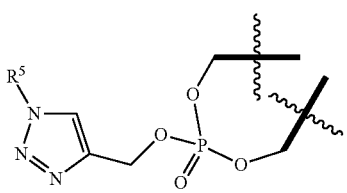

In one example, $R^1$ and $R^2$ can cooperate to form a pyrrolidine-2,5-dione substituent that may or may not be further substituted (e.g., diclorotriazine; DCT). When further substituted, the nitrogen of the pyrrolidine-2,5-dione can be linked to a substituent, such as $R^5$ as described herein. The pyrrolidine-2,5-dione may be linked to a dichlorotriazine, such as shown in Formula 4C, so that $R^1$ and $R^2$ can cooperate to form 1-(2-((4,6-dichloro-1,3,5-triazin-2-yl)oxy)ethyl)pyrrolidine-2,5-dione. In Formula 4C, the loose ends couple to the cyclopentyl group of the polymeric backbone. $R^5$ can be as defined in connection with Formula 4A.

Formula 4C

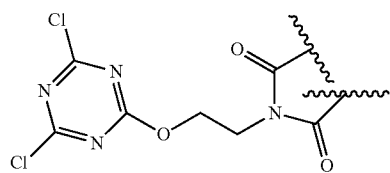

In another example, $R^1$ and $R^2$ can cooperate to form a pyrrolidine-2,5-dione substituent that is further substituted with a carbdiimide group such as shown in Formula 4D, so that $R^1$ and $R^2$ can cooperate to form 1-((((cyclohexylimino)methylene)amino)methyl)pyrrolidine-2,5-dione (e.g., carbdiimide; ACC). In Formula 4D, the loose ends couple to the cyclopentyl group of the polymeric backbone. $R^5$ can be as defined in connection with Formula 4A. In one example, $R^5$ can be a phenyl group.

Formula 4D

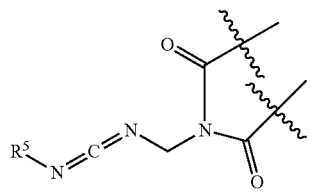

In another example, $R^1$ and $R^2$ can cooperate to form a pyrrolidine-2,5-dione substituent that is further substituted with an acrylate group such as shown in Formula 4E, so that $R^1$ and $R^2$ can cooperate to form 2,5-dioxopyrrolidine-1-yl acrylate (e.g., dioxopyrrolidin-1-yl acetate; DA). In Formula 4E, the loose ends couple to the cyclopentyl group of the polymeric backbone. $R^5$ can be as defined in connection with Formula 4A.

Formula 4E

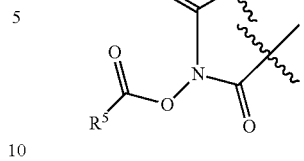

In another example, $R^1$ and $R^2$ can cooperate to form a pyrrolidine-2,5-dione substituent that is further substituted with a bis-acid chloride group such as shown in Formula 4F, so that $R^1$ and $R^2$ can cooperate to form acetyl chloride (e.g., bis-acid chloride; BAC). In Formula 4F, the loose ends couple to the cyclopentyl group of the polymeric backbone.

Formula 4F

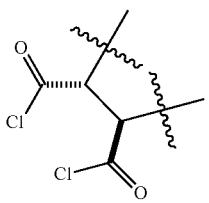

In one embodiment, one of $R^1$ or $R^2$ is hydrogen and the other includes: a triphenylphosphine (e.g., TPP) such as is shown in Formula 4G; a pyridine (e.g., (Py) such as is shown in Formula 4H; a 6-(benzylthio)-1,3,5-triazine-2,4-dithiol (e.g., trimercaptotriazine; TMT) such as is shown in Formula 4I; a methyl amine like methylamine hydrochloride (e.g., methylamine; MAm) such as is shown in Formula 4J; a benzylethyl azodicarboxylate like (E)-1-Alkyl2-(4-methylbenzyl)diazene-1,2-dicarboxylate (e.g., benzylethyl azodicarboxylate; BEAD) such as is shown in Formula 4K; a benzylsulfonyl chloride such as benzenesulfonyl chloride (e.g., BSC) such as is shown in Formula 4L; a diclorotriazine like ethyldichlorotriazine (e.g., ODCTG2) such as is shown in Formula 4M; or combinations thereof.

Formula 4G

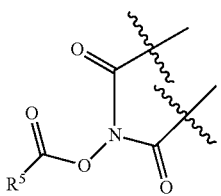

Formula 4H

Formula 4I

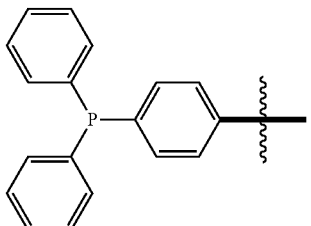

-continued

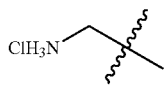
Formula 4J

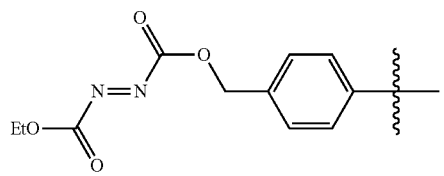
Formula 4K

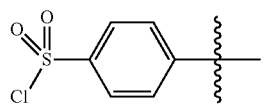
Formula 4L

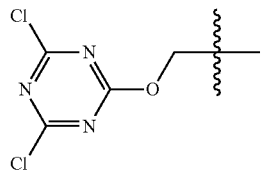
Formula 4M

Additionally, the $R^1$ or $R^2$ groups of Formula 3 can be the functional groups that are coupled to the polymers illustrated in any of the chemical structures of Formulae 5A to 8B. That is, the functional group of any of these MPPHMs that is linked to the cyclopentane of the polymer can be $R^1$ or $R^2$, or vice versa. Also, any of these functional groups can be linked to a norbornenyl group and used in preparing the MPPHMs of Formulae 5A-8B. Also, the compounds of Formulae 5A-8B can be fully hydrogenated or saturated such that the double bonds have appropriate hydrogen atoms so as to be saturated as in FIG. 3A.

The foregoing substituents can be incorporated into the MPPHM substances. Examples of MPPHM substances are shown below in Formulae 5A-5N, where: Z is a nanoparticle; and $R^5$ and n are as described herein. For the MPPHM in Formulae 5A-5N, n can be from about 10 to about 250, $R^5$ can be as defined herein with or without having a functional group. In all of the formulae herein with "Z" as the magnetic particle, the magnetic particle Z can include one or more polymers linked thereto. As a general note, the "O" in the name of the structures of the different formulae indicates that the structure includes at least an oligomeric ROMP product having the designated functional group, but which may be a long polymer.

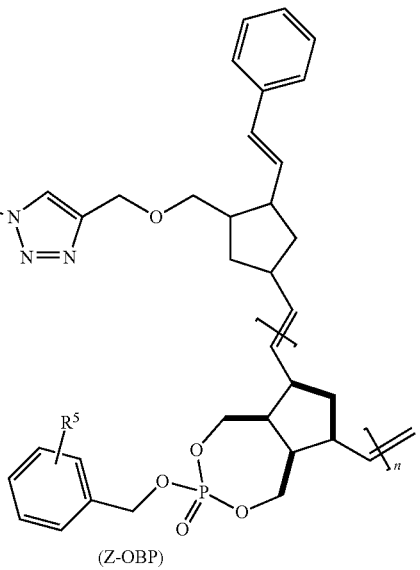
Formula 5A (Z-OBP)

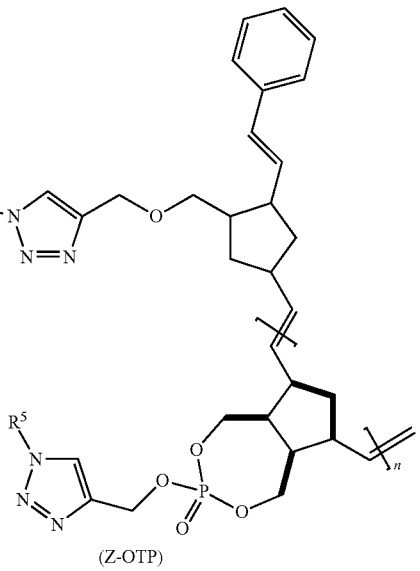
Formula 5B (Z-OTP)

Formula 5C
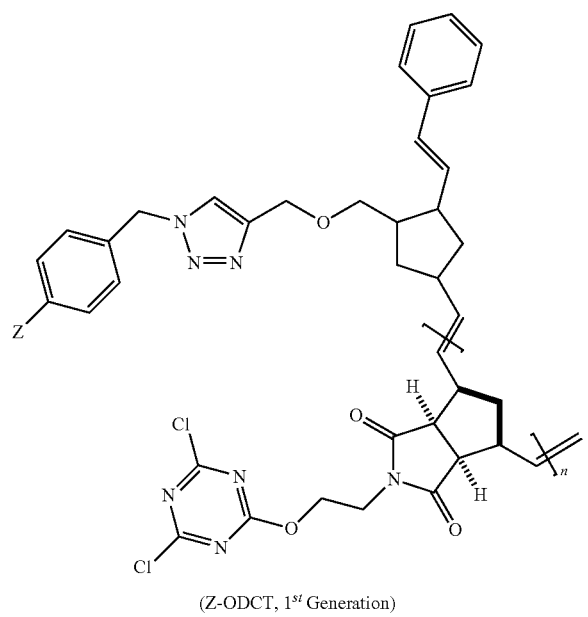
(Z-ODCT, 1st Generation)
Formula 5D1
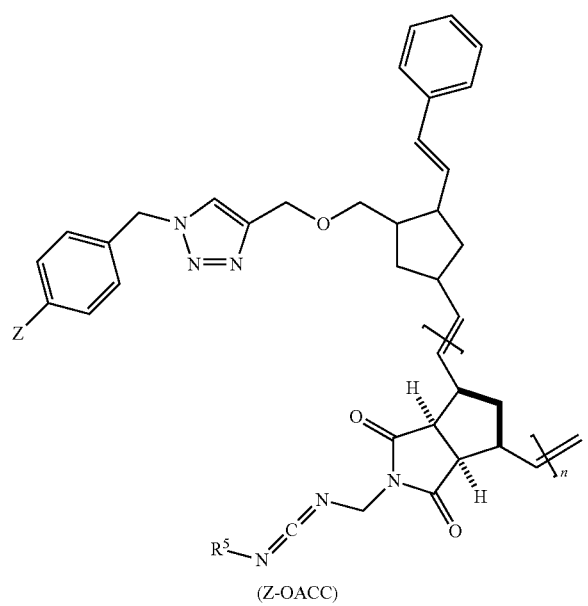
(Z-OACC)
Formula 5E
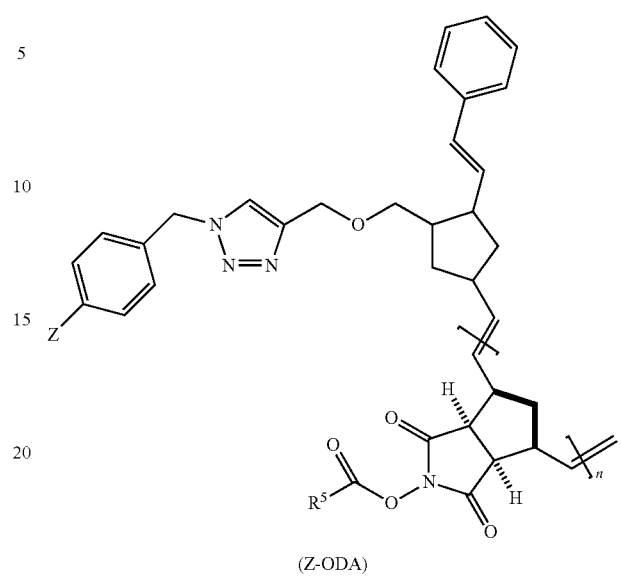
(Z-ODA)
Formula 5F
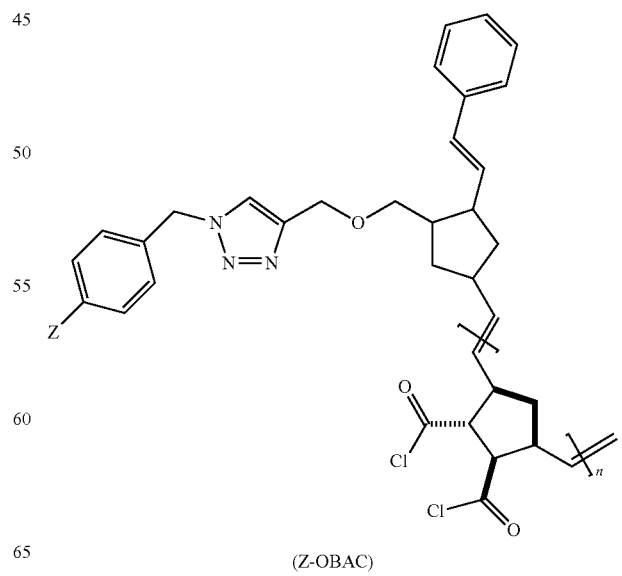
(Z-OBAC)

Formula 5G
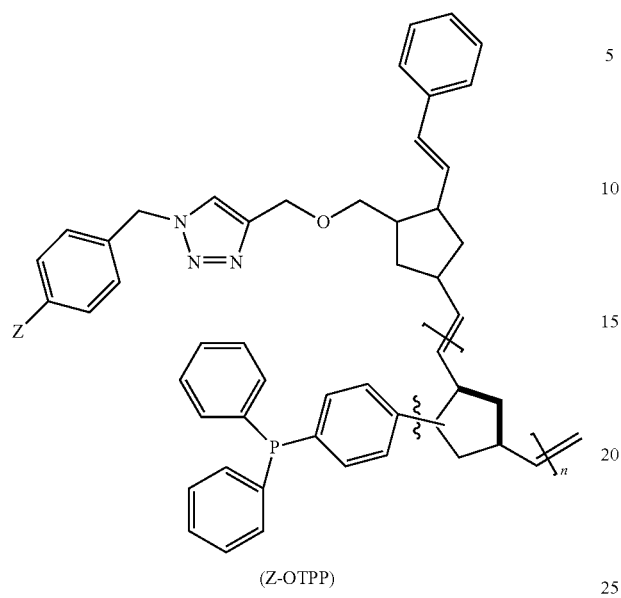
(Z-OTPP)
Formula 5I
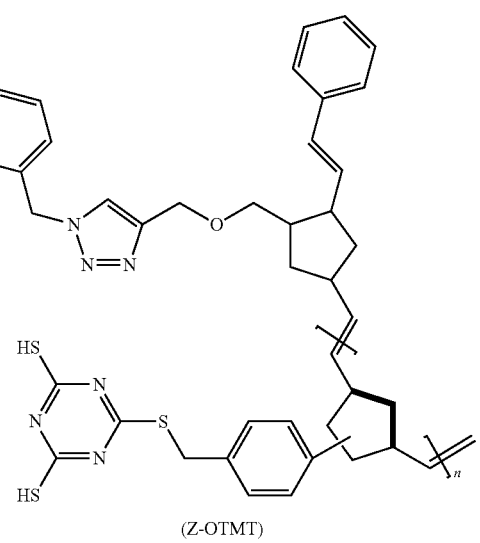
(Z-OTMT)
Formula 5H
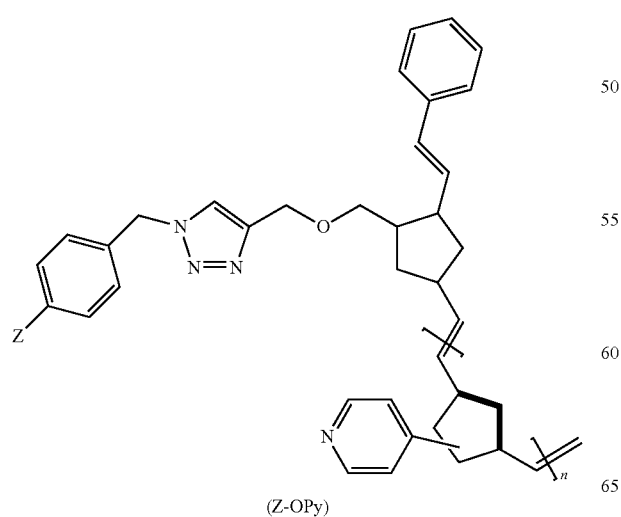
(Z-OPy)
Formula 5J
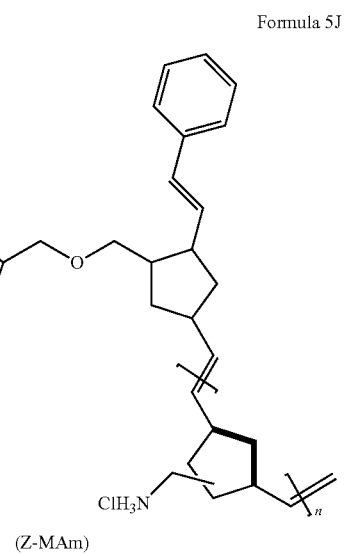
(Z-MAm)

Formula 5K

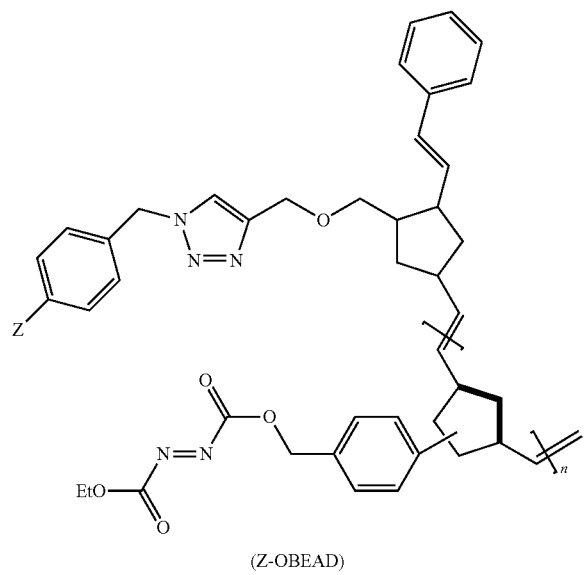

(Z-OBEAD)

Formula 5L

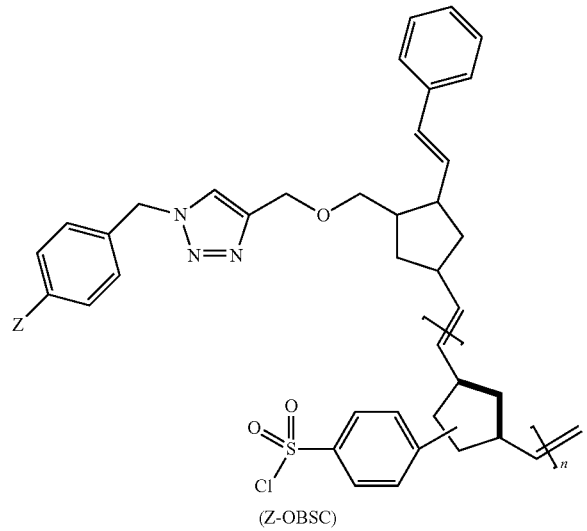

(Z-OBSC)

Formula 5M (Z-ODCT, 2nd Generation)

Formula 5N (Z-OHAc)

Additionally, a MPPHM can be prepared to include a polymer that is capable of functioning as a ligand that can bind to various types of substances. For example, the ligands can be designed to be bound to substances that are expensive or difficult to separate from reaction mixtures or other compositions, and thereby, the ligand can be customized for different substances. For example, the ligand can bind to various types of metals, such as catalytic metals.

Some MPPHMs can include: magnetic particle oligomeric benzylic sulfonium salts (Z—OBSPc), magnetic particle oligomeric benzyl bromide (Z—OBB), magnetic particle oligomeric sulfonylchloride (Z—OSC), and others. Some examples of the MPPHMs that can be designed as ligands are shown in Formulae 6A-6G.

Formula 6A shows a ligand including an amino acid, were the side group can be any of those for any amino acid, which can be an amino ester. As shown, $R^3$ can be any amino acid side group so that the amino acid is selected from positively charged amino acids, arginine, histidine, lysine, negatively charged amino acids, aspartic acid, glutamic acid, polar uncharged amino acids, serine, threonine, asparagine, glutamine, cysteine, selenosystein, glycine, proline, hydrophobic amino acids, alanine, valine, isoleucine, methionine, phenylalanine, tyrosine, tryptophan, other amino acids, non-standard amino acids, carnitine, hydroxyproline, selenomethionine, lanthionine, 2-aminoisobutyric acid, dehydroalanine, gamma-aminobutyric acid, ornithine, citrulline, beta alanine, pantothenic acid, or derivatives thereof as well as defined for $R^5$. $R^4$ and $R^5$ can each independently be as described for $R^1$ or $R^2$ or $R^4$ can be as defined for $R^5$. Also, $R^3$ and/or $R^4$ may each independently be as described for $R^1$, $R^2$, or $R^5$. Formula 6B also illustrates a ligand that is configured as a biphenol phosphine ligand, which can be referred to as a Z-oligomeric BIPOL Phosphine Ligand (Z—OBPP). Formula 6C illustrates a biphenylbisphosphine ligand. Formula 6D illustrates a cyclopentadienyl ligand, where $R^4$, $R^5$, $R^6$ and $R^7$ can each independently be as described for $R^1$ or $R^2$ or $R^3$ or $R^5$. In Formula 6D, when the R groups are phenyl groups, the MPPHM can be a Z-oligomeric cyclopentadienyl ligand (Z—OCP). Formula 6E illustrates a NHC G1 ligand, where $R^5$ can be defined as described herein, and $R^8$ can be any negatively charged counter ion, such as a halide, Cl(−), Br(−), F(−), OAc(−), or the like, such as those with a −1 charge. FIG. 6F illustrates a NHC G2 ligand, where $R^5$ and $R^6$ can be defined as described herein, and $R^8$ can be any negatively charged counter ion. FIG. 6G illustrates a nitrene ligand, where each $R^5$ and each $R^6$ can be independently defined as described herein, and $R^8$ can be any negatively charged counter ion, and can be referred to as Z—ONt. Formula 6H illustrates a first generation BINAP ligand (Z—OBINAP G1 Ligand). Formula 6I illustrates a second generation BINAP ligand (Z—OBINAP G2 Ligand), where y can be about 0 to about 10, from about 1 to about 8, from about 2 to about 6, or about 4 or 5. Formula 6J illustrates a first generation BINOL ligand (Z—OBINOL G1 Ligand). Formula 6K illustrates a second generation BINOL ligand (Z—OBINOL G2 Ligand)), where y can be any integer, such as being about 0 to about 10, from about 1 to about 8, from about 2 to about 6, or about 4 or 5. Additionally, the MPPHM of Formula 5G (Z—OTPP) can also be a ligand.

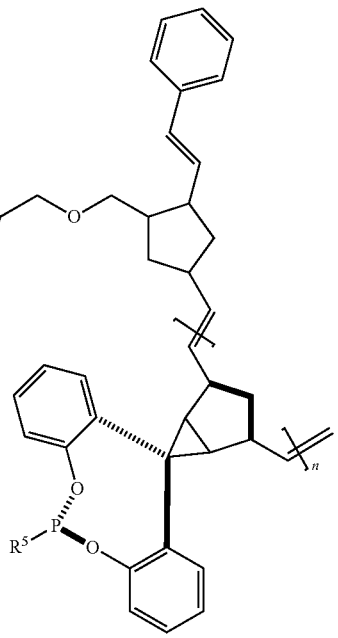

Formula 6B (Z-OBiphenol Phosphine Ligand)

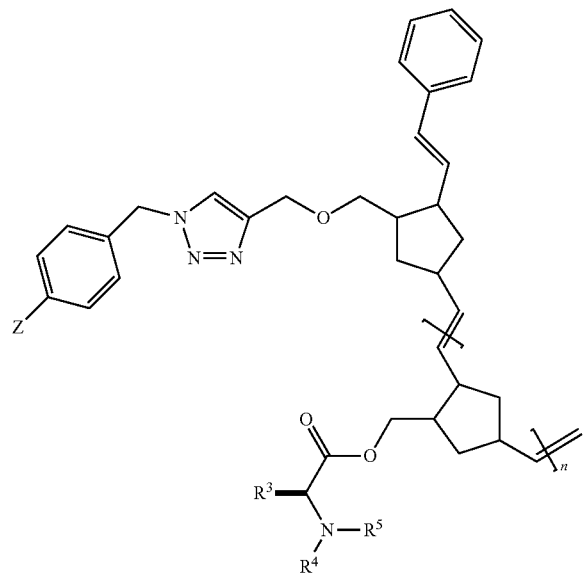

Formula 6A (Z-OAminoester Ligand)

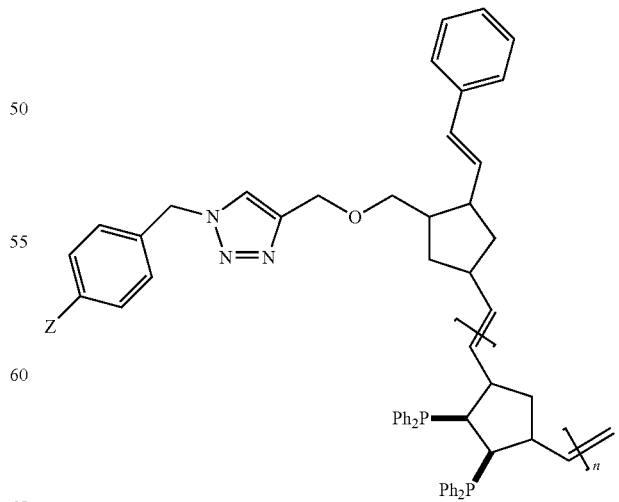

Formula 6C (Z-OBiphenylbisphosphine Ligand)

Formula 6D
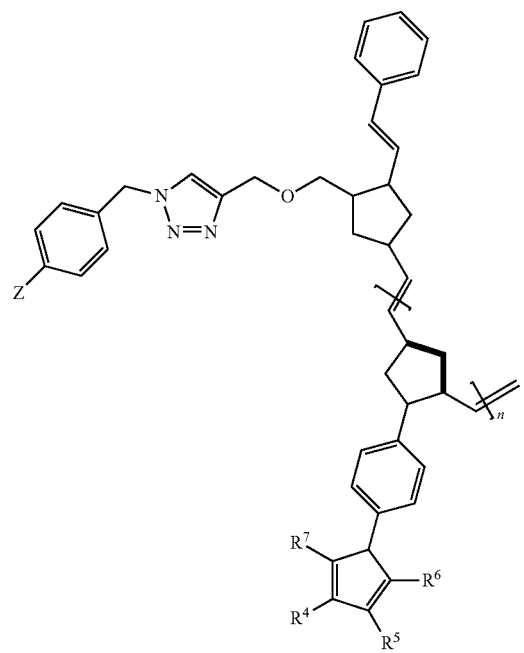
(Z-OCyclopentadienyl Ligand)
Formula 6E
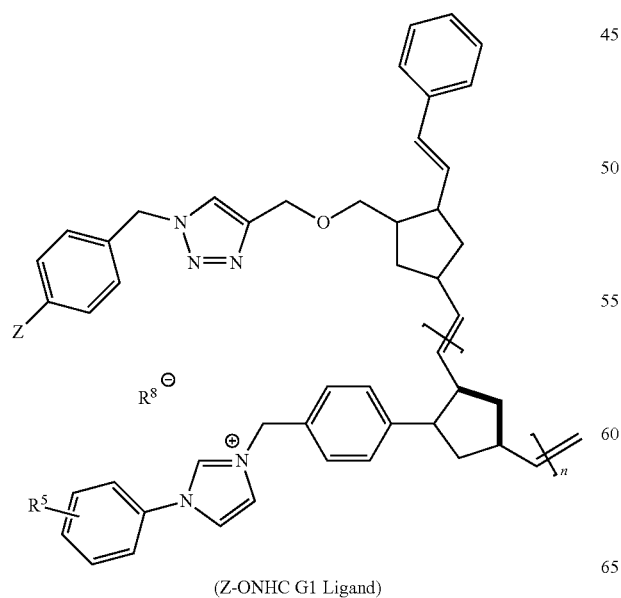
(Z-ONHC G1 Ligand)
Formula 6F
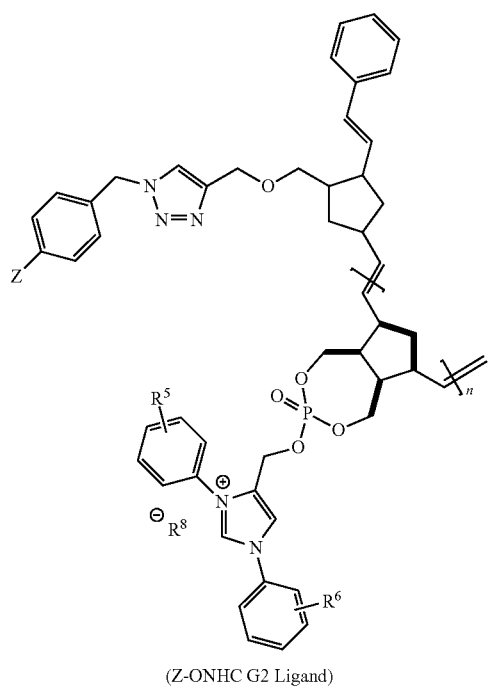
(Z-ONHC G2 Ligand)
Formula 6G
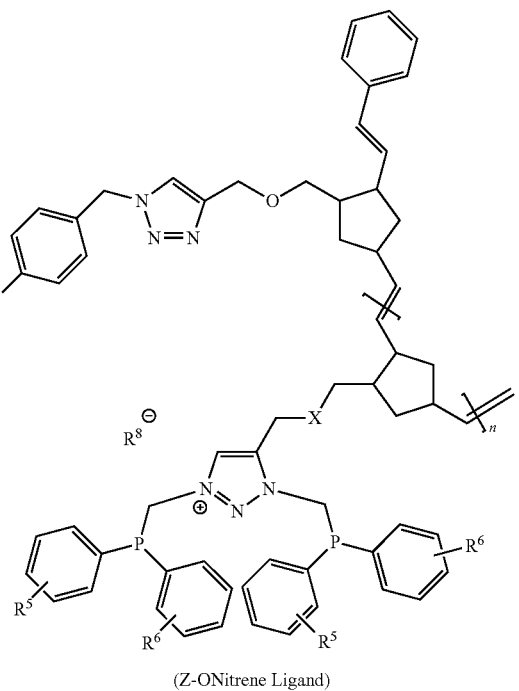
(Z-ONitrene Ligand)

Formula 6H
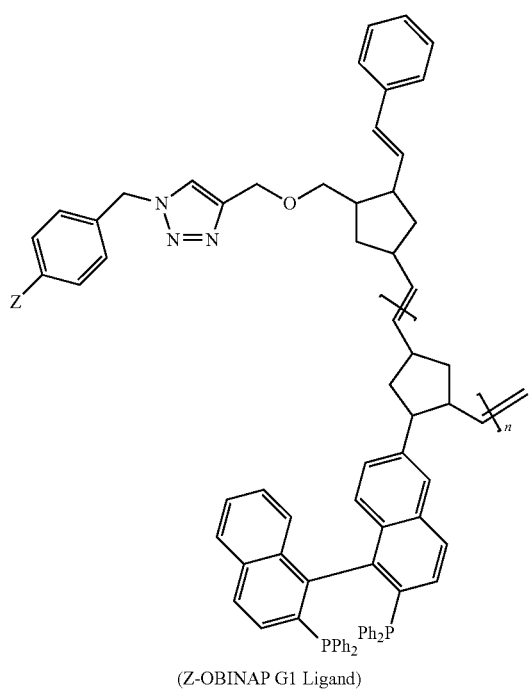
(Z-OBINAP G1 Ligand)
Formula 6J
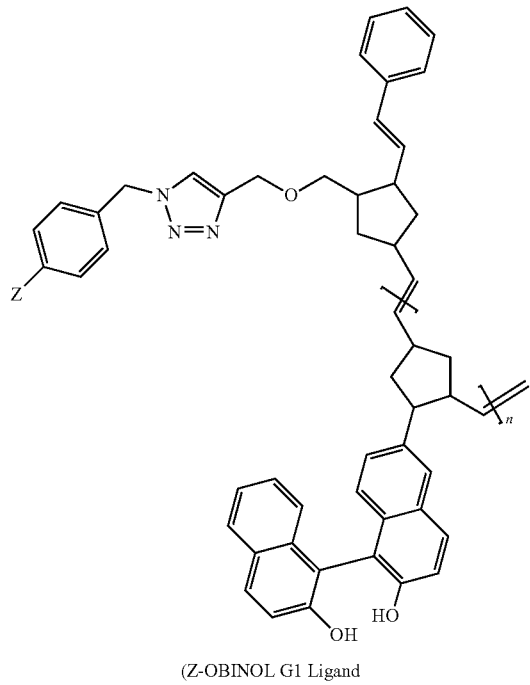
(Z-OBINOL G1 Ligand)
Formula 6I
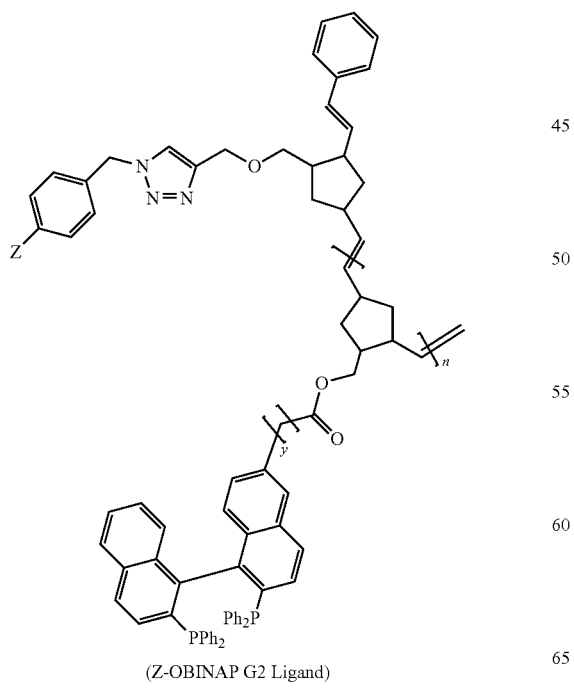
(Z-OBINAP G2 Ligand)
Formula 6K
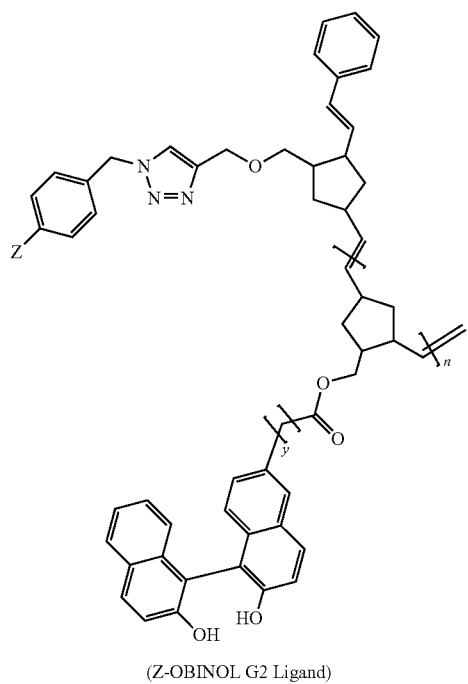
(Z-OBINOL G2 Ligand)

Also, the MPPHM can be prepared to include a polymer bound to a metal, which is referred to as a metal ligand. The metal is bound to the polymer such that the metal can be extracted from a composition by using a magnetic field. The metal can be any of various types of metals, such as catalysts. When the metal is a catalyst, the MPPHM can be considered to also be a catalyst because the catalytic function is retained. Also, the polymer bound to the metal can be formed by introducing the ligand into a composition having the metal such that the polymer binds with the metal. The MPPHM having the metal can be designed as any of the metal ligands shown in Formulae 7A-7H.

Formula 7A shows a metal ligand including an amino acid that is bound to a metal "M". The type of metal and binding may be determined by the type of amino acid, and thereby the metal may be bound to one or more of $R^3$, $R^4$, $R^5$, or other part of the amino acid ligand. In Formula 7A, the metal M appears floating next to the functional group, which indicates that the bonding will be different depending on the definitions for $R^3$, $R^4$, $R^5$. Formula 7B also illustrates a metal ligand that is configured as a biphenol phosphine metal ligand. Formula 7C illustrates a biphenylbisphosphine metal ligand. Formula 7D illustrates a cyclopentadienyl metal ligand, where $R^4$, $R^5$, $R^6$ and $R^7$ can each independently be as described for $R^1$ or $R^2$ or $R^3$ or $R^5$. FIG. 7E illustrates a NHC-Metal G1 ligand, where $R^5$ can be defined as described herein, and $R^8$ can be any negatively charged counter ion. FIG. 7F illustrates a NHC metal G2 ligand, where $R^5$ and $R^6$ can be defined as described herein, and $R^8$ can be any negatively charged counter ion. FIG. 7G illustrates a nitrene metal ligand, where each $R^5$ and each $R^6$ can be independently defined as described herein, and $R^8$ can be any negatively charged counter ion. Additionally, FIG. 7H illustrates a TPP-Metal ligand. In Formulae 7A-7H the Ln can be a ligand or halogen, and the X can be a carbon or heteroatom, where the R groups can be the same or different. The ligand of Ln can be $R^1$ or $R^2$ or $R^3$ or $R^5$.

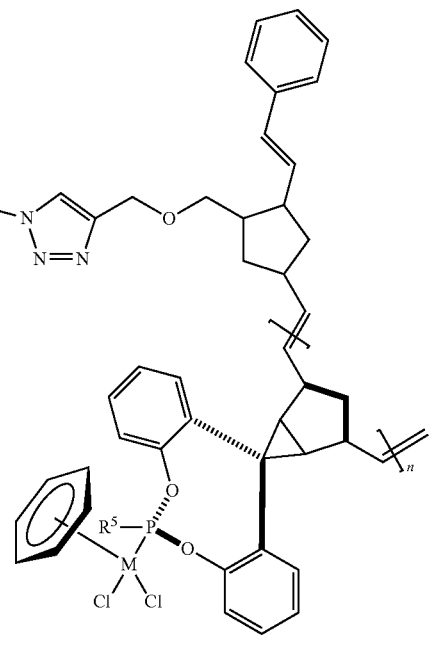

(Z-OBiphenol Phosphine-Metal Ligand)

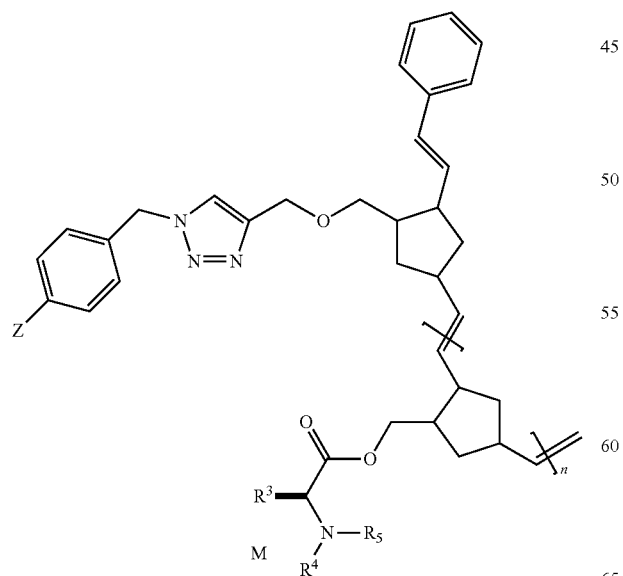

(Z-OAminoester-Metal Ligand)

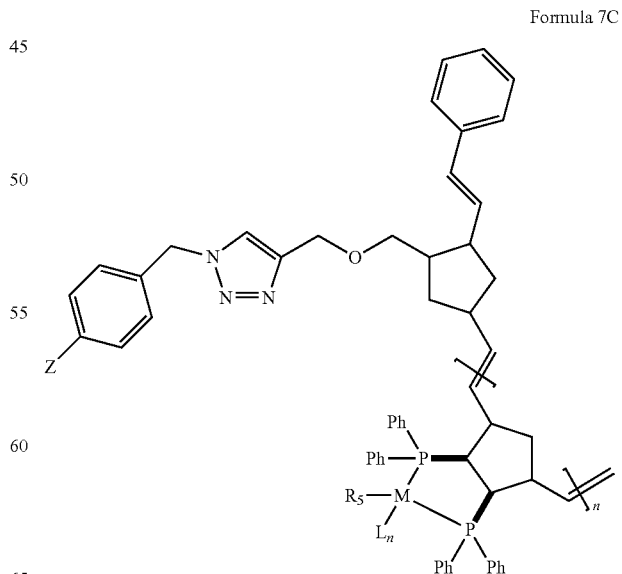

(Z-OBiphenylbisphosphine-Metal Ligand)

Formula 7D
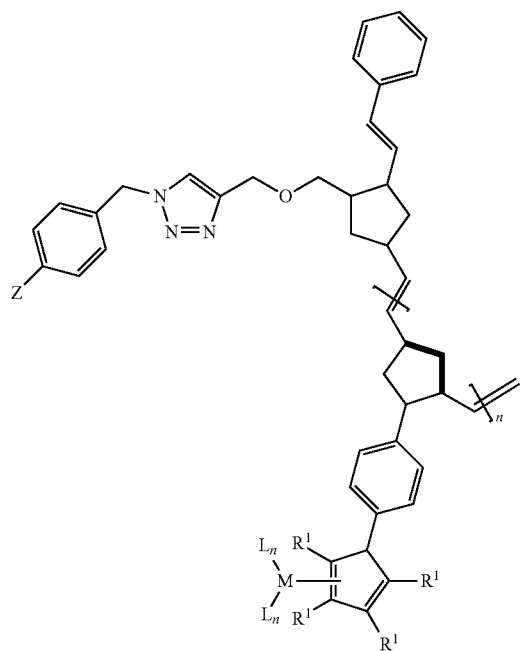
(Z-OCyclopentadienyl-Metal Ligand)
Formula 7E
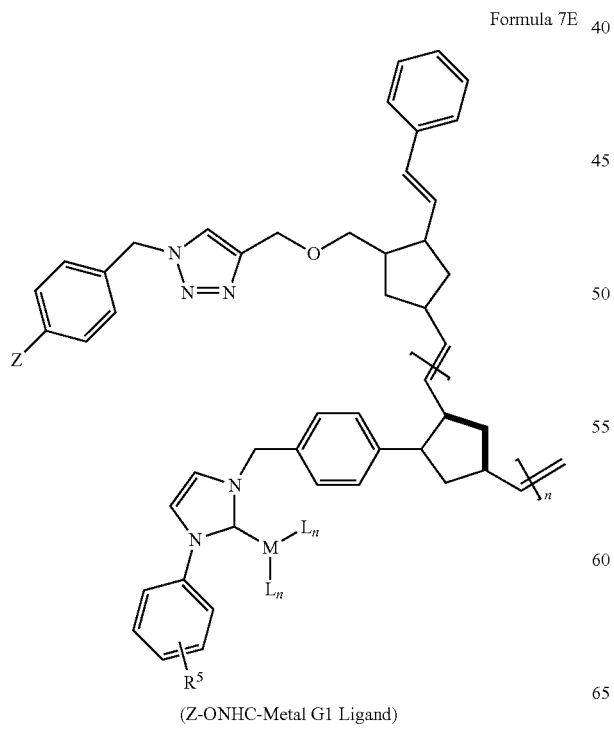
(Z-ONHC-Metal G1 Ligand)
Formula 7F
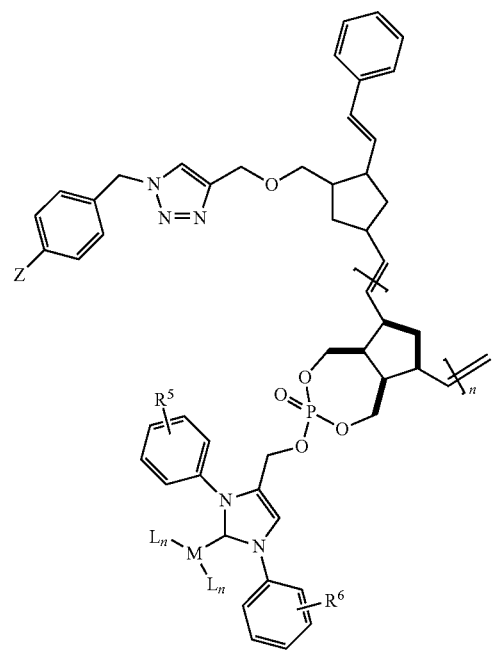
(Z-ONHC-Metal G2 Ligand)
Formula 7G
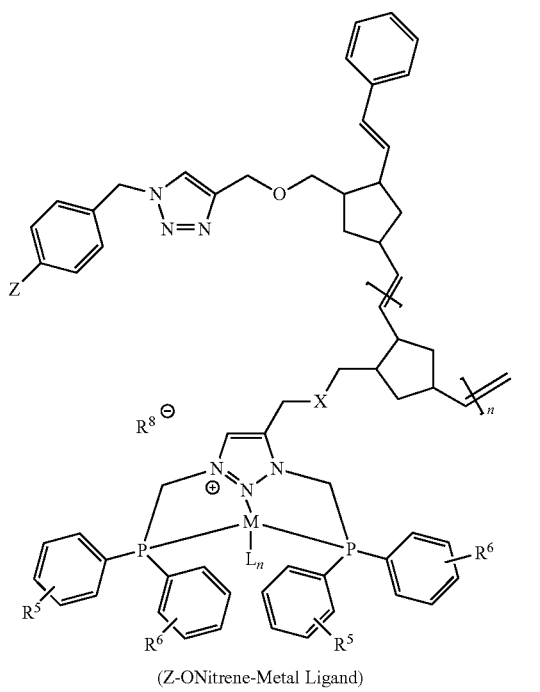
(Z-ONitrene-Metal Ligand)

Formula 7H

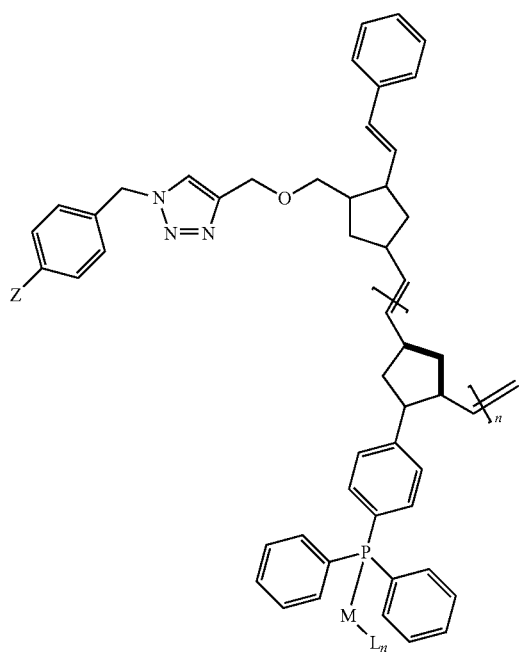

(Z-OTPP-Metal Ligand)

Formula 8B

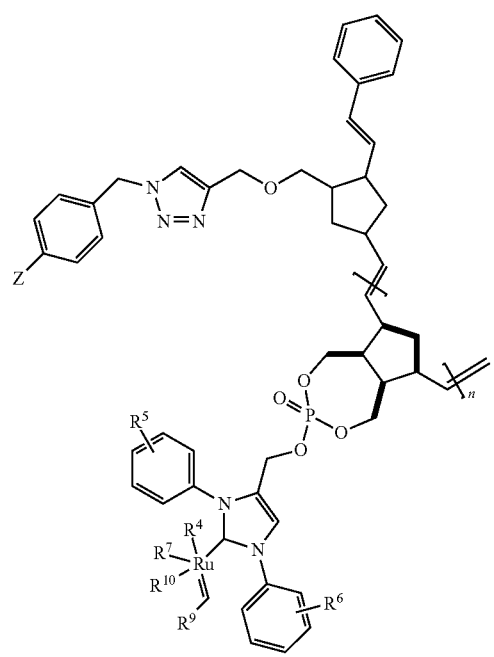

(Z-ONHC G2 Metathesis Catalyst)

Also, the MPPHMs described herein can be a metal catalyst, such as a metathesis catalyst. FIG. 8A illustrates a NHC first generation metathesis catalyst, where each of $R^4$, $R^5$, $R^6$, $R^7$, and $R^9$, can be independently as defined herein for $R^1$ or $R^2$ or $R^3$ or $R^5$, or phosphine, phosphite, where some or all of the R groups can be the same or different. FIG. 8B illustrates a NHC second generation metathesis catalyst, where each of $R^4$, $R^5$, $R^6$, $R^{7}$, $R^9$, and $R^{10}$ can be independently as defined herein for $R^1$ or $R^2$ or $R^3$ or $R^5$, or phosphine, phosphite, where some or all of the R groups can be the same or different. Formula 8C shows a specific example of a metal catalyst (Z—OCP—Ru Catalyst).

Formula 8A

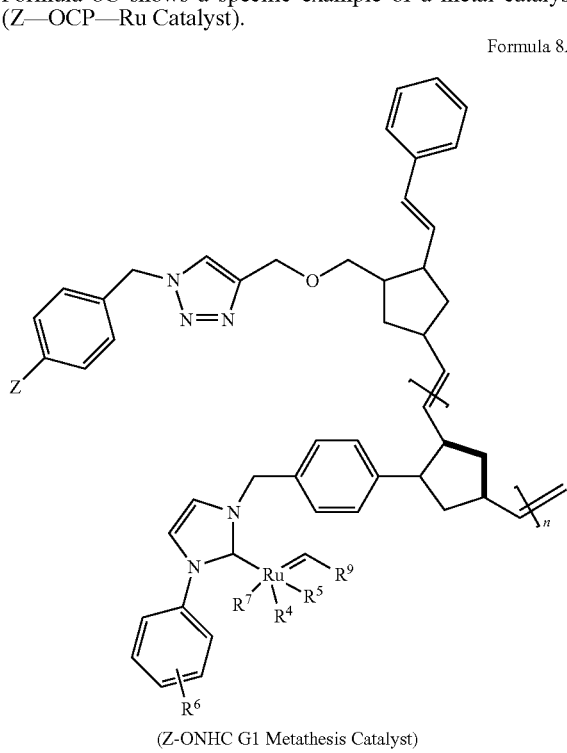

(Z-ONHC G1 Metathesis Catalyst)

Formula 8C

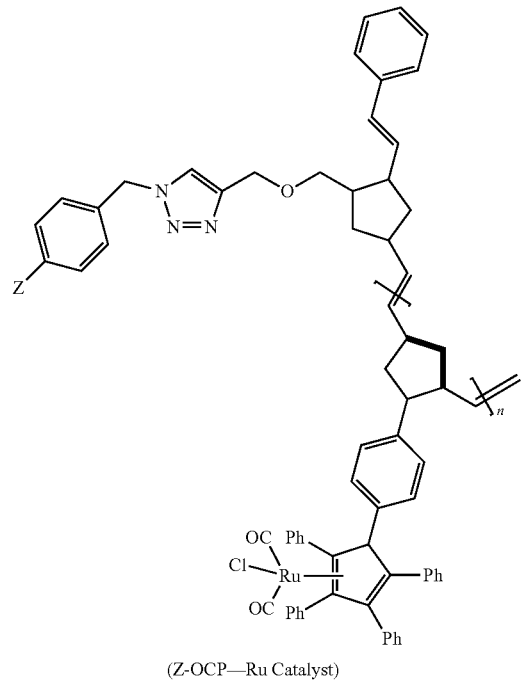

(Z-OCP—Ru Catalyst)

The MPPHM described herein have high functional group loadings per gram of material. The number of monomers "m" can determine the loading, which can include all monomers for the MPPHM such as those on different polymer chains. Examples of loadings can be found in Tables 5, 6, and 7 in the Experimental section. The recited values per "n" are theoretical values. The loadings can be greater than or less than these values where the range can be +/− 1%, 2%, 3%, 4%, 5%, 10%, 15%, 20%, or 25% of the recited theoretical values. In some instances the loadings can be greater than or less than 25% to 50% of the theoretical loadings with the proviso that the loadings are significantly higher than 0.1 mmol/g when n is 10, where significantly higher can be 5×, 6×, 7×, 8×, 9×, 10×, or greater than the 0.1 mmol/g when n is 10. Corresponding values can be determined for n being any other number such as those between n being 10 to 250 with the assistance of Table 5, 6, and 7. The loadings are calculated as loads for the MPPHM as being mmol/g, which is the mmol of active functionality per gram of MPPHM (e.g., particle and polymers).

In one embodiment, the functional group of a monomer can include trivalent phosphorus ligands (phosphinites, phosphonites, and phosphates). These phosphorus ligands can play an important role as metal binders in asymmetric homogeneous organometallic catalysis due to the special ligation properties of phosphorus to metals leading to monodentate, bidentate, or polydentate ligands.

The types of metals that can be bound with the functional groups of the MPPHMs can include alkali metals (e.g., lithium, sodium, potassium, rubidium, caesium, francium), alkaline earth metals (e.g., beryllium, magnesium, calcium, strontium, barium, radium), transition metals (e.g., zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, plutonium, gold, mercury, rutherfordium, dubnium, seaborgium, bohrium, hassium, copernicium), post-transition metals (e.g., aluminium, gallium, indium, tin, thallium, lead, bismuth), lanthanides (e.g., lanthanum, cerium, praseodymium, neodymium, promethium, samarium, europium, gadolinium, terbium, dysprosium, holmium, erbium, thulium, ytterbium, lutetium), actinides (e.g., actinium, thorium, protactinium, uranium, neptunium, plutonium, americium, curium, berkelium, californium, einsteinium, fermium, mendelevium, nobelium, lawrencium), and elements sometimes considered metals (e.g., germanium, antimony, polonium).

In one embodiment, the present invention includes a nanoparticle containing: a magnetic nanoparticle; a carbon coating on the nanoparticle; a functionalized pyrene substance pi-stacked on the carbon coating. The functionalized pyrene substance can be functionalized with a norbornene structure, which is reacted with the norbornene-tagged monomers in order to prepare the MPPHM having the pi-stacking In any of the chemical formulae provided herein, R1 and/or R2 can be defined as Ln, which is a ligand having a functional group that binds to a substance. The Ln can be COOH, COCl, CHO, $CH_2OH$, $NR^{10}R^{11}$ ($R^1$, $R^2$=H, D, Alkyl, Aryl, $SO_2R$, $CO_2R$ in any combination), P—$R^{10}R^{11}R^{12}$ ($R^{10}$, $R^{11}$, $R^{12}$=H, D, Alkyl, Aryl, $SO_2R$, $CO_2R$ in any combination), Alkyl, Aryl); $SO_2R^{10}$ ($R^{10}$=Alkyl, Aryl, $NR^5R^6$), $SO_3H$, $P(O)(OH)_2$, an oxazoline, an oxazole or the like. The linker that links the polymer to the particle can include a linker group selected from an amide, ester, ether, amino, sulfur, alkyl, aryl, heteroaryl, triazole, and/or tetrazole. Also, $R^{10}$, $R^{11}$, and $R^{12}$ can be as defined for $R^5$ with or without a functional group.

The polymer and/or linker can be coupled to the particle through: (a) noncovalently by π-stacking (connector=polycylic (hetero)aromatic; (b) noncovalently by cationic/anionic interactions; or (c) covalently by C—X bond (X=C, O, N).

The magnetic particle can be prepared or provided to include: a magnetically responsive metal or a metal derivative such as its oxide; or the nanoparticle can be coated, e.g. by a carbon or silica shell.

The MPPHMs described herein can be used in the development of new technologies for inherently safe, sustainable, environmentally benign (green), economically viable, and socially responsible production of chemical entities. That is, the MPPHMs can facilitate improved production of various types of molecules as well as the purification of thereof. The MPPHMs can be used in various phases of chemical production protocols, from being reagents to catalysts to scavengers for byproducts or catalysts. The MPPHMs with or without being bound to a substance can be withdrawn from a composition by using magnets, which allows for the MPPHMs to be recycled. Once the MPPHMs are withdrawn from a composition with a magnetic field, the MPPHM can be separated from the magnetic field, such as by removing the magnet or terminating power to an electromagnet, and the MPPHMs can be processed or regenerated for use. Such processing or regeneration can include removing the substance, such as the catalyst, from the functional groups of the MPPHMs.

Figure 7:
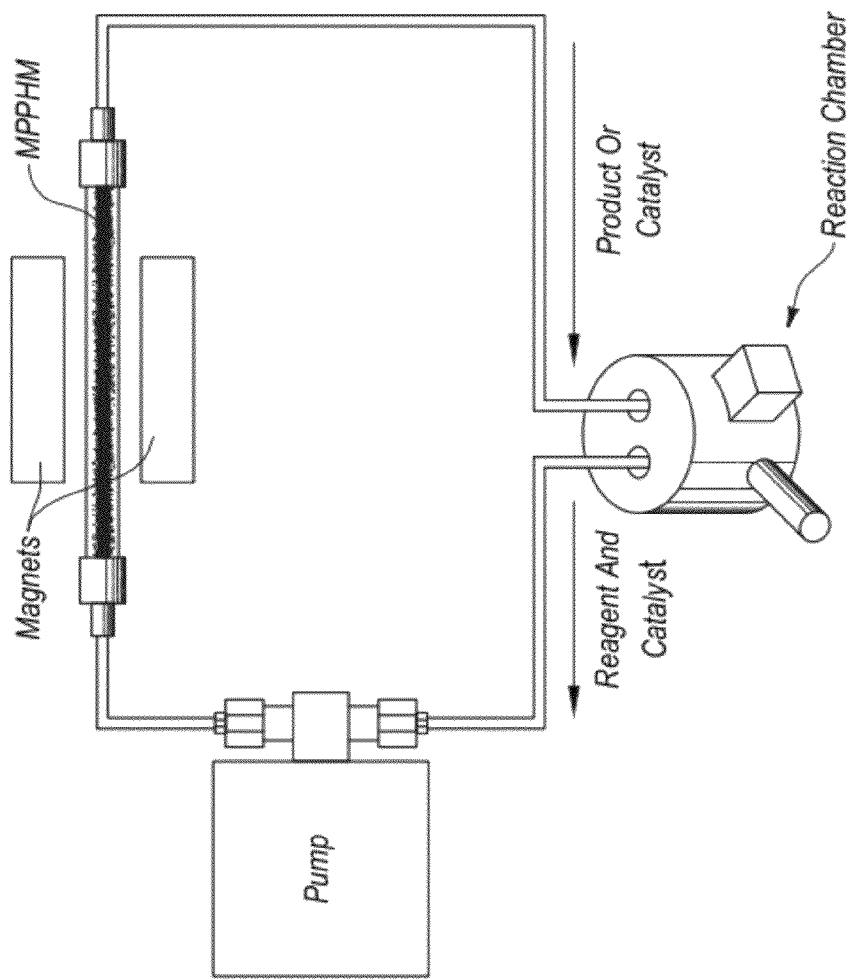
FIG. 7 includes a schematic representation of a reaction environment for use of the immobilized catalysts or immobilized ligands of the present invention.

FIG. 7 illustrates an example of an embodiment of a reaction system that can utilize the MPPHMs described herein. This system includes a chamber for the reaction that is fluidly coupled to a pump that can provide the reaction composition to a separation column where the MPPHM can be retained by magnets. Other variations of this reaction system that are known in the art can be used. Also, magnets or magnetic fields can be applied to standard reaction systems in order to remove the MPPHM as desired.

Figure 8:
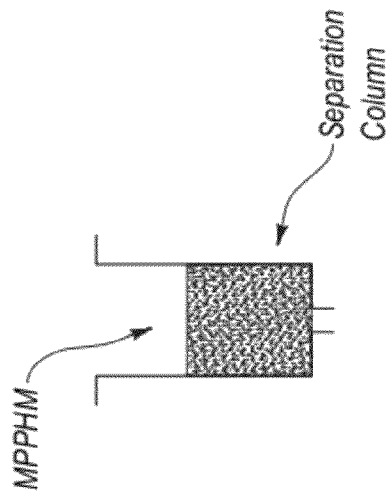
FIG. 8 includes a schematic representation of a separation environment for use of the immobilized catalysts or immobilized ligands of the present invention.

FIG. 8 illustrates a separation column having the MPPHM. The separation column can include a magnet (not shown) or be used in association with a magnetic field. The magnetic field can retain the MPPHM therein.

FIG. 9 illustrates an embodiment of a parallel synthesis system that can use the MPPHMs of the present invention. As shown, a reagent can be provided into path A or path B. In path A, the reagent can be reacted in a flow-reactor chamber and then passed to a scavenger cartridge that includes a MPPHM that is capable of binding to a substance or catalyst that is used in the flow-reactor chamber. In path B, the reagent can be reacted in a first chamber that has an MPPHM (e.g., reagent or catalyst) and then purified in a second chamber that is a scavenger cartridge that has a scavenger MPPHM.

FIG. 10 shows a multi-step reaction system that has a reagent cartridge, a flow-reactor chamber, and a scavenger cartridge. The reagent cartridge can include a MPPHM reagent. The flow-reactor chamber may be used as is standard in the art with or without a MPPM. The scavenger cartridge can include a MPPHM can be used to scavenge byproducts or catalysts that pass from the flow-reactor chamber. Accordingly, the MPPHMs can be used in various synthetic protocols in various reaction systems.

The MPPHMs can be prepared to have high load potentials as described herein, The high load MPPHMs can be used for ligands and/or corresponding immobilized catalyst derivatives for application in parallel synthesis, synthesis of small molecules, and organocatalyst-facilitated chemical reactions, as well as high-load cartridges for flow-through technologies or Microwave-Assisted Continuous Flow Organic Synthesis (MACOS). The MPPHMs can be used in batch or continuous systems. For example, the MPPHMs can be used for chemical synthesis of analogs for use in drug discovery protocols in order to facilitate development of novel therapeutic agents to treat human disease. The synthetic protocols with the MPPHMs can provide single enantiomers of chiral intermediates and active ingredients quickly and cost-effectively.

Current asymmetric homogeneous catalysts are difficult to use in large-scale runs, as they are not reusable, and can contaminate the desired products. To address these limitations, the immobilization of these key metal catalysts in the MPPHMs described herein can be utilized as one method to resolve these limitations. The MPPHMs can also allow for use of these catalysts in continuous flow through processing due to the immobilization of such catalysts, specifically through immobilization of the corresponding ligands to anchor the catalyst to the magnetic particle. Strong binding of the catalyst to the magnetic particle prevents metal leaching into product, whilst improving turnover number and removal via magnetic field. The MPPHMs can also inhibit metal catalysts from dimerization (e.g. Ruthenium), and hence can reduce the potential of the catalysts from becoming deactivated, thereby further extending the catalytic life.

The MPPHMs are suitable for use in conventional fixed-bed reactors. Agitation of the MPPHMs is allowable. The MPPHMs can be used in a rotating environment within a reaction, and are structurally stable against mixers. The size of the MPPHMs allows for suspension with moving fluid within a reactor column. Moreover, due to the pronounced ferromagnetism of carbon coated cobalt particles, the free-floating nanocatalyst can be magnetically retained in the reactor, thus making the application of membranes for nanofiltration dispensable; the magnetic field can remove the particles.

Also, a continuous-flow reaction setup using MPPHMs offers a number of potential advantages over batch techniques. The reaction conditions (e.g., flow rate, stoichiometry, and pressure) can be independently varied and precisely controlled in the presence of the MPPHMs. Flow processes are readily scalable by employing multichannel or parallel reactors (e.g., number-up vs. scale-up).

The use of the MPPHMs can avoid problems with traditional catalysts, such as uncontrollable fluid dynamics, because catalysts packed as random fixed-bed reactors might lead to stagnation zones, hot-spot formations, and large residence time distributions. Also, the MPPHMs can avoid polymer-specific issues such as uncontrollable swelling, limited accessibility of catalytic sites, and clogging of a sintered funnel by polymerization byproducts.

In one embodiment, the MPPHMs can be used in preparing new pharmacophores and small molecular probes. In one example, the MPPHMs can be used in Mitsunobu reactions and variants thereof. The Mitsunobu reaction is a mild and effective method for the conversion of alcohols into a variety of functionalities through the formation of C—C, C—O, C—N and C—S bonds, including the ability to invert the stereochemistry of stereogenic carbinol-bearing centers. A formal "redox" reaction, the Mitsunobu reaction is promoted under relatively mild conditions by a combination of a tertiary phosphine, usually triphenylphosphine (PPh$_3$) and an azodicarboxylate, usually diethyl or diisopropyl ester (DEAD or DIAD). Such is the scope of the Mitsunobu reaction, its application has played a pivotal role in the synthesis of natural products and bioactive small molecules. Despite these powerful attributes, the Mitsunobu reaction suffers from the need for tedious purifications to isolate the desired product, an operational disadvantage in both high-throughput chemistry and natural product synthesis. Now, however, the MPPHMs can facilitate purification.

The MPPHMs can be configured as "high capacity loaded NP's". While the click approach is known to functionalize nanoparticles, but loading of higher than 0.1 mmol/g have not been reached. In general, this is the loading also reached by others doing functionalization of nanoparticles. Bringing a norbornene onto the NP surface (does not matter that it is done via an azide/alkyne reaction) and then do a living polymerization on the nanoparticle surface with a functionalized norbornene (i.e. catalyst, reagent), and there is no precedent for this process.

In one embodiment, the MPPHM can be used in a hydrogenation and/or hydroformylation industrial processes In one embodiment, the MPPHM can include the functional group thereof bound to a biomolecule. In another embodiment, the MPPHM can include the functional group bound to a sensor.

The present invention is advantageous over the art due to the reaction process to make the MPPHM by using ROMP to prepare the MPPHM from the particle and functionalized monomers. This is a distinct advantage over the art that first attaches a polymer to a nanoparticle and then functionalizes the polymer, which has the general problem of attempting to functionalize a heterogeneous moiety. In contrast, the present invention uses well-defined homogeneous norbornene-tagged nanoparticles and functionalized monomers, which then get attached to the nanoparticle via a living polymerization starting on the nanoparticle. Such an ability to prepare the MPPHM is surprising and unexpected because it is not obvious that this reaction protocol would have successfully provided the MPPHMs described herein. The preparation of the MPPHMs includes a living polymerization on a heterogeneous nanoparticle. Potential problems could have been cross-linking of nanoparticles, polymerization of the monomers outside of the nanoparticle in solution, and many other possible problems.

Utilizing surface-initiated ROMP, a Co/C-immobilized, recyclable palladium catalyst was generated possessing a load of 0.48 mmol Pd/g, which is described in more detail below. Initially an Nb-tagged triphenylphoshine monomer was prepared and immobilized onto highly magnetic Co/C nanoparticles, where the particle surface had been modified with norbornenes via "click" attachment. The Co/C nanoparticles (0.1 mmol/g) where armed to generate the CAS, followed by the addition of the monomer (50 equiv.) generating an immobilized ROMP-derived triphenyl phosphine ligand possessing increased load (1.1 mmol/g). In a single step the Co/C-OTPP ligand having 50 monomers was utilized to generate the corresponding Co/C immobilized palladium catalyst possessing a load of 0.48 mmol/g. That is 0.48 mmol of Pd per gram. The Co/C-OTPP-Pd hybrid material was successfully utilized for the generation of biaryl compounds via a Suzuki-Miyaura reaction, where the catalyst was recycled and used 6 times without significant loss in activity. See Schemes 1 and 2 below and the corresponding experimental discussion.

Utilizing a pyrene-tagged NHC ligand, a recyclable Co/C, immobilized Pd catalyst was prepared utilizing a reversible immobilization protocol that provides noncovalent grafting via π-π stacking interactions. This immobilized Co/C-NHC-Pd catalyst was useful for the hydroxycarbonylation of aryl halides under an atmospheric pressure of carbon monoxide was achieved yielding the desired compounds in high yield.

The reaction protocols for preparing the MPPHMs described herein can generally include "click" and "ROMP" chemistries. Also, the synthesis can include a Staudinger ligation in order to couple a first functionalized norbornene reagent with the azide.

The ROMP reactions that form the MPPHM as shown in the formulae can be conducted with catalysts. Examples of some of the catalysts that can facilitate ROMP reactions with the norbornenyl-tagged reagents can include cat-A, cat-B, cat-C, cat-D, and cat-E as shown below. Particular catalyzed ROMP reactions are provided in the Experimental section below.

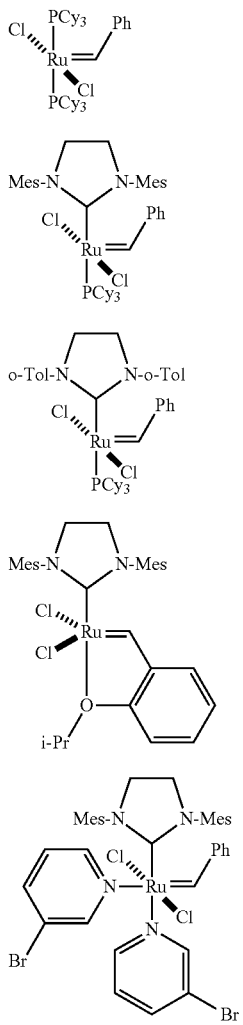

cat-A cat-B cat-C cat-D cat-E

Generally, the preparation of a MPPHM described herein can be conducted by: (a) providing a magnetic nanoparticle; (b) attaching a first functionalized norbornene substance to the magnetic nanoparticle; and (c) coupling a second functionalized norbornene substance to the first functionalized norbornene substance by reacting the first and second norbornene substances to form a norbornene reaction product. Step (a) can be conducted by providing the magnetic nanoparticle with a reactive azide or reacting the nanoparticle with a reagent that results in the magnetic particle having the reactive azide. Step (b) can be conducted using "click" chemistry or Staudinger ligation. Step (b) can also be conducted by providing a reagent that has a norbornene group that also includes a moiety that can react with the reactive azide so as to form a triazole. Step (c) can be conducted using ROMP chemistry techniques. The ROMP chemistry can include the use of a catalyst, such as cat-A, cat-B, cat-C, cat-D, or cat-E.

Step (c) can also be conducted by providing a reagent that includes a norbornene group as well as a functional group that can bind with a substance as described herein. The ROMP chemistry can be conducted by reacting the norbornenes together to link to the particle through the triazole linker and to also form the bonds between the monomers.

In one embodiment, the reagent having the norbornene group that reacts with the reactive azide also includes a pyrene. This reagent can be coupled to the particle through pi-stacking The azide-containing reagent may also include a pyrene. Also, the reagent having the reactive azide can be coupled to the particle through pi-stacking The MPPHM can also be used as a scavenger for metals. When the metal is a catalyst, the MPPHM can bind the metal to form a usable catalyst. As such, the preparation thereof can include: providing a MPPHM having a plurality of monomers with functional groups configured to bind with a metal; and introducing the MPPHM to the metal. The binding to the metal can be conducted with various types of metals, such as those described herein, with catalytic metals being an example.

In one embodiment, a method of cross-coupling that can include: providing a phenylhalide; providing a phenylboronic acid; providing a magnetic nanoparticle complex; and catalyzing a reaction between the phenylhalide and the phenylboronic acid with the magnetic nanoparticle complex. Cross-coupling can be performed to obtain a MPPHM gel material. Cross-coupling can be avoided so that the particles are not cross-coupled by performing the reaction in a controlled setting to avoid cross reactions, which is described below.

EXPERIMENTAL

Figure 4:
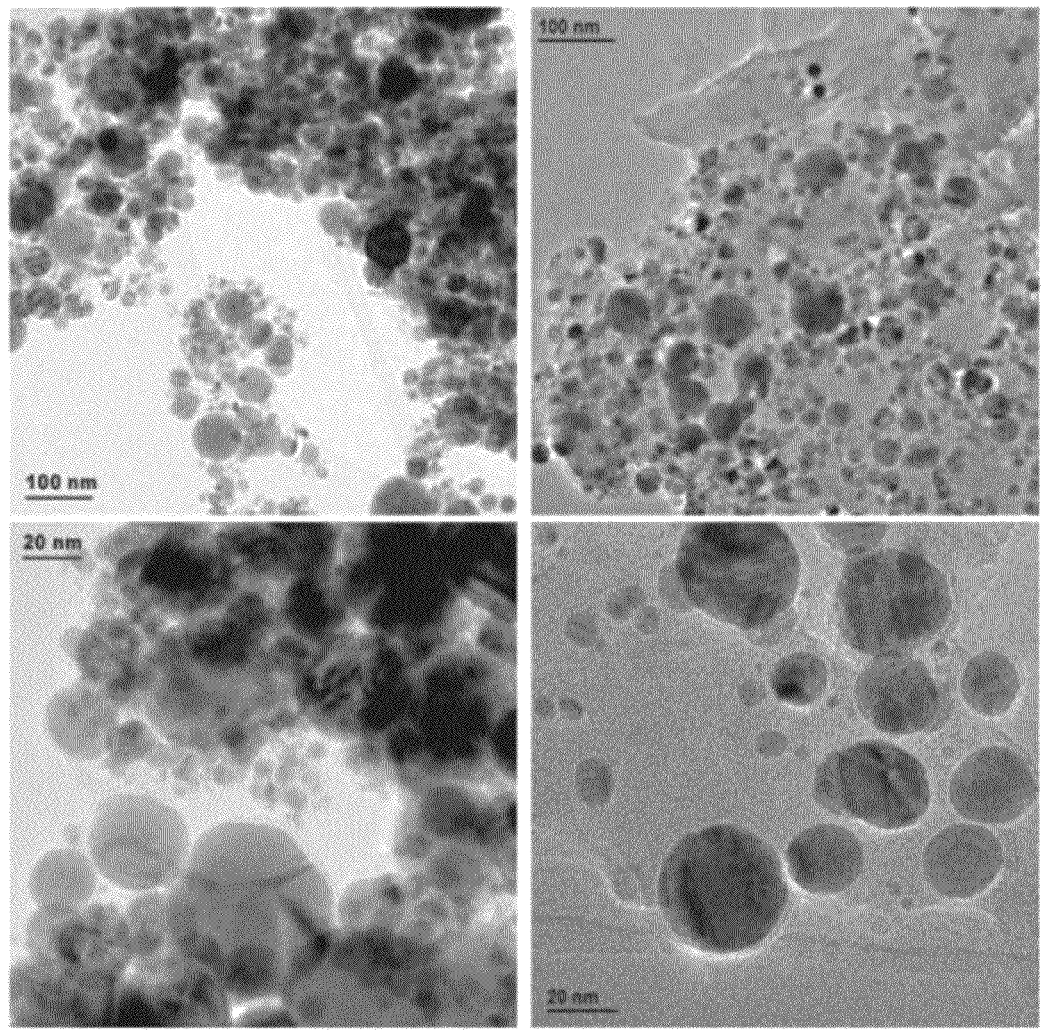
FIG. 4 includes TEM images of Co/C nanoparticles (left panels) and Co/C-ROMPgel (Compound 7) (right panel), with the bar size being 100 nm for the top panels and 20 nm for the bottom panels.

Section 1 cheme 1 provided herein illustrates a method of preparing a MPPHM that includes Z—OTPP. A Co nanoparticle (Nanoparticle 1) is provided and then functionalized so as to have a reactive azide group by using a copper(I)-catalyzed alkyne/azide cycloaddition (CuAAC) reaction ("click" reaction) to graft propargylated norbornene derivative (Compound 3) onto azide functionalized Co/C nanoparticles (Compound 2) (Scheme 1). The synthesis of the azide-tagged particles was achieved in a concise two-step reaction based on covalent attachment of diazonium compounds on the graphene layers. An azide-loading of 0.1 mmol g$^{-1}$ was thus obtained as determined by elemental microanalysis. The immobilized alkene (Compound 3) was used as a means of loading triphenylphosphine-functionalized norbornenes (Compound 6) onto the nanoparticle surface. Briefly, a closed microwave vessel containing alkene modified Co/C nanoparticles (Compound 4) was placed in a tempered (60° C.) ultrasound bath and the nanopowder was dispersed in degassed CH$_2$Cl$_2$ via sonication under an inert atmosphere (argon). A solution of Ru-complex 5 (1.0 equiv. with respect to Co/C-immobilized alkene (Compound 4), 2 mol % with respect to PPh$_3$-norbornene derivative (Compound 6) was added to generate a ruthenium carbene species on the nanoparticle surface by ring-opening metathesis with the norbomene units in Compound 4. ROM polymerization was then carried out by adding Compound 6 under conditions otherwise suitable for the formation of a 50 mer. During the course of the reaction, a voluminous, black gel was formed, leaving only little residual solvent. Assuming that all Co/C-nanoparticles were coated with the available amount of oligomer, one would expect a Co-content of approximately 33% in the resulting hybrid material, a value which was confirmed by elemental microanalysis. TEM images affirmed that the Co/C-particles were embedded in a polymer matrix, thus "diluting" the otherwise densely packed clusters, a characteristic associated with the high magnetic potential of the metal cores (FIG. 4). Also, no evidence of cross linking was observed in agreement with earlier studies in which metathesis between an immobilized norbornene derivative and dissolved olefins was carried out.

To ensure that the polymer did not only encapsulate the nanomagnets but was covalently attached to the carbon shell, a control experiment was conducted utilizing azide-functionalized Co/C nanoparticles (Compound 2) instead of alkene-modified particles (Compound 4). In contrast to the previous observation, no gel was formed and the nano-particles precipitated after the ROM polymerization while the oligomer remained in solution until precipitated from MeOH. The swelling behavior of the Co/C-ROMPgel was found to be in line with the general properties of ROMPgels, showing a pronounced volume increase in THF and $CH_2Cl_2$ whereas solvents such as MeOH or $Et_2O$ did not provoke a significant effect.

Scheme 1

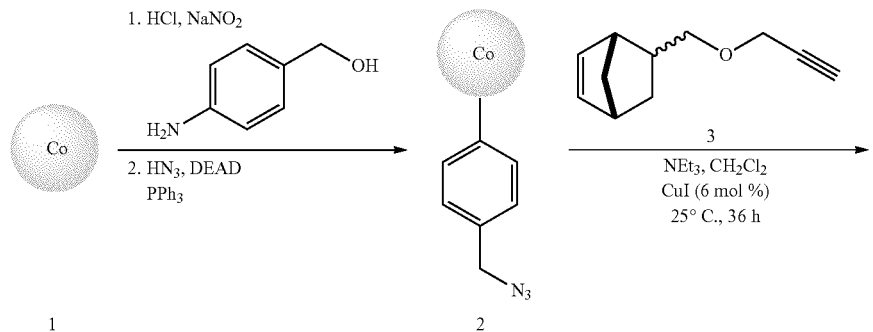

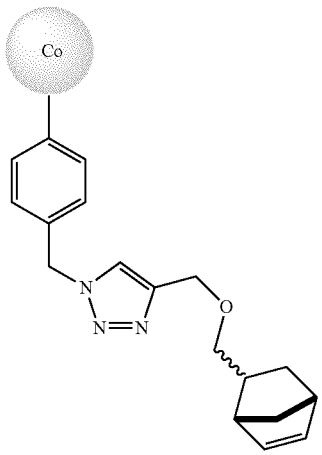

4

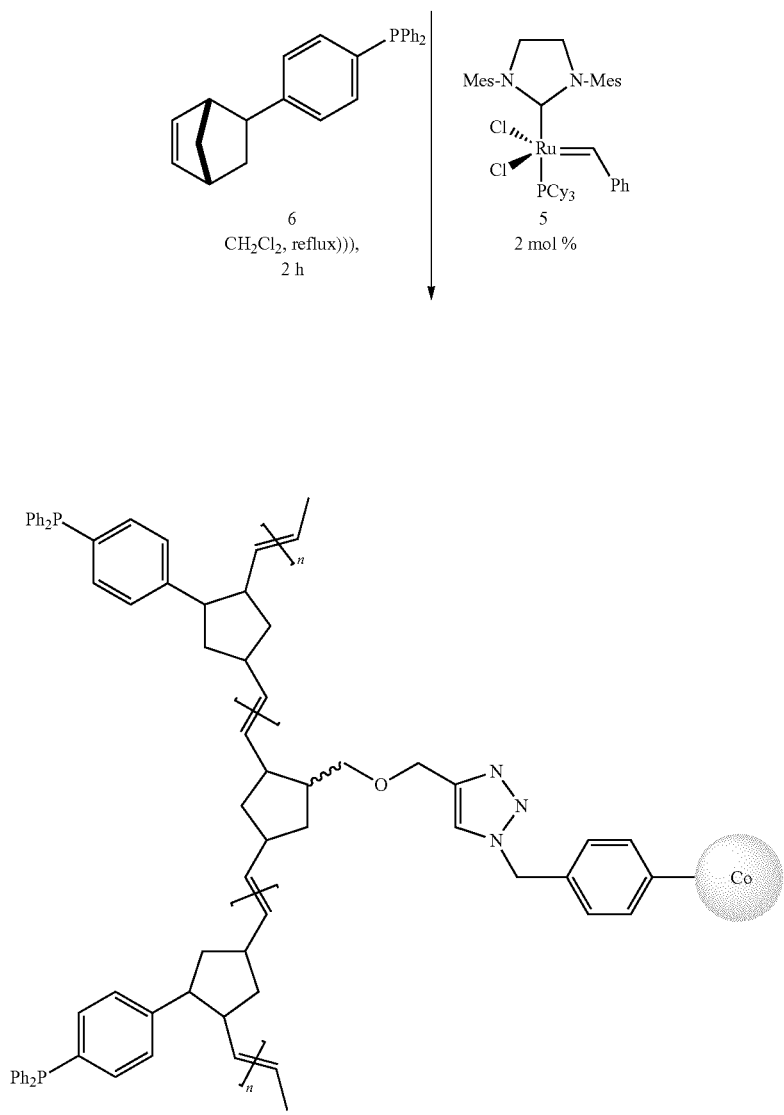

Figure 5B:
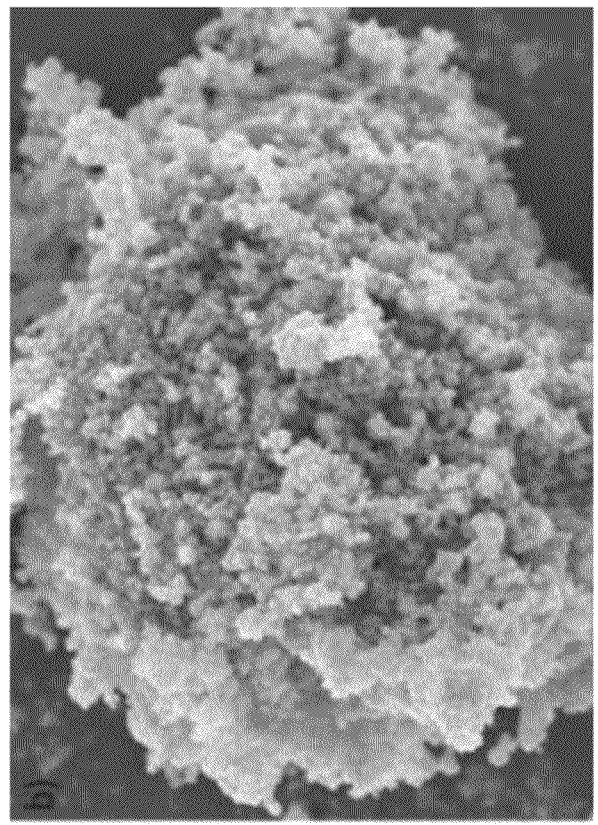
FIGS. 5A-5C include SEM images of a ROMPgel (FIG. 5A; bar size 2 um), Co/C nanoparticles (FIG. 5B; bar size 1 um), and Co/C-ROMPgel (Compound 7) FIG. 5C; bar size 10 um.
Figure 5A:
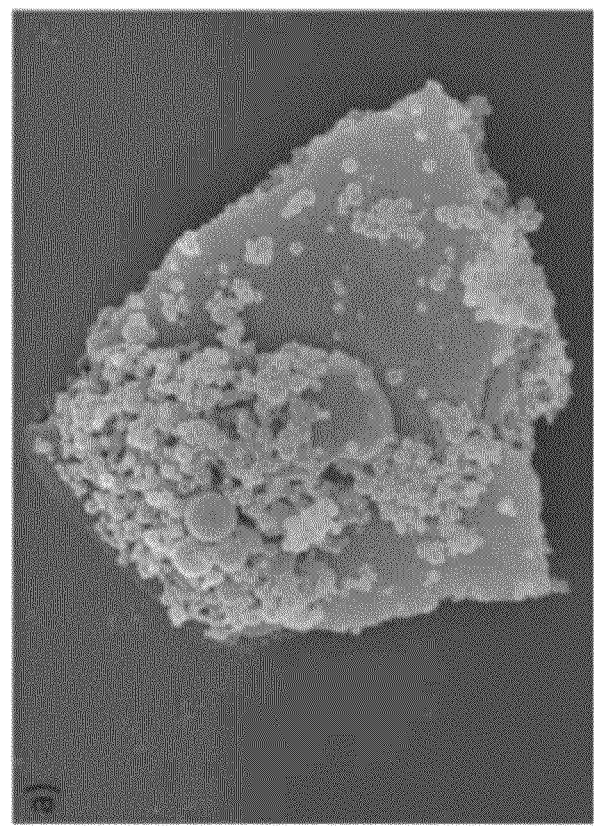
Figure 5D:
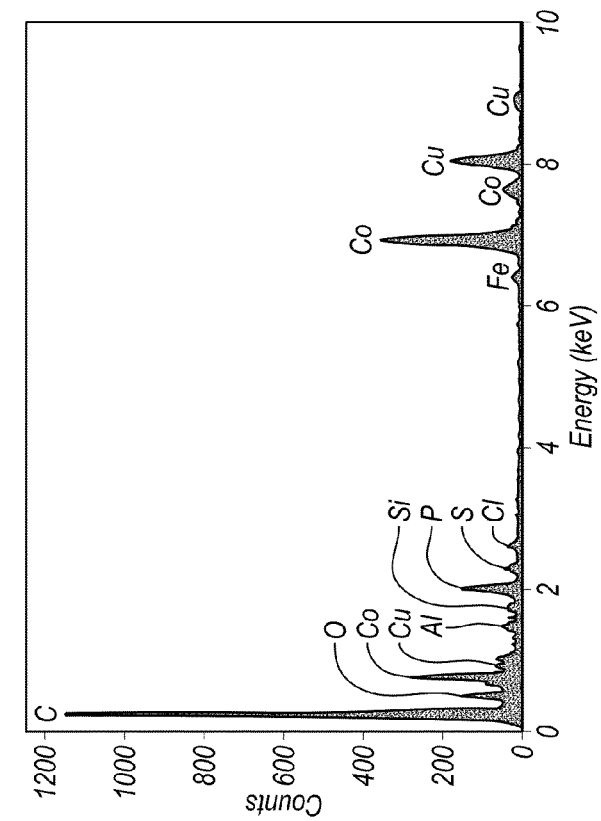
FIG. 5D includes a EDX spectrum graph of Co/C-ROMPgel (Compound 7)
Figure 5C:
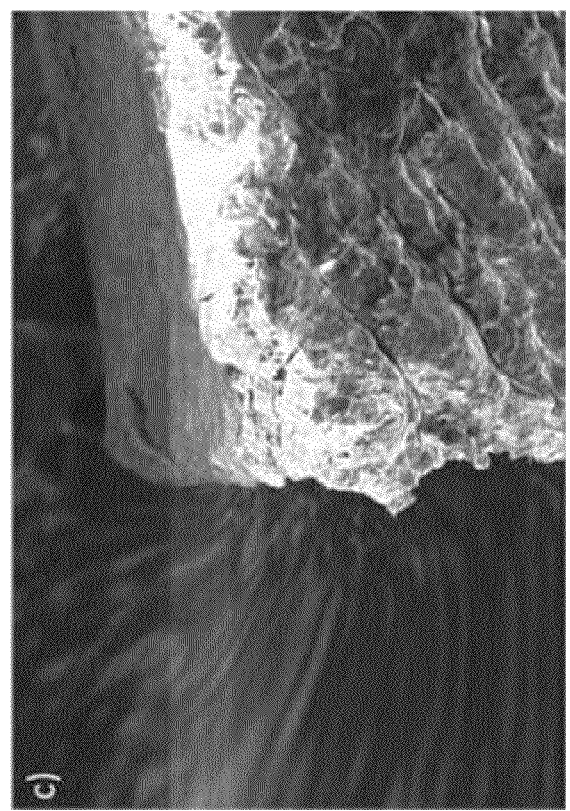

The morphology of the composite was clearly distinct from both parent materials as observed in scanning electron micrographs (SEM, FIGS. 5A-5C). To this end, the aforementioned ROMP oligomer obtained from polymerization in the presence of azide-functionalized Co/C nanoparticles (Compound 2) rather than Compound 4 was analyzed next to unmodified Co/C-nanoparticles (Particle 1). In addition, the specimen was coated with a silver dispersion prior to deposition of Co/C-ROMPgel 7 to prevent the accumulation of static electric charge on the sample and to display its inherent magnetic field (FIG. 5C). Energy dispersive X-ray (EDX) confirmed the presence of phosphor in the hybrid material (FIG. 5D). The fraction of phosphor was assessed via elemental microanalysis (3.45%), corresponding to 1.1 mmol/g P-loading. Hence, approximately 30% of the hybrid material consists of triphenylphosphine (TPP). The immobilized TPP was expected to provide the nanocomposite with the ability to serve as a magnetically responsive separable reagent/scavenging agent or ligand. The TPP of Compound 7 can be used for formation of a recyclable palladium complex (Compound 8).

Several examples of palladium complexes anchored on different magnetic iron oxide nanoparticles have been reported in the past years. However, highly functionalized architectures that relied on stabilized ferrite cores were naturally less susceptible to magnetic separation. The present invention thereby provides an improvement over the prior art by maintaining high magnetic responsiveness.

Doping of such matrices with palladium, an objective that is typically achieved by mixing a metal source together with the ligand-functionalized scaffold (Scheme 2), is prone to further diminish the mass magnetization. Scheme 2 illustrates formation of a heterogeneous palladium-complex on PPH3-functionalized Co/C-ROMPgel 7. The Pd-content assessed by AAS was 0.48 mmol/g.

Scheme 2

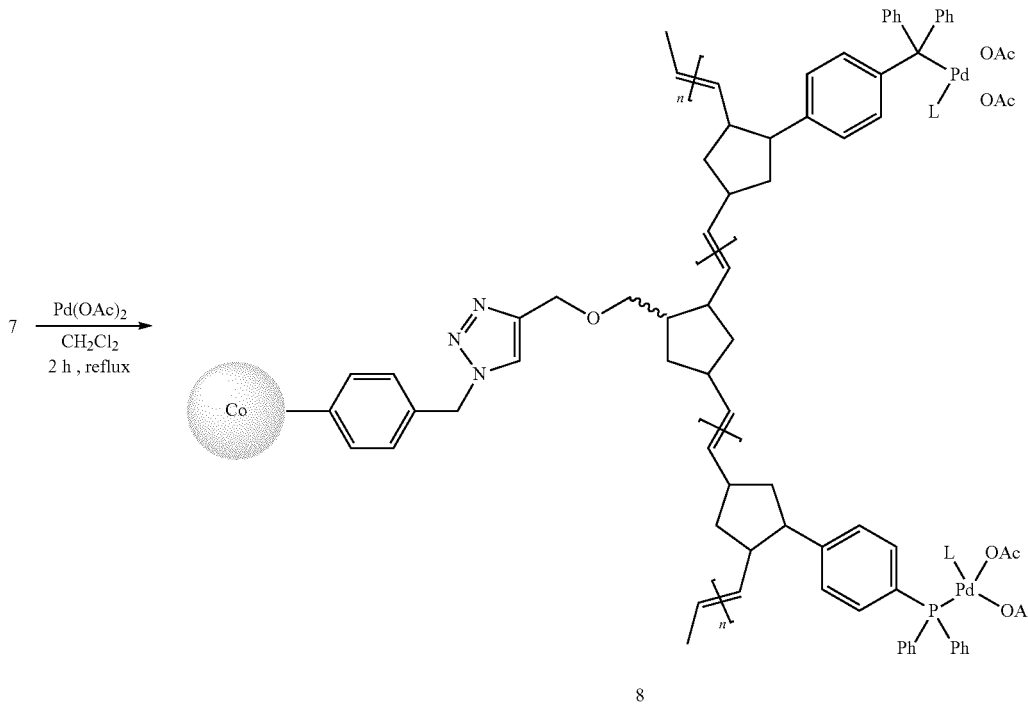

Figure 6:
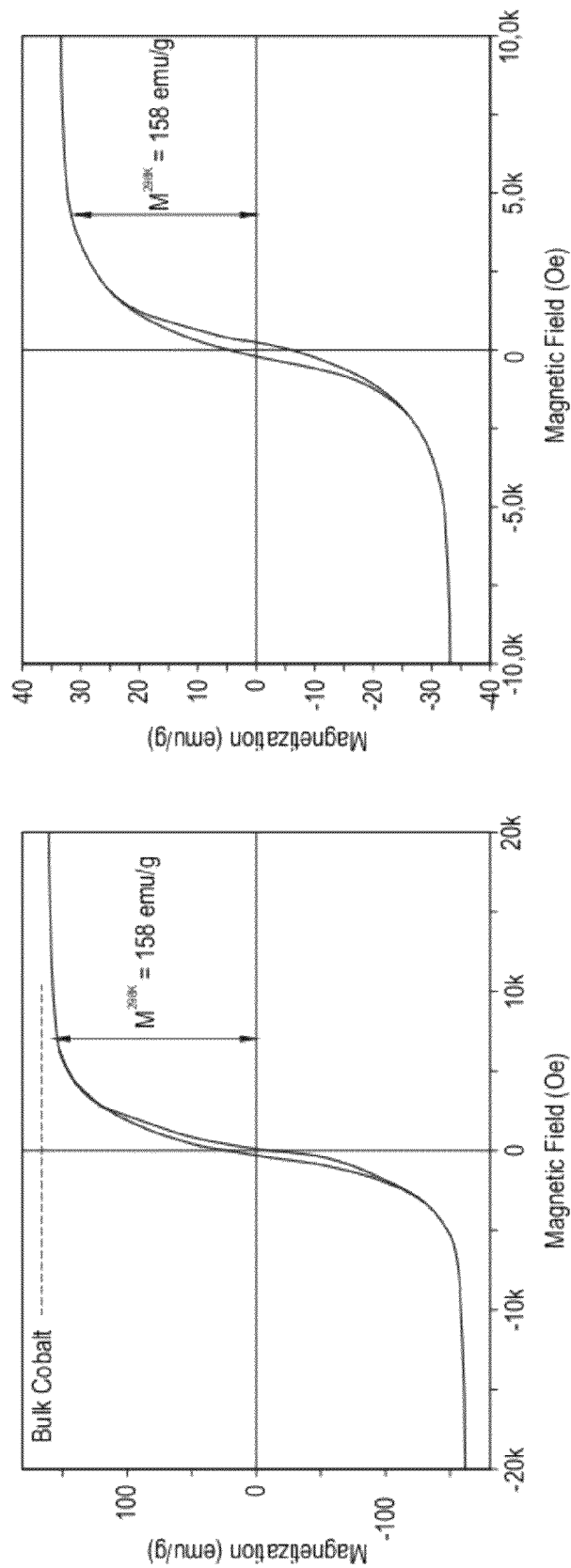
FIG. 6 includes magnetization curves for Co/C nanoparticles (Particle 1) (left graph) and for Co/C-ROMPgel-Pd (Catalyst 8) (right graph), obtained by VSM at room temperature, where saturation magnetization of the Co/C nanoparticles was close to bulk Co (158 emu/g), where the Co/C-ROMPgel (Compound 7) reached 34 emu/g.

FIG. 6 highlights the magnetization of Catalyst 8, which was measured via vibrating sample magnetometer (VSM) and found to be 34 emu/g, a value consistent with the mass percentage of ferromagnetic cobalt in the sample. This level is comparable to surfactant stabilized SPIONs, however, polymer or silica coated iron oxide NPs, materials, which resemble Catalyst 8 in terms of durability, exhibit significantly lower magnetization.

To examine the catalytic efficacy of Pd-catalyst (Compound 8), we subjected it to several consecutive Suzuki Miyaura cross-coupling reactions of aryl halides with phenylboronic acids (Table 1), a reaction that has been used as benchmark for palladium nanocatalysts. As it is common in such reactions, iodides were transformed more rapidly than bromides or chlorides, hence, good to very good yields were achieved for a number of phenylboronic acids when iodobenzene was chosen as substrate (entries 1, 3, 4, and 6).

TABLE 1

Iterative Suzuki-Miyaura cross-coupling reactions between phenylhalides 9 and phenyl boronic acids 10 catalyzed by recyclable Co/C-ROMPgel immobilized Pd-complex 8

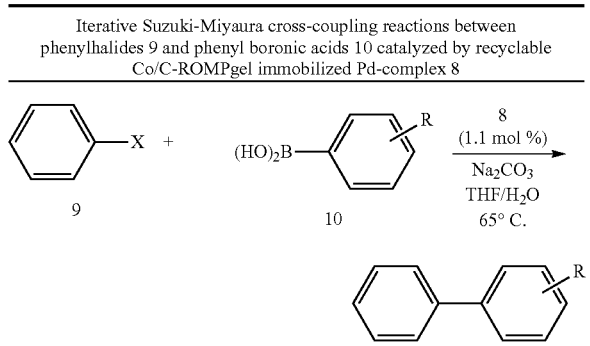

TABLE 1-continued

| entry | run | X  | R     | time(h) | yield (%) [b] |
|-------|-----|----|-------|---------|---------------|
| 1     | 1   | I  | H     | 2       | 96            |
| 2     | 2   | Cl | H     | 6       | 38            |
| 3     | 3   | I  | 2-Br  | 2       | 95            |
| 4     | 4   | I  | 2-Me  | 2       | 90            |
| 5     | 5   | Br | H     | 12      | 92            |
| 6     | 6   | I  | 4-tBu | 4       | 86            |
| 7     | 7   | I  | H     | 4       | 90            |

[a] Reagents and conditions: Phenylhalide (0.5 mmol), phenylboronic acid (0.55 mmol), $Na_2CO_3$ (1.5 mmol), 1.1 mol % catalyst 8, 65° C. solvent: 3 mL THF/$H_2O$ (1:2, v/v).
[b] Yields of isolated products.

To ensure that the immobilized Pd-complex represents the catalytic active species rather than free metal that is dissociated from the polymer bound ligand under reaction conditions (65° C.) and leaching into the homogeneous phase, we designed the following control experiment: A mixture of Catalyst 8, sodium carbonate and THF/water mixture at given ratios (Table 1) was stirred at the reaction temperature for 2 hours. Subsequently, Catalyst 8 was retracted with the aid of an external magnet and the hot supernatant was transferred into a new vessel before phenylboronic acid (Compound 10) and phenyliodide (Compound 9) were added to the solution. After further 2 hours of stirring at 65° C., no conversion of reactants into biphenyl (Compound 11) was detected by $^1$H NMR. Thus, it appeared that no significant contribution to the efficacy of the catalytic system originated from dissolved palladium-species. In addition, AAS-analysis of the aqueous layer revealed a rather insignificant Pd-content (1.9 ppm). The performance of this novel hybrid catalyst was comparable to results obtained elsewhere with Pd-phosphine-complexes grafted on heterogeneous supports comprising e.g. different polymers or nanoparticles. Importantly, Catalyst 8 was quantitatively recovered after each reaction and reused in the next run, proving the suitability of the new Co/C-ROMP-gel as a high capacity support that can be readily recovered by magnetic separation.

The immanent advantage of Co/C-ROMPgel (Compound 7) as a novel hybrid material, e.g. for catalyst immobilization, lies in the combined advantage of high loading ROMP technology and the ease of recycling via magnetic decantation that is provided by the ferromagnetic metal core nanoparticles. The remarkable chemical and thermal stability of the graphene layers surrounding the nanoparticles ranks with the durability of the polymer itself. This composite might be suited as alternative to assemblies that rely on iron oxides as magnetic core material.

General Procedures and Reagents

All air and moisture sensitive reactions were carried out in flame- or oven-dried glassware under argon atmosphere using standard gastight syringes, canellas, and septa. THF, $CH_2Cl_2$ and toluene were purified by passage through a Solv-Tek purification system employing activated $Al_2O_3$ and degassed with argon. Flash column chromatography was performed with $SiO_2$ (Sorbent Technologies 30930M-25, Silica Gel 60 A, 40-63 pm). Thin layer chromatography was performed on silica gel 60F 254 plates. Visualization of TLC spots was effected using $KMnO_4$ stain. 1H and 13C NMR spectra were recorded on a Bruker DRX-400 NMR spectrometer operating at 400 and 100 MHz respectively. The nanoparticles were analyzed by FTIR spectroscopy (1% in KBr using a Tensor 27 Spectrometer, Bruker Optics equipped with a diffuse reflectance accessory, DiffusIR, Pike Technologies), atom absorption spectroscopy (Varian SpectrAA 220FS), elemental microanalysis (LECO CHN-900), transmission electron microscopy (CM30 ST-Philips, LaBs cathode, operated at 300 kV point resolution ~4 A), scanning electron microscopy (Hitachi S-2700 equipped with a quartz PCI digital capture) and magnetic hysteresis susceptibility (vibrating sample magnetometer, VSM, Princeton Measurements Corporation, model 3900). The synthesis of carbon coated cobalt nanoparticles 1 and (4-exo-(bicyclo[2.2.11hept5-en-2-yl)phenyl) diphenylphosphine (Compound 6) was conducted as known in the art. The nanomagnets were azide-functionalized according to literature precedents. All other commercially available compounds were used as received. Second generation Grubbs catalyst 5 was provided by Materia Inc. and used without further purification. Deuterated solvents were purchased from Cambridge Isotope laboratories.

Norbornene-Functionalized Co/C-Nanoparticles (Compound 4)

The azide-tagged carbon coated cobalt nanobeads (Compound 2) (400 mg; 0.1 mmol azide-loading) were suspended in degassed toluene (3 mL) by the use of an ultrasonic bath (Sonorex RK 255 H—R, Bandelin) before 5-((prop-2-yn-1-yloxy) methyl)bicyclo[2.2.11hept-2-ene3 (130 mg, 0.8 mmol), triethylamine (20 microL (uL), 0.12 mmol) and Cu(I) (5 mg, 0.03 mmol) were added. The resulting slurry was sonicated for 48 hours at ambient temperature under an argon atmosphere. The nanobeads were recovered from the reaction mixture with the aid of a neodymium based magnet (N48, W-12-N, Webcraft GmbH, side length 12 mm) and washed with toluene (6×5 mL). Each washing step consisted of suspending the particles in the solvent, ultrasonication (5 minutes) and retracting the particles from the solvent by the aid of the magnet. After the last washing step the particles were dried in vacuo to yield 430 mg of 4. IR (v/cm$^{-1}$): 2928, 2817, 2097, 1693, 1598, 1505, 1404, 1377, 1253, 1214, 1175, 1096, 1013, 824, 71681; elemental microanalysis: 13.57% C, 0.69% H, 1.18% N.

$PPh_3$-Functionalized Co/C-ROMPgel (Compound 7)

Briefly, 200 mg of norbornene functionalized Co/C-nanoparticles (Compound 4) were dispersed in $CH_2Cl_2$ (2 mL) by sonication in a sealed microwave reaction vessel under argon atmosphere (30 minutes). A solution of Grubbs II catalyst (17 mg, 0.02 mmol) in $CH_2Cl_2$ (1 mL) was injected and the ultrasound bath tempered to 60° C. while sonication of the reaction mixture continued (30 minutes). (4-exo-(bicyclo [2.2.1]hept-5-en-2-yl)phenyl)diphenylphosphine6 (353 mg, 1.0 mmol) was added and the dispersion was subjected to sonication at 60° C. for 2 hours. Within 50 minutes the formation of voluminous black gel was observed. After 2 hours the reaction was quenched and a single, jellylike lump was removed from the reaction vessel, crushed and dried in vacuo to yield 490 mg of Compound 7. IR (v/cm$^{-1}$): 2929, 2859, 1644, 1584, 1475, 1432, 1400, 1303, 1259, 1177, 1089, 1064, 962, 894, 852, 760, 691, 655; elemental microanalysis: 55.95% C; 4.59% H, 0.47% N, 3.45% P.

Pd-$PPh_3$-Functionalized Co/C-ROMPgel (Catalyst 8)

Briefly, 200 mg of $PPh_3$-functionalized Co/C-ROMPgel (Compound 7) was allowed to swell in $CH_2Cl_2$ (2 mL) under sonication at 60° C. under an atmosphere of argon (30 minutes) before Pd(OAc)$_2$ (40 mg, 0.18 mmol) was added to the reaction vessel. Sonication was maintained for additional 2 hours before the magnetic ROMPgel was isolated from the reaction mixture by the aid of an external magnet and dried in vacuo to yield 212 mg of Catalyst 8. IR (v/cm$^{-1}$): 2982, 2360, 2155, 1053, 1033, 1014, 696, 674, 664, 652; elemental microanalysis: 49.23% C; 4.06% H; 0.43% N. MS analysis: 57.3 mg nanoparticles of Catalyst 8 were extracted with 10 ml $HNO_3$, the sample was further diluted with water (1:100) and subjected to AAS to reveal a palladium content of 0.48 mmol palladium per gram nanoparticle of Catalyst 8.

The foregoing illustrates a reaction scheme may produce one or more particles per polymer. However, the protocol can be performed by activating the surface of the particle first with a catalyst, and then adding the monomer to the activated particle so that there is control in the way the ROMP reaction proceeds. This controls the reaction so that there can be only one particle attached to any given polymer strand, and the particle can include a plurality of polymer strands. This protocol avoids cross-coupling so that the particles are not cross-coupled and each particle has individual polymers that do not also couple other particles. Such MPPHMs are shown in Formula 3.

Additionally, the reaction protocol can me modulated in order to produce MPPHMs with saturated polymeric backbones, as shown in Formula 3A. Formula 3 also can cover the saturated backbone when defined as such. The reaction protocol can include a diimide reduction or other process to hydrogenate the double bounds and saturate the polymeric backbone.

Section 2

The intramolecular Mitsunobu reaction has been widely utilized as a cyclization protocol for the synthesis of heterocyclic molecules as known in the art. Accordingly, the synthesis of benzofused thiadiazepine-dioxides via an intramolecular 7-membered MoM Mitsunobu cyclization reaction has been conducted; whereby facile purification was achieved utilizing ROMP sequestration initiated by free metathesis catalyst or catalyst-armed particle surfaces (Scheme 3). Scheme 3 shows the synthesis of benzofused thiadiazepine-dioxides via an intramolecular MoM Mitsunobu cyclization.

Scheme 3

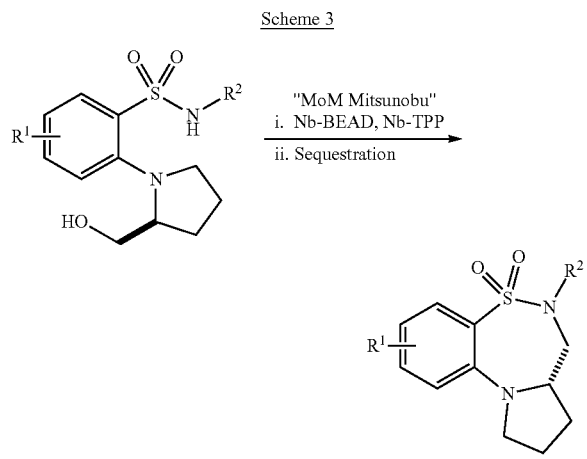

The synthesis of benzofused thiadiazepine-dioxides (Compounds 23a and 23b) was investigated utilizing the intramolecular MoM Mitsunobu cyclization with the readily prepared Nb-tagged $PPh_3$ (Nb-TPP) and DEAD (Nb-BEAD) reagents described herein. The corresponding hydroxy-benzylsulfonamide starting materials 22a and 22b were rapidly generated via a microwave-assisted $S_NAr$ protocol (Scheme 4) from Compounds 21a and 21b.

Scheme 4

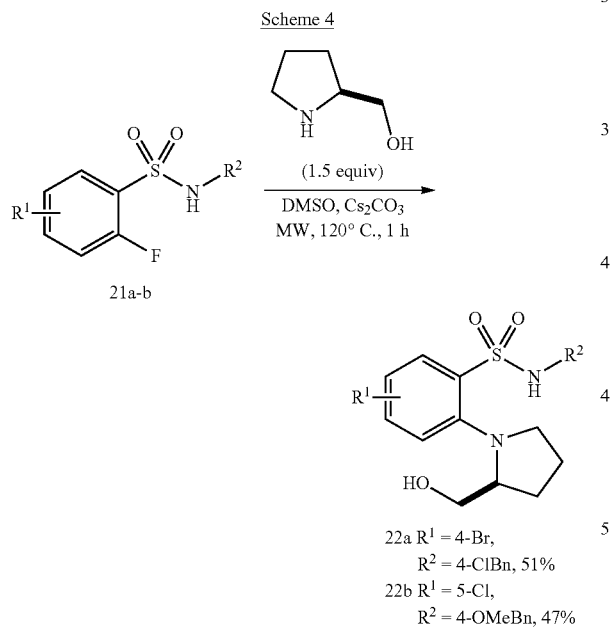

22a $R^1$ = 4-Br, $R^2$ = 4-ClBn, 51%
22b $R^1$ = 5-Cl, $R^2$ = 4-OMeBn, 47%

With sulfonamides 22a-b in hand, the application of MoM cyclization reaction was investigated utilizing Nb-TPP and Nb-BEAD (Table 2). Initially, purification was achieved by phase switching of all Nb-tagged species in solution (monomeric reagents- and spent reagents) by addition of free metathesis catalyst $RlMesH_2)(PCy_3)(Cl)_2Ru=CHPh$, cat-B] (Method A) to induce ROM polymerization. The ROM polymerization event was followed by precipitation to produce the desired benzofused thiadiazepine-dioxides 23a and 23b in good yield and excellent crude purity (Table 2, entries 1-2). Purification was followed by TLC analysis, whereby the typical Mitsunobu multi-spot crude reaction mixture was reduced to a single spot after utilizing this polymerization sequestration protocol. Despite this success, the need for precipitation of the crude reaction mixture to remove the polymerized reagents/spent reagents was deemed not ideal for a high-throughput approach. Therefore, alternative syntheses of benzofused thiadiazepine-dioxides 23a and 23b were investigated utilizing a catalyst-armed surface generated from either Nb-tagged Co/C magnetic particles [Method B] (Table 2, entries 3-4), or Nb-tagged Silica particles [Method C] (Table 2, entries 5-6).

Utilizing these two approaches with Co/C or Silica particles, 23a and 23b could be generated with simple filtration to isolate the desired product, avoiding the need for precipitation. Evaluation of either Si or Co/C catalyst-armed surfaces yielded the desired benzofused thiadiazepine dioxides 23a and 23b with comparable yield and crude purity (Table 2, entries 3-6). Building on these results, substrate scope was evaluated across all three purification sequestration protocols A-C for the synthesis of 23c-23n via MoM Mitsunobu cyclization (Scheme 5). Thus, benzofused thiadiazepine-dioxides 23c-23f were generated with free cat-B [Method A], compounds 23g-23j via Nb-tagged Co/C magnetic particles [Method B] and benzofused thiadiazepine-dioxides 23k-23n utilizing Nb-tagged silica particles [Method C]. However, all of these compounds 23c-n could be prepared using the MPPHM catalyst described herein, and the catalyst can be separated using magnetic fields.

TABLE 2

Intramolecular MoM Mitsunobu-Sequestration.

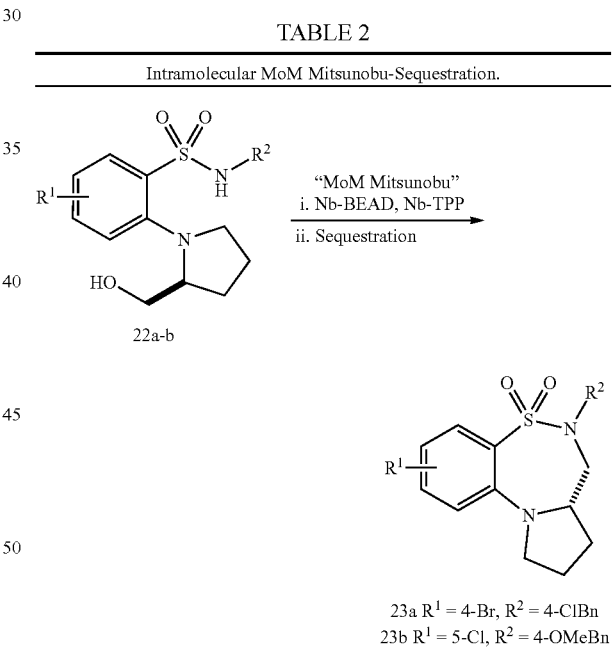

23a $R^1$ = 4-Br, $R^2$ = 4-ClBn
23b $R^1$ = 5-Cl, $R^2$ = 4-OMeBn

| Entry | Sequestration | Comp. | Method | Yield (%) | Crude Purity (%)[a] |
|---|---|---|---|---|---|
| 1[b] | Cat-B | 3a | A | 85 | >95% |
| 2[b] | Cat-B | 3b | A | 88 | >95% |
| 3[c] | Co/C Nb-tagged | 3a | B | 87 | >95% |
| 4[c] | Co/C Nb-tagged | 3b | B | 81 | >95% |
| 5[d] | Si Nb-Tagged | 3a | C | 89 | >95% |
| 6[d] | Si Nb-Tagged | 3b | C | 84 | >95% |

[a]Purity determined by $^1$H NMR.
[b]Isolated via precipitation in $Et_2O$.
[c]Isolated via filtration through Celite® SPE.
[d]Isolated via magnetic decantation and filtration through Silica SPE Scheme 5

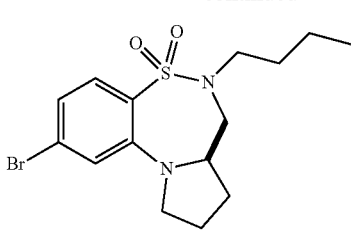

23m

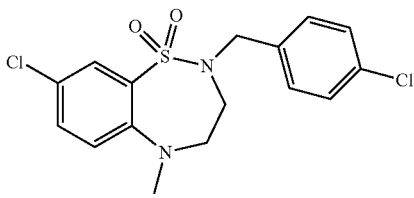

23n

Section 3

Monomer-on-monomer (MoM) Mitsunobu reactions can use norbornenyl-tagged (Nb-tagged) reagents that are rapidly sequestered post reaction using ROMP, which is initiated by any of three methods utilizing Grubbs catalyst cat-B: (i) free catalyst in solution, (ii) surface-initiated catalyst-armed silica, or (iii) surface-initiated catalyst-armed Co/C magnetic nanoparticles (Nps). With the norbornenyl-tagged PPh$_3$ (Nb-TPP) and DEAD (Nb—BEAD), their application in the Mitsunobu reaction utilizing a variety of benzoic acids and benzyl alcohols was studied (Table 3, entry 1-6). Utilizing 1.3 equivalents of both reagents, the desired esters were synthesized in good yield and purity without the need for standard chromatography.

Efficient purification was achieved by the phase switching of the Nb-tagged monomeric reagents/spent reagents by the application of ROM polymerization. This process transforms the Nb-monomeric reagents into a soluble oligomeric polymer, possessing a differential solubility profile to the desired products. Precipitation of the spent oligomer in Et$_2$O or MeOH, followed by filtration via a silica SPE yields the desired products in high crude purity. This purification protocol can be observed via TLC analysis, whereby a multi-spot crude reaction is purified to a single product spot utilizing the polymerization sequestration protocol. Building on these results, the MoM protocol was implemented efficiently for the esterification and stereoinversion of chiral, non-racemic secondary alcohols (Table 3, entries 9-12).

Investigations were directed toward sequestration of the functionalized Nb-monomers by polymerizing off a catalyst-armed immobilized surface. Sequestration in this manner would further optimize the MoM protocol by removing the need for precipitation and ultimately result in an overall more cost efficient and environmental friendly protocol. To this effect, the use of silica or carbon-coated cobalt (Co/C) nanoparticles bearing a norbornene moiety, was envisioned for the sequestration of excess/spent Nb-tagged reagents via surface-initiated ROM polymerization. Magnetic nanoparticles are increasingly being used as supports for immobilized catalysts in chromatography-free protocols, whereas Nb-tagged silica particles have been utilized to synthesize silica surface grafted polymer supports. Arming of the nanoparticle surface (1 equiv.) with cat-B (0.6-0.8 equiv.) for 30 minutes before the addition of the crude reaction mixture provided good results.

With the corresponding Nb-tagged silica and Nb-tagged Co/C in hand, the employment of the MoM Mitsunobu reaction utilizing catalyst-armed Si-particles (Table 4, entries 1-5) and Co/C Nps (Table 4, entries 6-11) was successfully achieved yielding the desired products in high crude purity. Purification when using Si-armed particles was minimized to a simple filtration of the crude reaction via a Celite® SPE. The application of Co/C magnetic Nps required simple application of an external magnet to the reaction vessel and decantation of the crude mixture.

TABLE 3

Mitsunobu Esterification Utilizing Nb-TPP and Nb-DEAD.

| entry | R$^1$ | R$^2$—OH | yield (%) | purity (%) |
|---|---|---|---|---|
| 1 | 4-NO$_2$ | 2-MeBnOH | 75 | >95 |
| 2 | 4-NO$_2$ | 3,5-OMeBnOH | 77 | >95 |
| 3 | 4-NO$_2$ | 3-Me-2-butene-1-ol | 78 | >95 |
| 4 | 2,4-Cl | 2-MeBnOH | 79 | >95 |
| 5 | 4-NO$_2$ | 4-ClBnOH | 84 | >95 |
| 6 | 4-NO$_2$ | 4-BrBnOH | 81 | >95 |
| 7 | 2-Me | 3-NMe$_2$BnOH | 81 | >95 |
| 8 | 3,4-Cl | 3-OMeBnOH | 91 | >95 |
| 9 | 4-NO$_2$ | (R)—MeCH(OH) CO$_2$Et | 74 | >95 |
| 10 | 2,6-Cl | (R)—MeCH(OH)CO$_2$Et | 71 | >95 |
| 11 | 3-NMe$_2$ | (R)—MeCH(OH) CO$_2$Et | 73 | >95 |
| 12 | 4-Cl | (R)—MeCH(OH) CO$_2$Et | 76 | >95 |

TABLE 4

MoM Mitsunobu Reaction utilizing Silica and Co/C nanoparticle sequestration.

| entry | R$^1$ | R$^2$ | yield (%) | crude purity (%)$^a$ |
|---|---|---|---|---|
| 1$^b$ | 4-NO$_2$ | 2-MeBn | 84 | >95 |
| 2$^b$ | 4-NO$_2$ | 3,5-OMeBn | 88 | >95 |
| 3$^b$ | 4-NO$_2$ | 4-BrBn | 82 | >95 |
| 4$^b$ | 4-NO$_2$ | 3-NMe$_2$Bn | 83 | >95 |
| 5$^b$ | 2-Me | 3,5-NMe$_2$Bn | 87 | >95 |
| 6$^c$ | 4-NO$_2$ | 4-ClBn | 84 | >95 |
| 7$^c$ | 4-NO$_2$ | 3,5-OMeBn | 88 | >95 |
| 8$^c$ | 4-NO$_2$ | 4-BrBn | 82 | >95 |
| 9$^c$ | 4-Cl | 3-NMe$_2$Bn | 83 | >95 |

TABLE 4-continued

MoM Mitsunobu Reaction utilizing Silica and Co/C nanoparticle sequestration.

i. Nb-BEAD
Nb-TPP
THF, 0° C.-rt
ii. Cat-B, DCM
Si—Nb or Ca/C—Nb
45° C., 2 h
iii. Et₂O, filter

| entry | R¹ | R² | yield (%) | crude purity (%)ᵃ |
|---|---|---|---|---|
| 10ᶜ | 2-Me | 3-NMe₂Bn | 87 | >95 |
| 11ᶜ | 3,4-Cl | 3,5-OMeBn | 93 | >95 |

Section 4

SEGPHOS is an important chiral ligand used in asymmetric synthesis. It was developed after BINAP and has a narrower dihedral angle between aromatic faces. This attribute increases the enantioselectivity and activity of SEGPHOS metal complexes as compared to BINAP. Being an important ligand in the field of chemistry there is a need to develop an immobilized version of the SEGPHOS ligand. The aim is to develop an immobilized SEGPHOS ligand which can make purification more facile and also to develop a protocol to make the ligand recyclable, which can be conducted via Scheme 6 or Scheme 7.

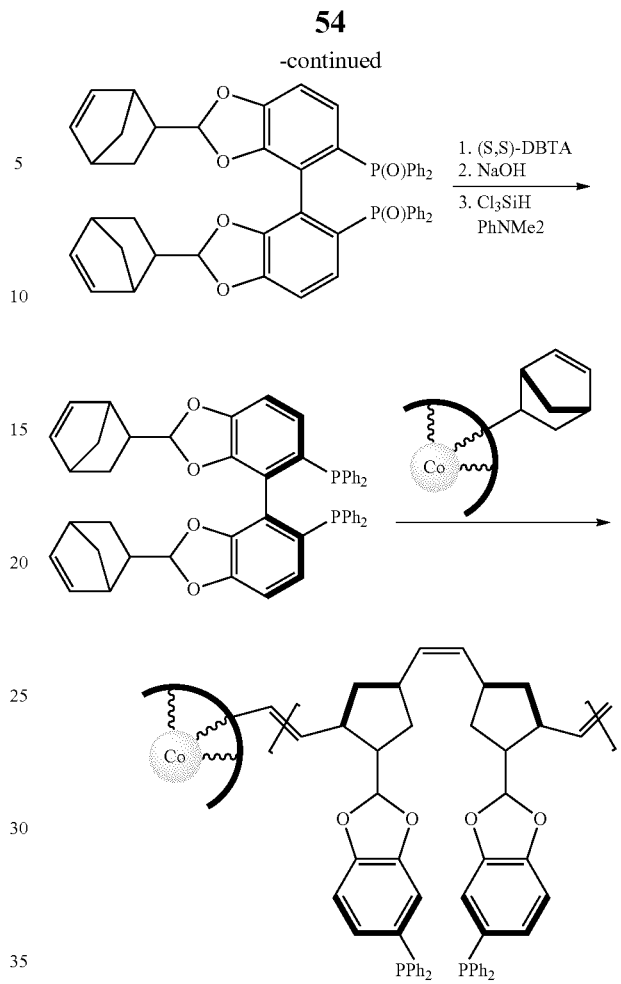

Scheme 6

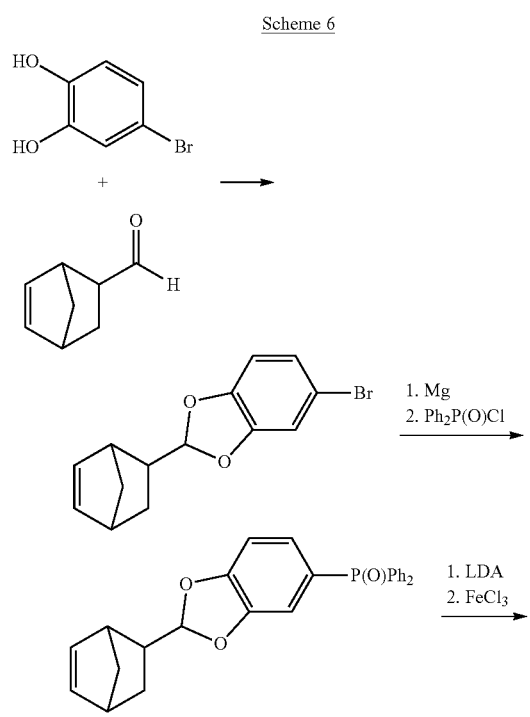

Scheme 7

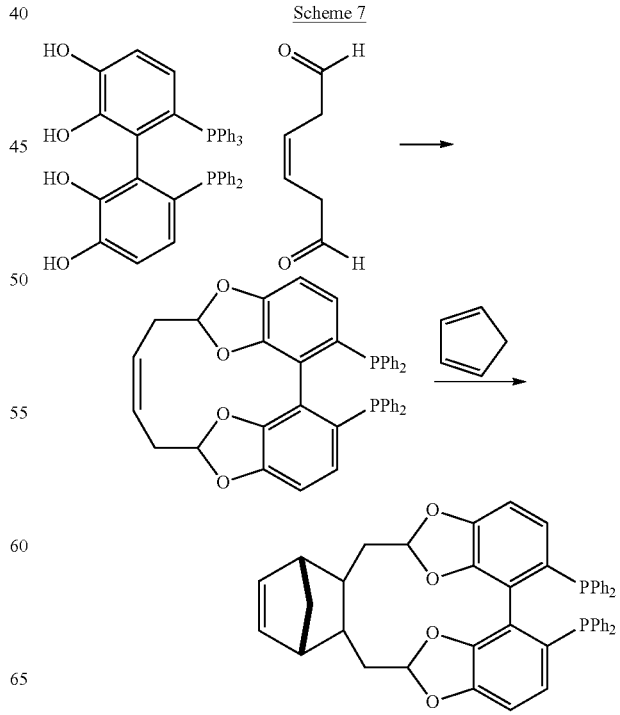

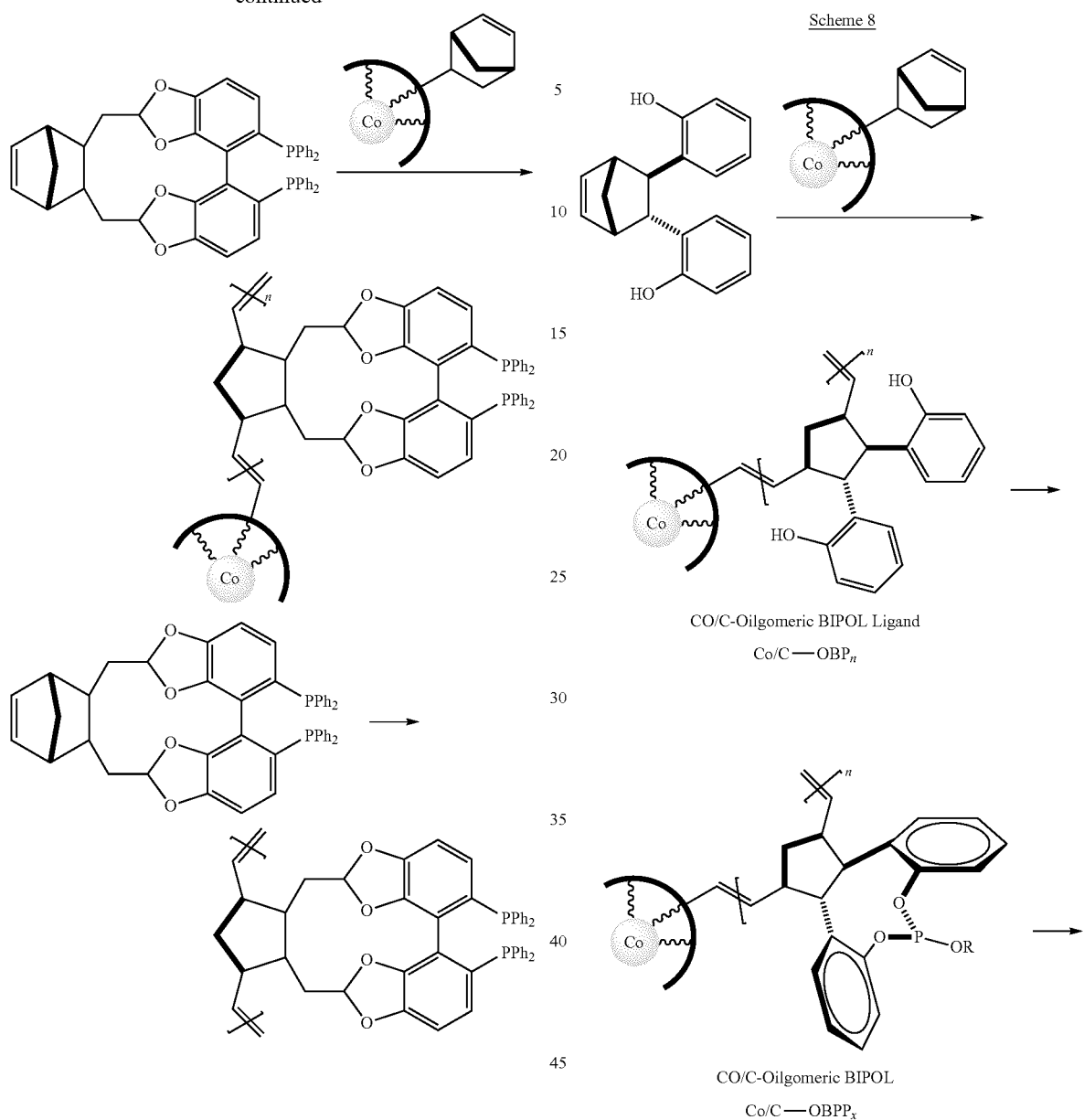

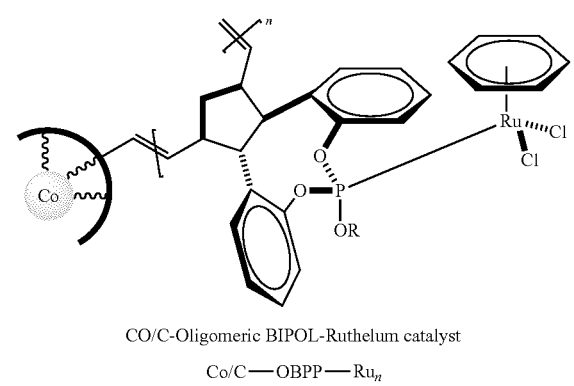

CO/C-Oilgomeric BIPOL Ligand

Co/C —— OBP$_n$

CO/C-Oilgomeric BIPOL

Co/C —— OBPP$_x$

CO/C-Oligomeric BIPOL-Ruthelum catalyst

Co/C —— OBPP —— Ru$_n$

Section 5

Phosphine ligands are one of the mostly widely used ligand systems for the generation of transition metal catalysts, which have shown scope in a number of transformations such as hydrogenation, hydroformylation, hetero-dimerization of a-olefins, asymmetric hydrovinylation, and kinetic resolution. The MPPHMs can be used for any of these processes. The generation of norbornenyl ligands (or precursors) followed by immobilization onto the magnetic surface via CAS surface-initiated ROMP can provide oligomeric phosphite ligands as shown in Schemes 8 and 9. Utilizing these immobilized ligand systems, a variety of transition metal catalysts (Rh, Ru, Pd) can be generated and evaluated against a variety of asymmetric and C—C, C—N and C—O bond forming transformations. Subsequent diversification with PCl$_3$ and ROH gives access to the desired immobilized phosphite ligand that can be used to generate a variety of catalyst systems.

Scheme 9

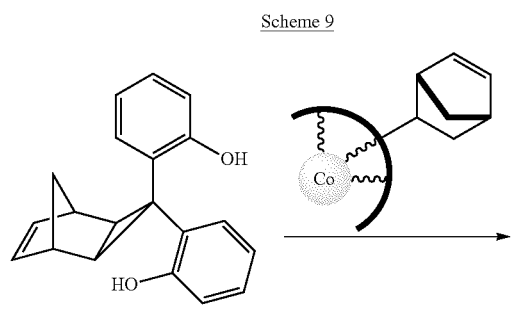

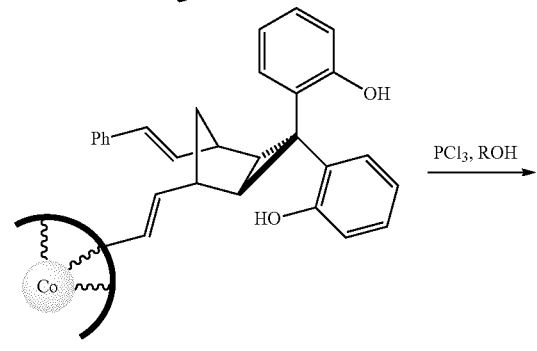

Co/C-Oligomeric BIPOL Ligand

Co/C—OBP$_n$

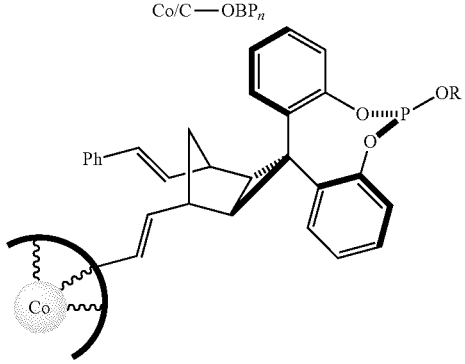

Co/C-Oligomeric BIPOL Phosphine Ligand

Co/C—OBPP$_x$

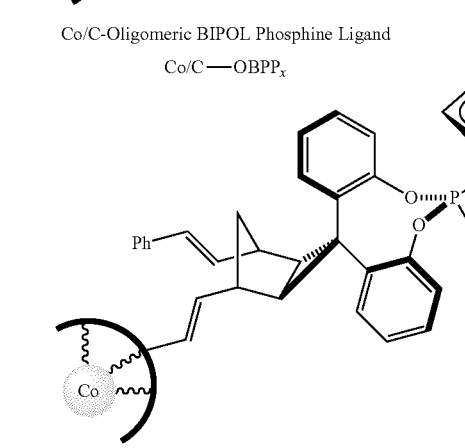

Co/C-Oligomeric BIPOL-Ru Catalyst

Co/C—OBPP—Ru$_n$

In addition, generation of a Co/C immobilized ROMP-derived bi-functional hybrid block polymer generated from two NB-tagged ligand monomers can be performed as shown in Scheme 10. The catalyst Co/C—OCP—Ru, as shown below, can also be prepared.

Scheme 10

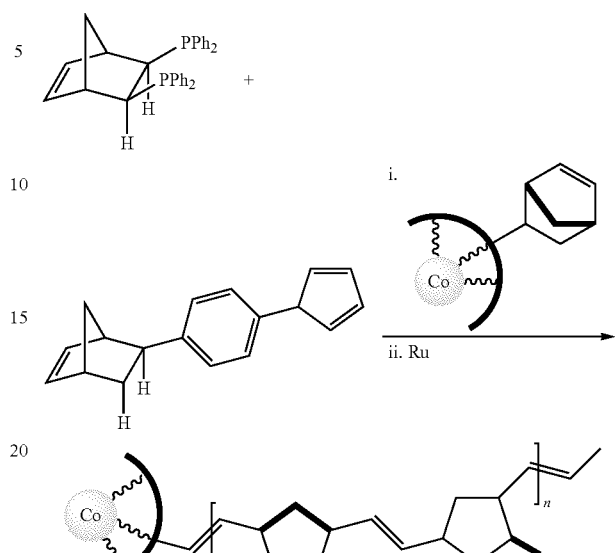

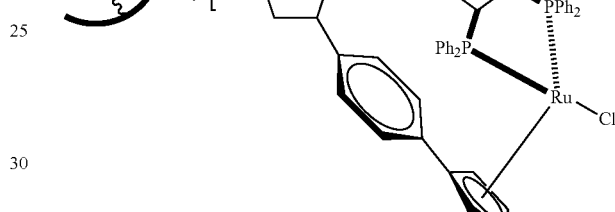

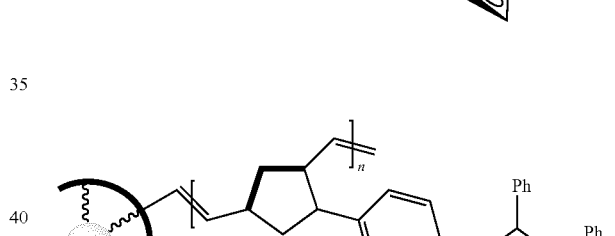

Co/C-Oligomeric
cyclopentadiene-Ru catalyst
Co/C—OCP—Ru$_n$

N-heterocyclic carbene (NHC) ligands have been studied in recent years, due to the development of extremely active catalyst systems comprising of NHC ligands. Immobilization of NHC ligands onto the Co/C magnetic nano-particle can occur via facile surface-initiated ROMP, generating the corresponding immobilized, high-load Co/C-ROMP-derived NHC ligand as shown in Scheme 11. For example, a Co/C oligomeric Ru-metathesis catalysts (Co/C—ONHC—G1-Ru$_n$) can be generated for applications as an immobilized, recyclable metathesis catalyst. Scheme 12 shows generation of second generation NHC-containing MPPHM.

Scheme 11
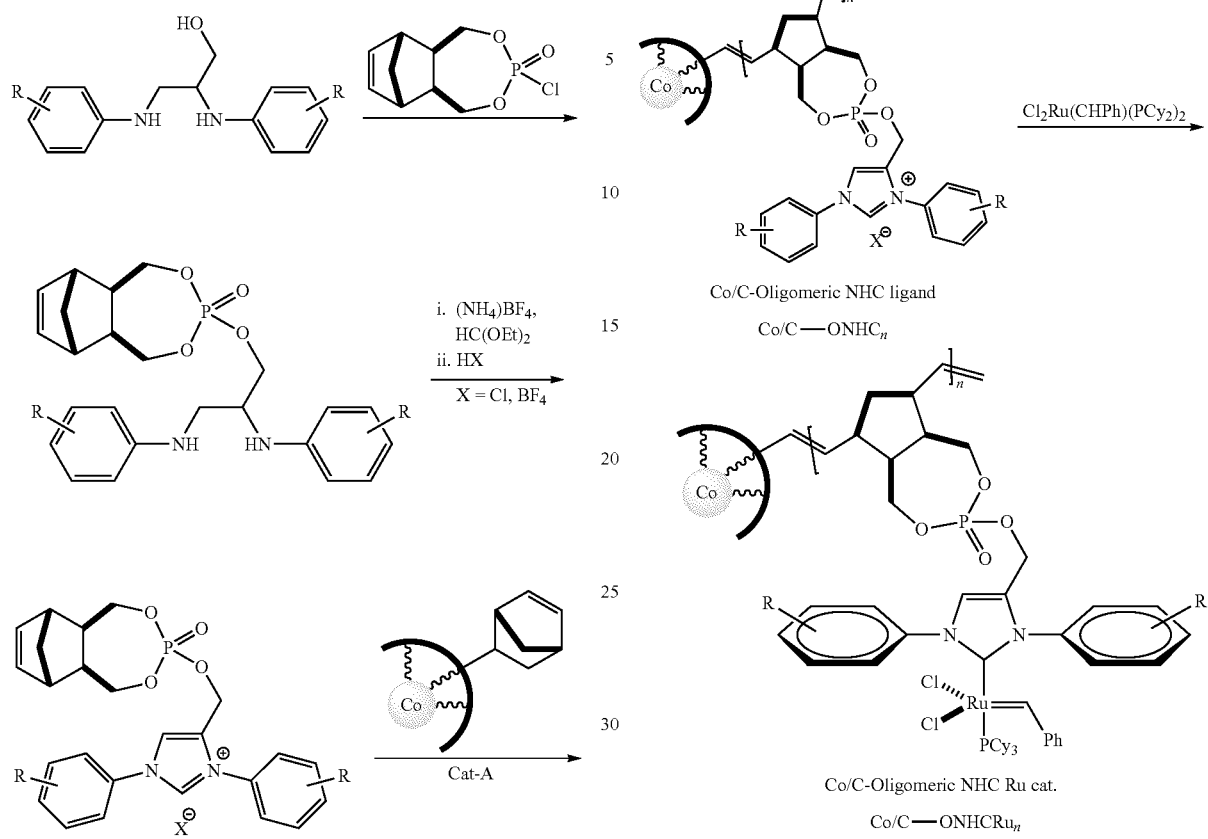
Scheme 12
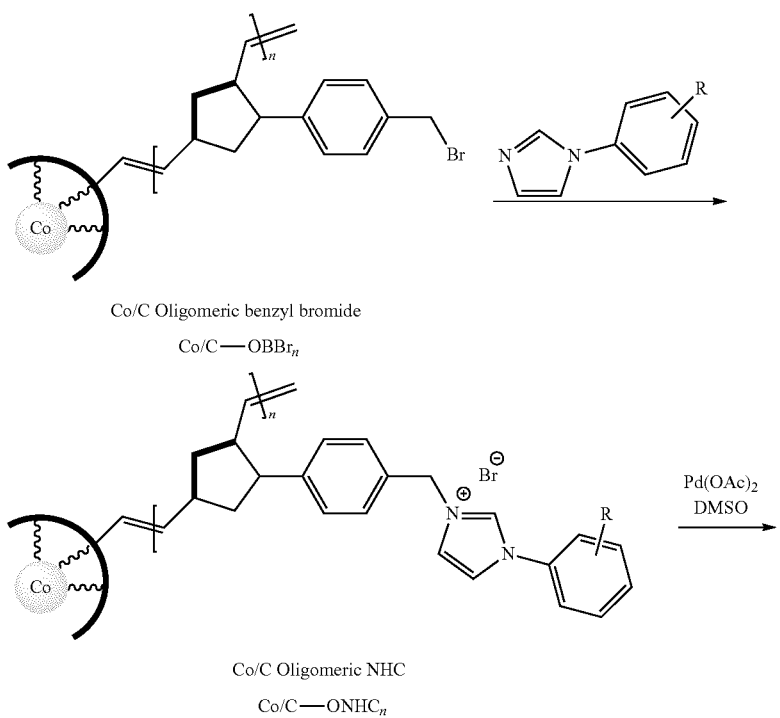

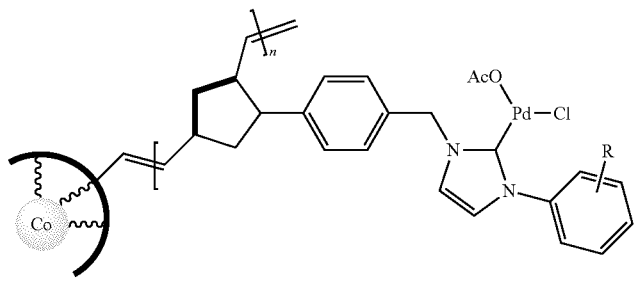

Co/C Oligomeric NHC Pd catalyst

Co/C—ONHCPd$_n$

N-heterocyclic nitrenium ions (NHI) have recently been reported as efficient ligands for the generation of transition metal complexes. With the triazolium synthesis route, a suite of immobilized ligands can be designed probing the steric environments of the ligands in which the triazolium ring was incorporated within a pincer-type system with two chelating 'arms'. The synthesis of a nitrene-metal ligand MPPHM is shown in Scheme 13.

Scheme 13

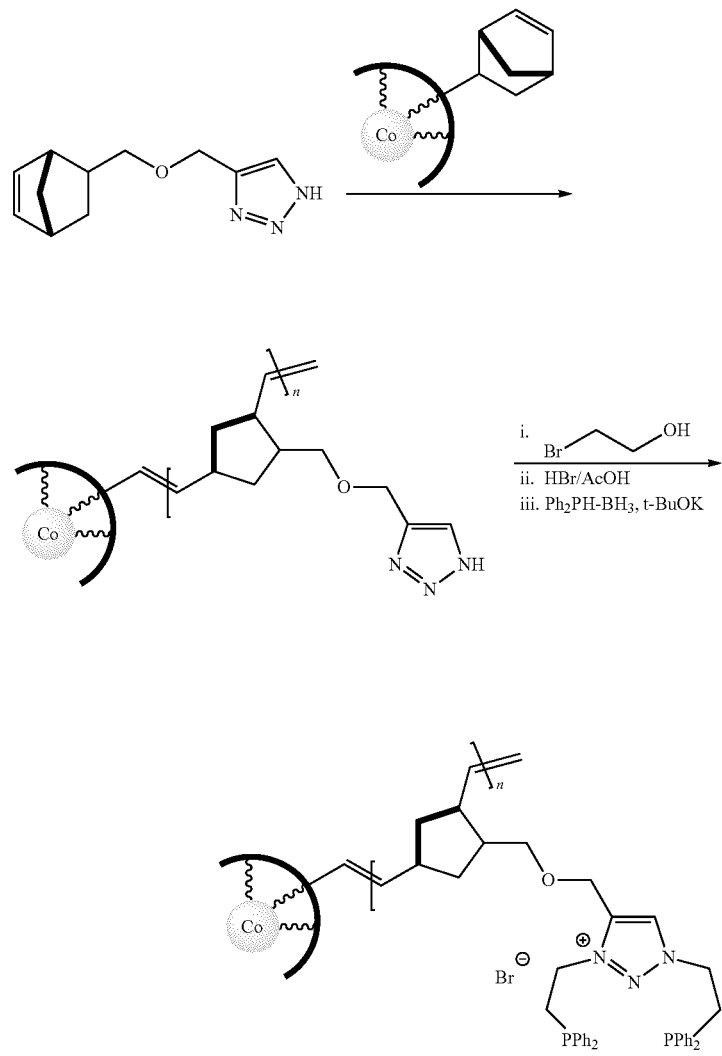

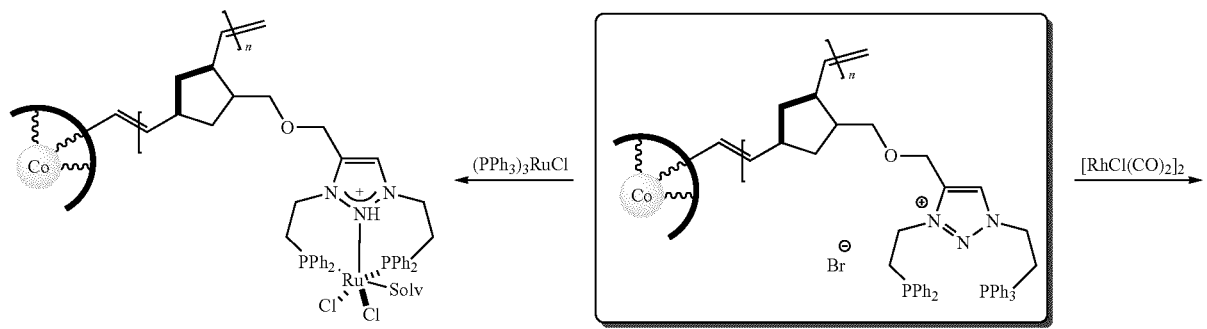

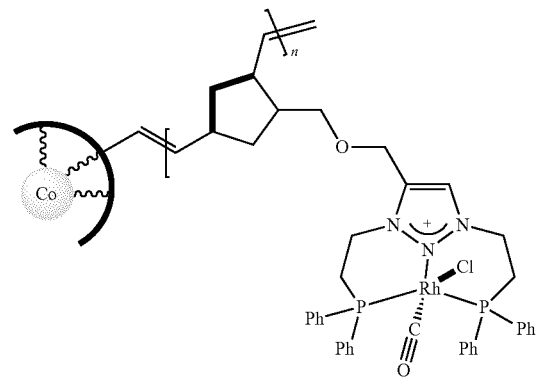

Additionally, copolymers can be prepared with the reaction techniques using ROMP as described herein by using different types of functionalized monomers. As such, various block copolymers can be prepared depending on selection of the functionalized monomers having norbornenyl groups. The copolymers can be random or block copolymers. Random copolymers can be prepared by introducing all of the functionalized monomers together, while block copolymers can be prepared by adding one type of monomer and then another and optionally repeating the cycle of monomer addition. Scheme 14 illustrates an example of a method of preparing a MPPHM having copolymers.

Scheme 14

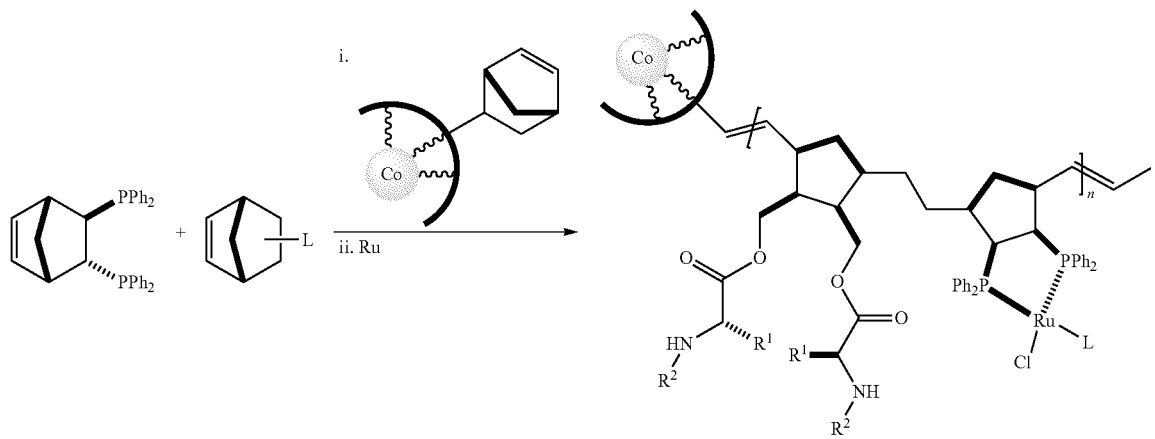

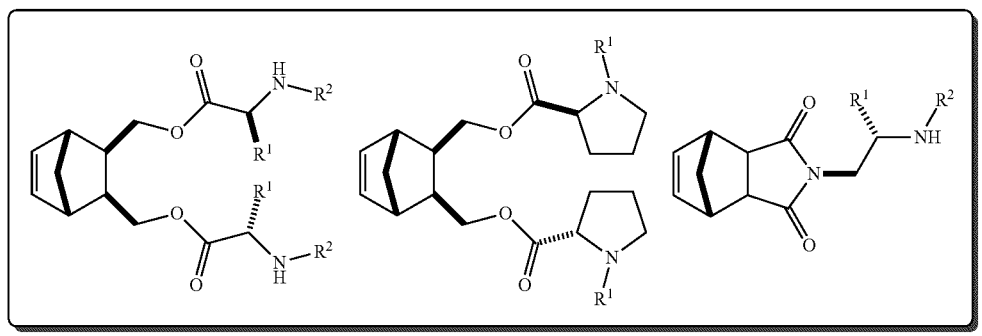

Section 6

The MPPHMs can be configured to be high capacity loaded nanoparticles, or capable of having high capacity loading. As such, the loading potential of the various MPPHMs have been determined and are illustrated in Tables 5, 6, and 7. As can be seen, the MPPHMs have significant loading over 0.1 mmol/g. The use of the norbornenes and ROMP chemistry provides for MPPHMs that have significantly increased loading potentials as well as loading of reagents, metals, catalysts, or other substances.

It can be seen that a loading potential of about 0.7 mmol/g can be achieved when n=10. While not show, when n=50 for palladium loading, the loading potential can be about 1.1 mmol/g triphenylphosphine.

TABLE 5

Theoretical Loads for Co/C-ROMP Reagents/Scavengers

| Co/C-X | Oligomer Load (mmol/g) | Reagent Load (mmol/g) n = 10 | Reagent Load (mmol/g) n = 250 |
|---|---|---|---|
| Co/C-OACC | 3.34 | 0.76 | 2.94 |
| Co/C-OBAC | 9 12 | 0.9 | 6.68 |
| Co/C-OBEAD | 3.04 | 0.76 | 2.71 |
| Co/C-OBP | | | |
| $R^1$ = H | 3.26 | 0.76 | 2.88 |
| $R^1$ = Ph | 2.61 | 0.72 | 2.63 |
| Co/C-OBSC | 3.72 | 0.79 | 3.23 |
| Co/C-ODCT G-1 | 5 62 | 0.85 | 4.59 |
| Co/C-ODCT G-2 | 7.34 | 0.88 | 5.68 |
| Co/C—OHAc | | | |
| $R^1$ = Me | 4.52 | 0.82 | 3.82 |
| $R^1$ = Ph | 3.52 | 0.78 | 3.12 |
| Co/C-OMAm | 6.26 | 0.86 | 5.01 |
| Co/C-OPy | 5 83 | 0.85 | 4.80 |
| Co/C-OTMT | 8.34 | 0.89 | 6.26 |
| Co/C-OTP | | | |
| $R^1$ = Me | 3.21 | 0.76 | 2.84 |
| $R^1$ = $CH_2C_6H_4$Ph | 2.15 | 0.68 | 1.98 |

TABLE 6

Theoretical Loads for Co/C-ROMP Reagents/Scavengers

| Co/C-X | Oligomer Load (mmol/g) | Reagent Load (mmol/g) n = 10 | Reagent Load (mmol/g) n = 100 | Reagent Load (mmol/g) n = 250 |
|---|---|---|---|---|
| Co/C-OBINAP G-1 | 1.39 | 0.42 | 1.22 | 1.32 |
| Co/C-OBINAP G-2 | | | | |
| y = 0 | 1.02 | 0.50 | 0.93 | 0.98 |
| y = 3 | 0.98 | 0.49 | 0.89 | 0.94 |
| Co/C-OTPP | 2.82 | 0.73 | 2.20 | 2.53 |
| Co/C-OBINOL G-1 | 2.64 | 0.72 | 2.09 | 2.43 |
| Co/C-OBINOL G-2 | 2.08 | 0.67 | 1.72 | 1.92 |
| Co/C-ONHC G-1 | | | | |
| $R^1$ = H, $R^2$ = Cl | 2.76 | 0.73 | 2.16 | 2.38 |
| $R^1$ = Ph, $R^2$ = Cl | 2.27 | 0.69 | 1.85 | 2.08 |
| Co/C-ONHC G-2 | | | | |
| $R^1/R^2$ = H, $R^3$ = Cl | 2.06 | 0.67 | 1.71 | 1.90 |
| $R^1/R^2$ = Ph, $R^3$ = Cl | 1.56 | 0.61 | 1.35 | 1.47 |
| Co/C-OBPP [BPP = Biphenyl phosphine] | | | | |
| $R^1$ = Me | 2.99 | 0.75 | 2.30 | 2.67 |
| $R^1$ = Ph | 2.42 | 0.71 | 1.95 | 2.20 |
| Co/C-ONtr [Ntr = Nitrene] | | | | |
| $R^1$ = H, $R^3$ = Cl, X = O | 1.65 | 0.63 | 1.41 | 1.54 |
| $R^1$ = Ph, $R^2$ = Cl, X = O | 1.10 | 0.52 | 0.99 | 1.05 |
| Co/C-OCp [Cp = Cyclopentyl] | | | | |
| $R^1$ = H | 4.26 | 0.81 | 2.99 | 3.64 |
| $R^1$ = Ph | 1.85 | 0.65 | 1.56 | 1.72 |
| Co/C-OBPBP [BPBP = Biphenyl Biphosphine] | 2.16 | 0.68 | 1.78 | 1.98 |
| Co/C-OAmE [OAmE = Amino Ester] | | | | |
| $R^1$ = $CH_2$Ph, $R^2$ = H, $R^3$ = Me | 3.50 | 0.78 | 2.59 | 3.07 |
| $R^1$ = Me, $R^2$ = H, $R^3$ = Me | 4.47 | 0.22 | 3.09 | 3.79 |

TABLE 7

Theoretical Loads for Co/C-ROMP Ligand-Metal Catalysts

| Co/C-X | Oligomer Load (mmol/g) | Reagent Load (mmol/g) n = 10 | Reagent Load (mmol/g) n = 100 | Reagent Load (mmol/g) n = 250 |
|---|---|---|---|---|
| Co/C-OTPP-Pd<br>$L_n = 2 \times OAc$ | 1.33 | 0.57 | 1.17 | 1.26 |
| Co/C-ONtr-Rh<br>$L_n = CO$ & $Cl$<br>$R^1 = H$<br>$X = O$ | 1.30 | 0.56 | 1.15 | 1.23 |
| Co/C-OBPP<br>[BPP = Biphenol phosphine]<br>$M = P$<br>$R^1 = OMe$ | 1.62 | 0.62 | 1.40 | 1.52 |
| Co/C-ONHC-G1-Ru-Met<br>$R^1 = H, R^2 = Ph$<br>$R^3/R^4 = Cl, R^5 = PCy_3$ | 1.15 | 0.53 | 1.03 | 1.09 |
| Co/C-ONHC-G1-Ru-Met<br>$R^1 = H, R^2 = H,$<br>$R^3 = Ph$<br>$R^4/R^5 = Cl, R^6 = PCy_3$ | 1.00 | 0.5 | 0.9 | 0.96 |
| Co/C-ONHC-Pd<br>$M = Pd, R^1 = H$<br>$L_n = Cl$ & $OAc$ | 1.53 | 0.60 | 1.32 | 1.44 |

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular or conversely, from the singular to the plural, as is appropriate to the context and/or application. The various singular/plural permutations may be expressly set forth herein for sake of clarity.

It will be understood by those within the art that, in general, the terms used herein, and especially in the appended claims (e.g., bodies of the appended claims), are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member, or subgroup of members, of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling, the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety: Cu(II)-Azabis(oxazoline) Complexes Immobilized on Magnetic Co/C Nanoparticles: Kinetic Resolution of 1,2-Diphenylethane-1,2-diol under Batch and Continuous-Flow Conditions, A Schatz, R N Grass, Q Kainz, W J Stark, and O Reiser, *Chem. Mater*, 22, 305-310 (2010); and A Recyclable Nanoparticle-Supported Palladium Catalyst for the Hydroxycarbonylation of Aryl Halides in Water, S Wittmann, A Schatz, R N Grass, W J Stark, and O Reiser, *Angew. Chem. Int. Ed.*, 49, 1867-1870 (2010).

The invention claimed is:

1. A magnetic particle-polymer hybrid material comprising:
    a substance having a structure of Formula 1 or derivative or salt thereof:

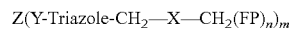    (Formula 1)

Z(Y-Triazole-CH$_2$—X—CH$_2$(FP)$_n$)$_m$

Z is a magnetic particle smaller than 1 mm;
    n and m are independently integers;
    Y includes a first linker having an alkyl and/or aryl linked to the magnetic particle;
    X is CH$_2$ or a heteroatom;
    FP is a functionalized polymer having:
        a first structure derived from a first norbornene compound linked to the magnetic particle through the Y-Triazole-CH$_2$—X—CH$_2$ linker; and
        one or more monomeric units each including a second structure derived from a second norbornene compound, where one of the monomeric units is linked to the first structure through a saturated or unsaturated alkyl, each monomeric unit includes a functional group capable of binding with another substance.

2. The magnetic particle of claim 1, wherein the functional group is selected from the group consisting of bis-acid chloride (BAC); dichlorotriazine (DCT); triphenyl phosphine (TPP); alkyl triphenyl phosphine (alkyl-TPP); phosphate triphenyl (PTP); di-triphenylphosphate (Di-TPP); triazole phosphate (TP); carbodiimide (ACC); alkyl-carbodiimide (alkyl-ACC); benzyl phosphate (BP); monoamine MAm); alkyl-monoamine (alkyl-MAm); methyl-monoamine (MMAm); mono ethyl azodicarboxylate (MEAD); benzyl-ethyl azodicarboxylate (BEAD); sulfonyl chloride (SC); benzenesulfonyl chloride (BCS); acetic acid (HAc); pyridine (Py); benzaldehyde (BA); chlorophosphate (PC); trimercaptotriazine (TMT); benzylic sulfonium salts (OBSPc); benzyl bromide (BB); sulfonylchloride (SC); amino acids (AA); amino esters (AE); biphenol phosphines (BPP); biphenylbisphosphines (BPBP); cyclopentadienyls (CP); N-heterocyclic carbenes (NHC); derivatives thereof; and combinations thereof.

3. The magnetic particle-polymer hybrid material of claim 1, wherein Z includes cobalt.

4. The magnetic particle-polymer hybrid material of claim 3, wherein Z includes a graphene shell.

5. The magnetic particle-polymer hybrid material of claim 1, comprising:
    a structure of Z(Q)$_m$, wherein the Z(Q) includes Formula 3 or 3A or derivative or salt thereof:

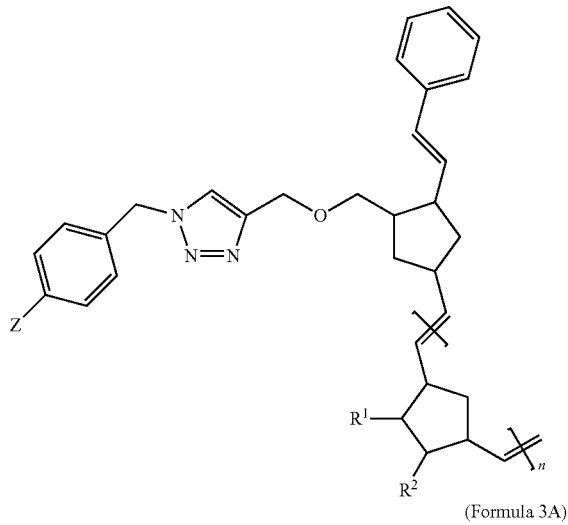

(Formula 3)

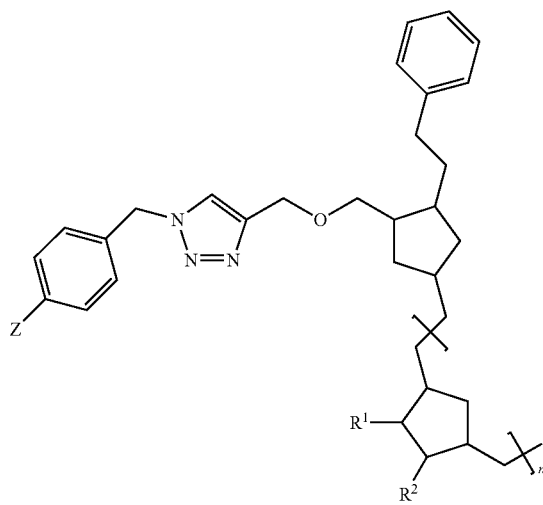

(Formula 3A)

R$^1$ and R$^2$ are independently or in combination selected from hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, heteroaromatics, amines, primary amines, secondary amines, tertiary amines, aliphatic amines, carbonyls, carboxyls, amides, esters, amino acids, peptides, polypeptides, or combinations thereof so long as at least one of R$^1$ and R$^2$ includes the functional group capable of binding with another molecular entity, and wherein the polymer backbone is saturated (Formula 3A) or unsaturated (Formula 3).

6. The magnetic particle-polymer hybrid material of claim 5, wherein the Z(Q) includes
    one of Formulae 5A-5N or derivative or salt thereof, wherein R5 is as defined for R$^1$ and R$^2$, and the polymer backbone is saturated or unsaturated:

Formula 5A
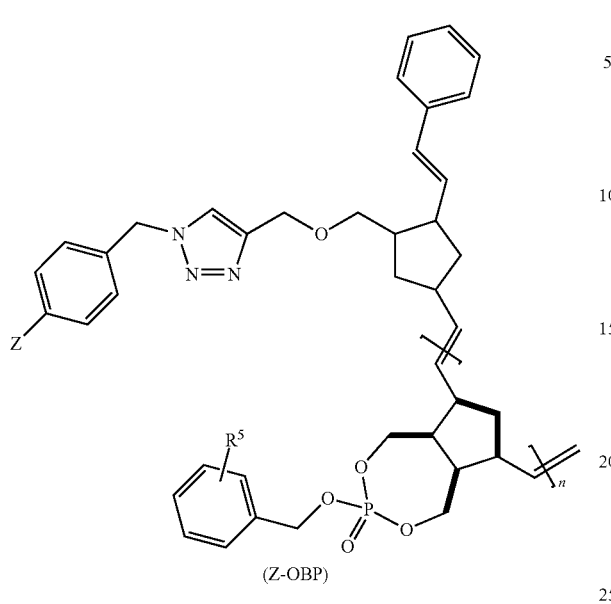
(Z-OBP)
Formula 5C
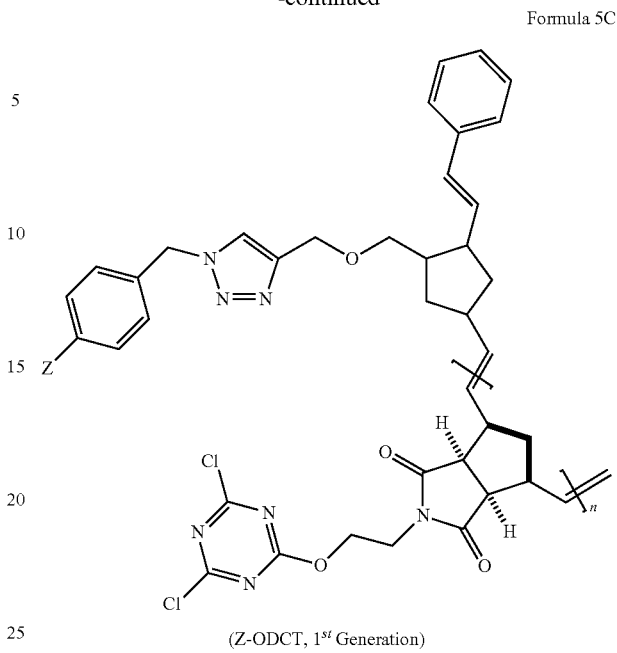
(Z-ODCT, 1$^{st}$ Generation)
Formula 5B
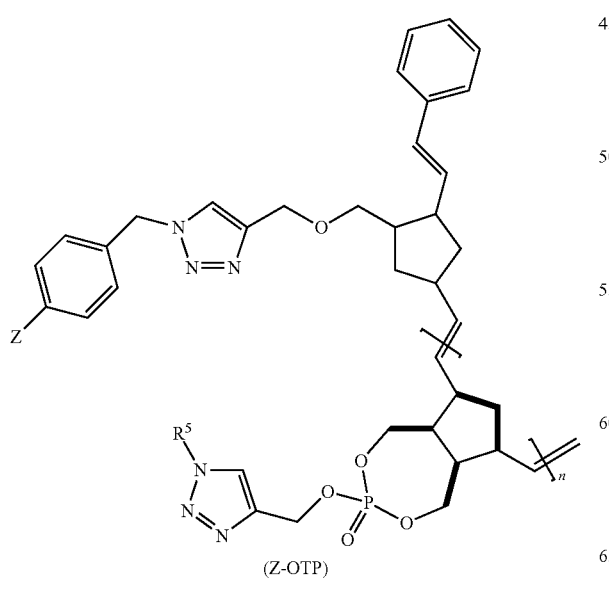
(Z-OTP)
Formula 5D1
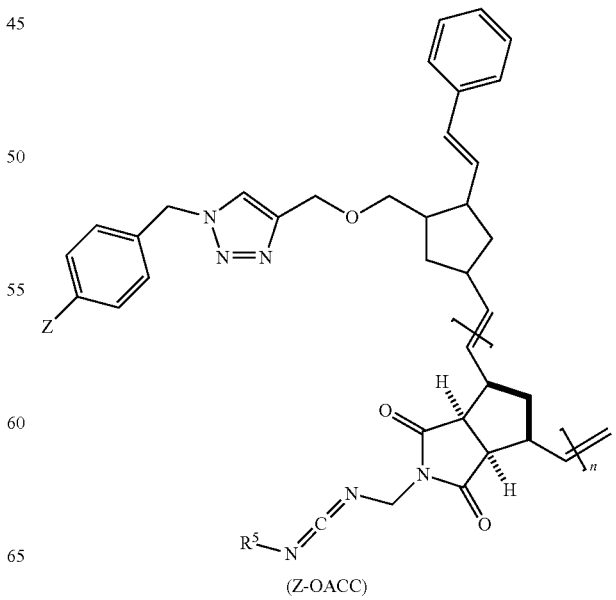
(Z-OACC)

Formula 5E
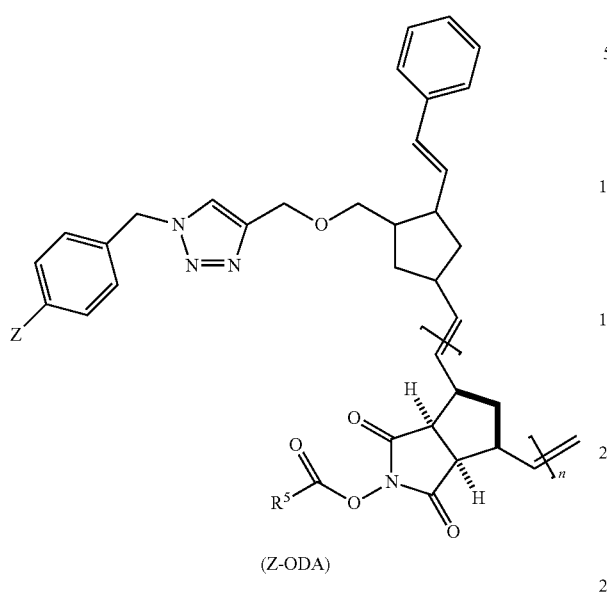
(Z-ODA)
Formula 5G
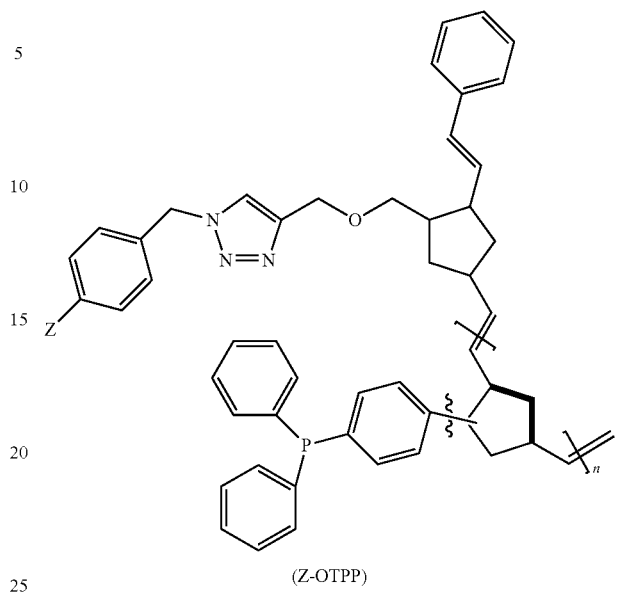
(Z-OTPP)
Formula 5F
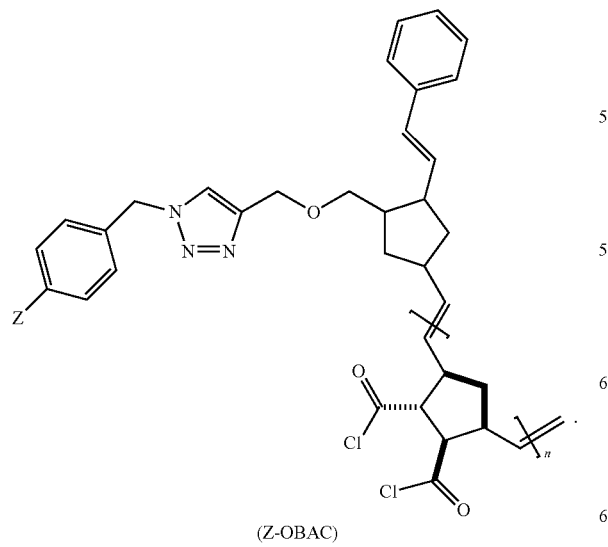
(Z-OBAC)
Formula 5H
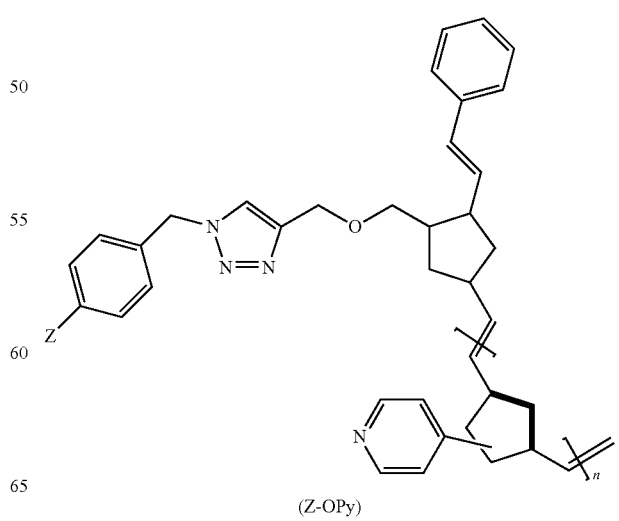
(Z-OPy)

Formula 5I
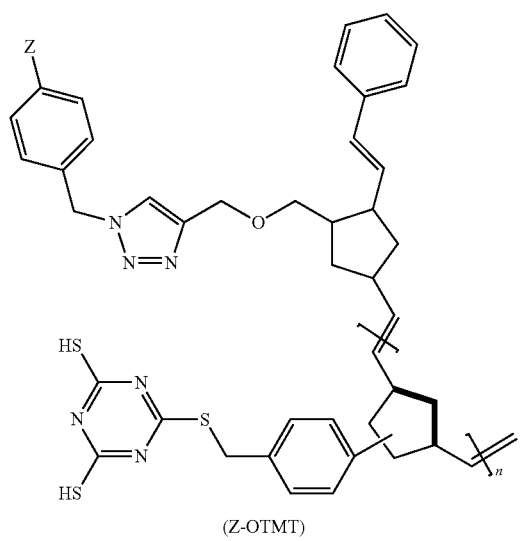
(Z-OTMT)
Formula 5K
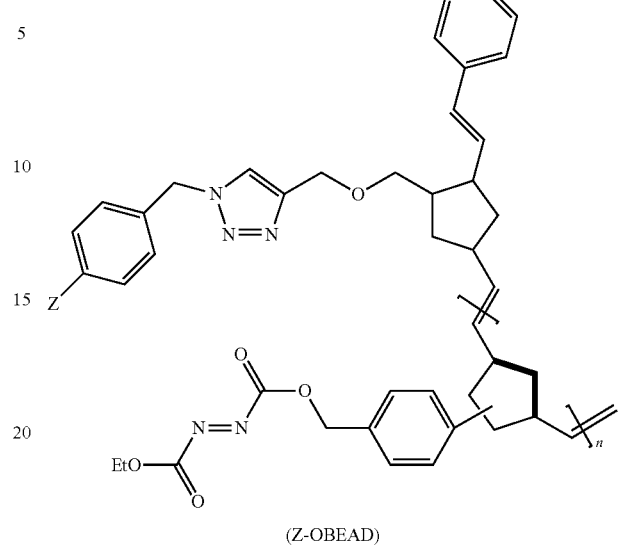
(Z-OBEAD)
Formula 5J
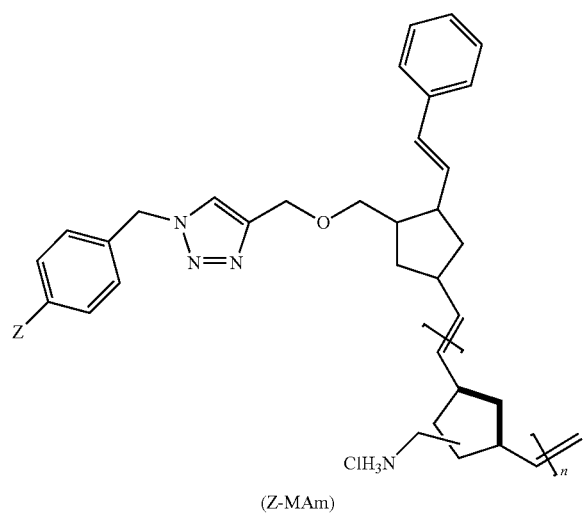
(Z-MAm)
Formula 5L
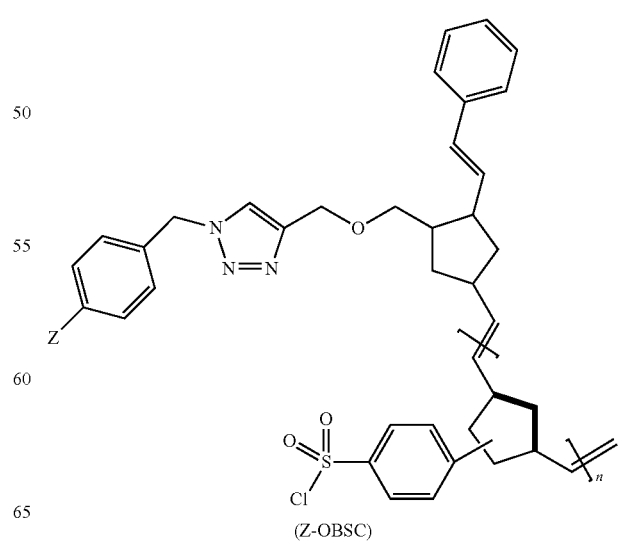
(Z-OBSC)

-continued
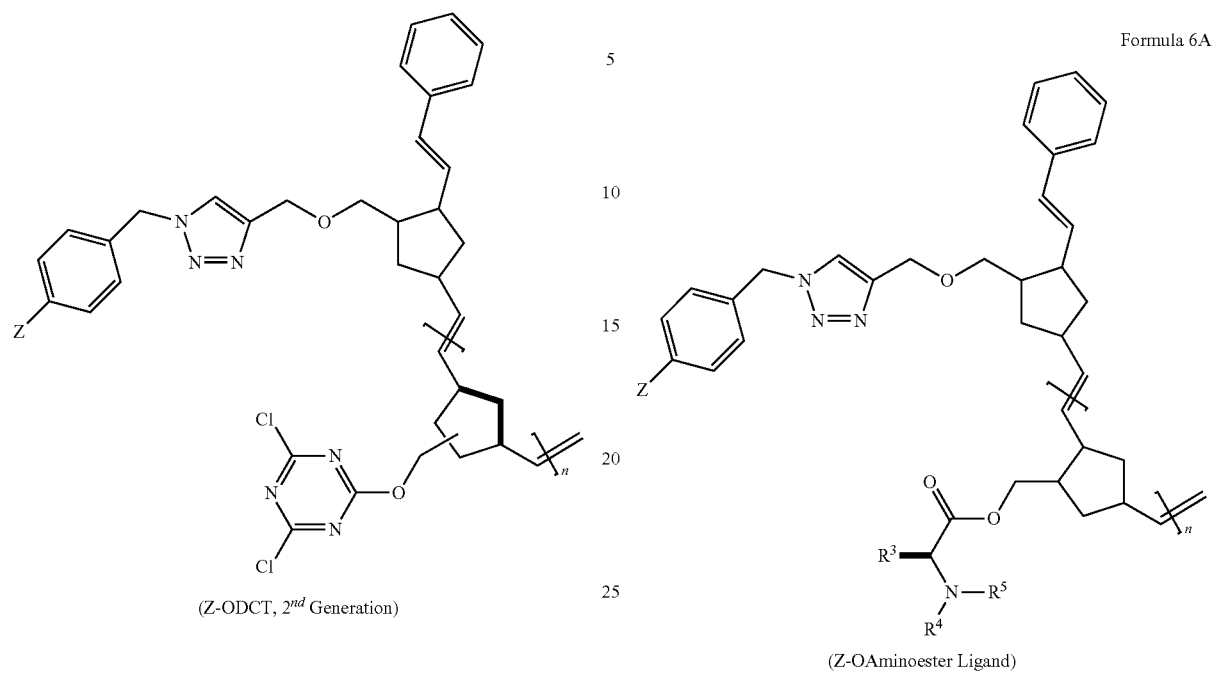
Formula 5M
(Z-ODCT, 2nd Generation)
Formula 5N
(Z-OHAc)
Formula 6A
(Z-OAminoester Ligand)
Formula 6B
(Z-OBiphenol Phosphine Ligand)
one of Formulae 6A-6K or derivative or salt thereof;
7. The magnetic particle-polymer hybrid material of claim 5, wherein the Z(Q) includes Formula 6C
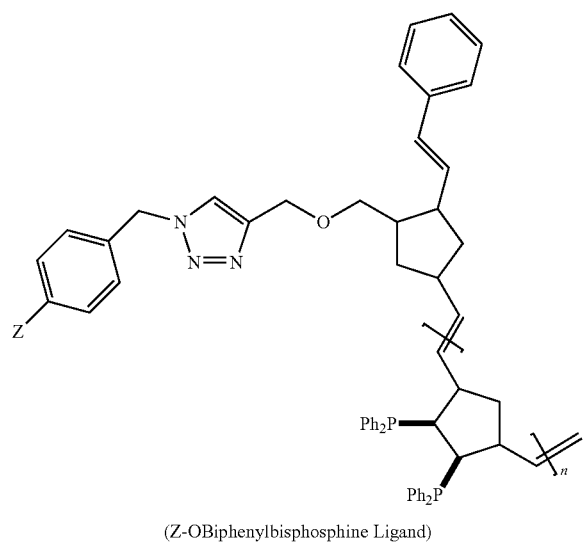
(Z-OBiphenylbisphosphine Ligand)
Formula 6D
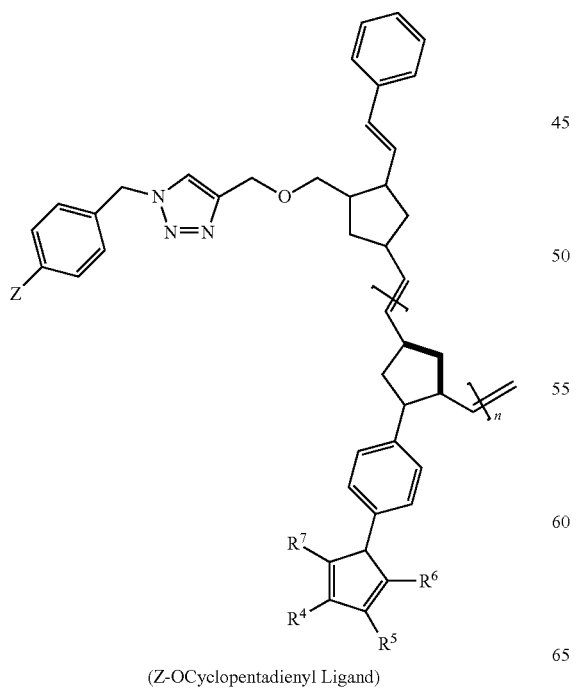
(Z-OCyclopentadienyl Ligand)
Formula 6E
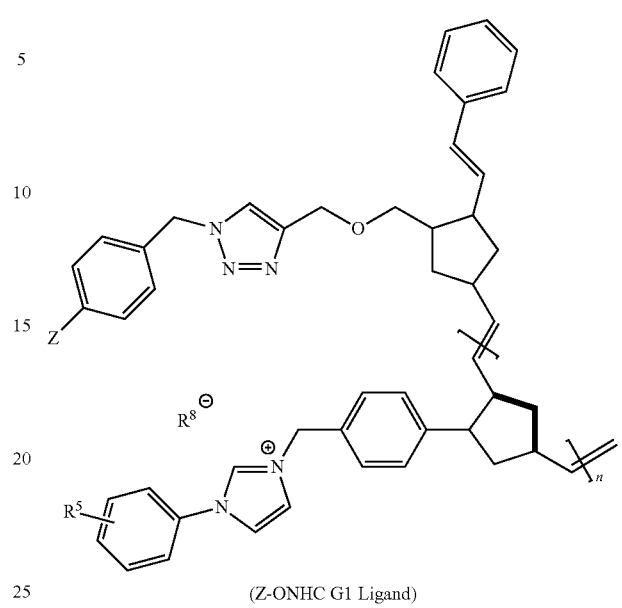
(Z-ONHC G1 Ligand)
Formula 6F
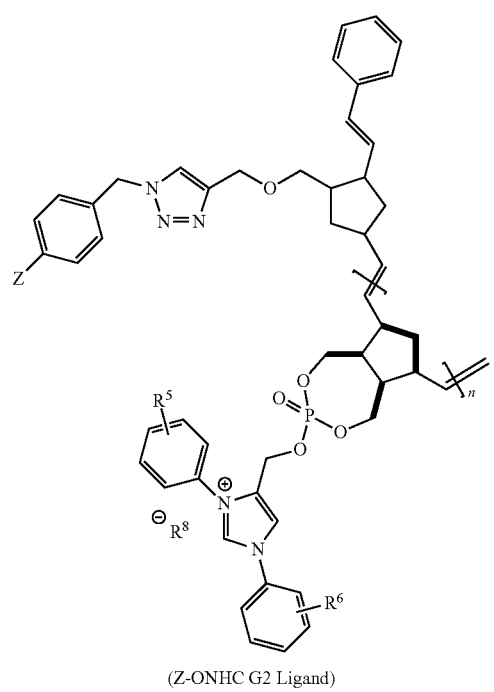
(Z-ONHC G2 Ligand)

Formula 6G
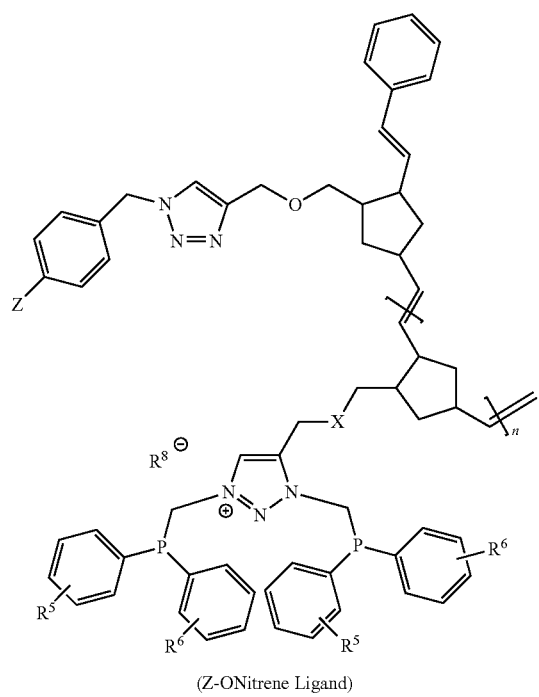
(Z-ONitrene Ligand)
Formula 6H
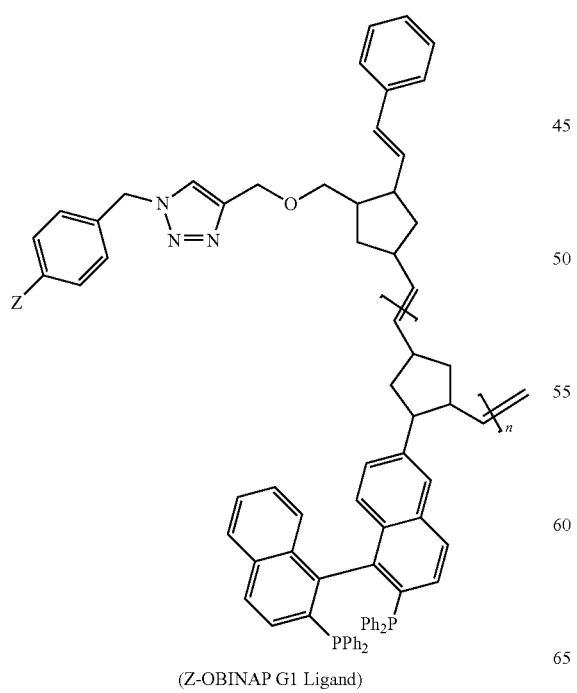
(Z-OBINAP G1 Ligand)
Formula 6I
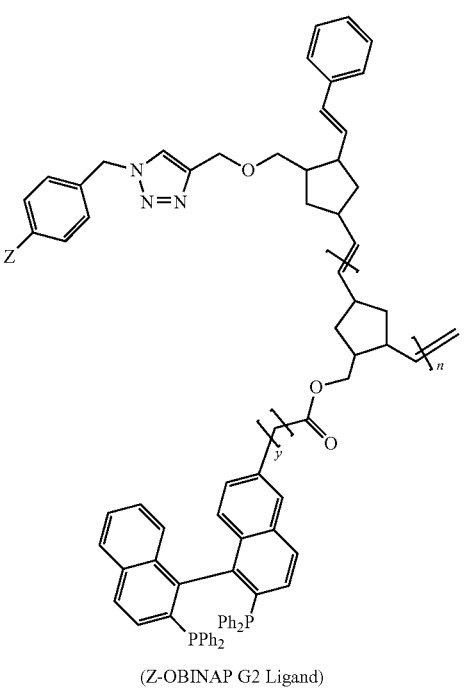
(Z-OBINAP G2 Ligand)
Formula 6J
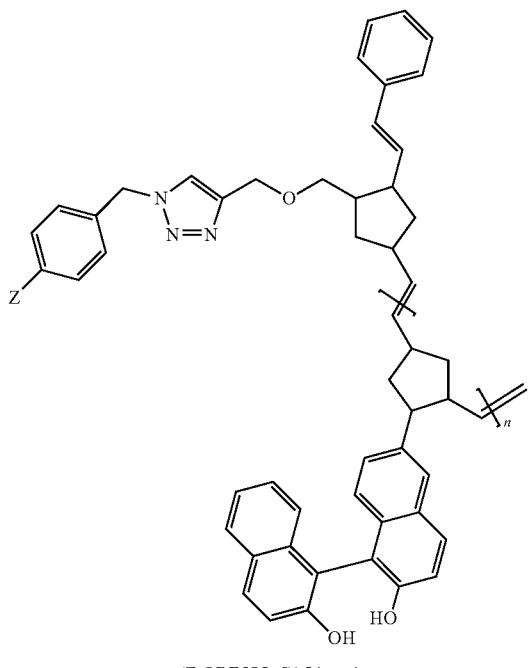
(Z-OBINOL G1 Ligand Formula 6K

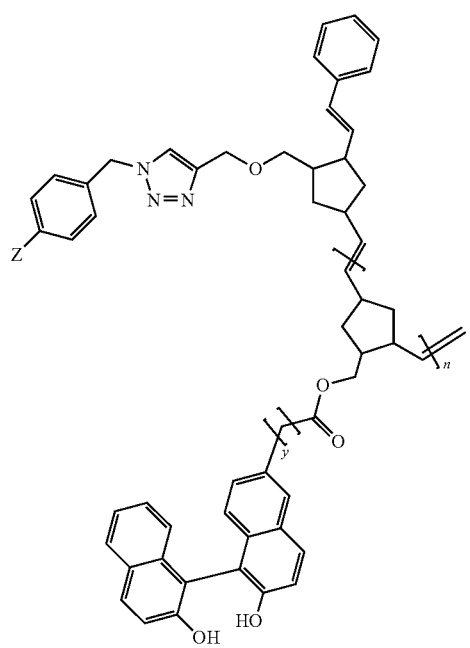

(Z-OBINOL G2 Ligand)

wherein y is an integer;
$R^3$ is an amino acid side group;
$R^4$, $R^5$, $R^6$, and $R^7$, are each independently as defined for $R^1$ and $R^2$; and
$R^8$ is a negatively charged counter ion,
wherein the polymer backbone is saturated or unsaturated.

8. The magnetic particle-polymer hybrid material of claim 5, wherein the Z(Q) includes
one of Formulae 7A-7H or derivative or salt thereof;

Formula 7A

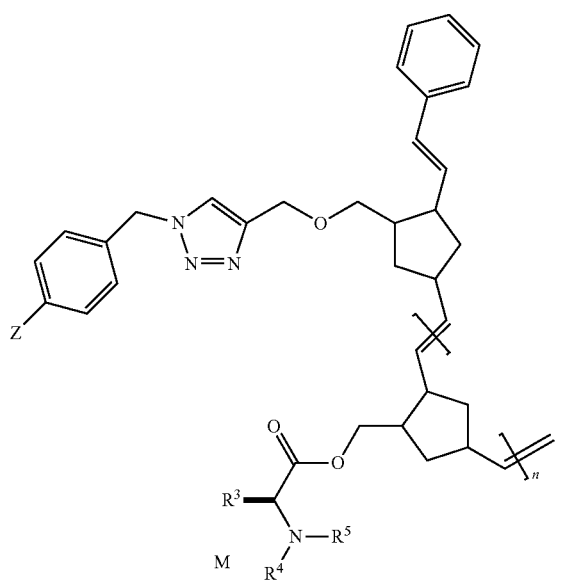

(Z-OAminoester-Metal Ligand)

Formula 7B

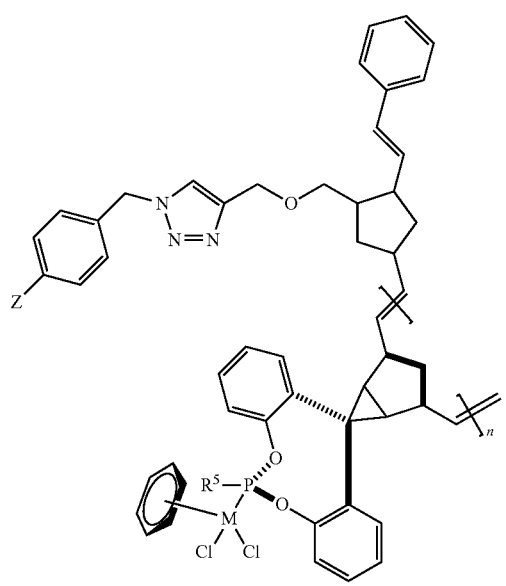

(Z-OBiphenol Phosphine-Metal Ligand)

Formula 7C

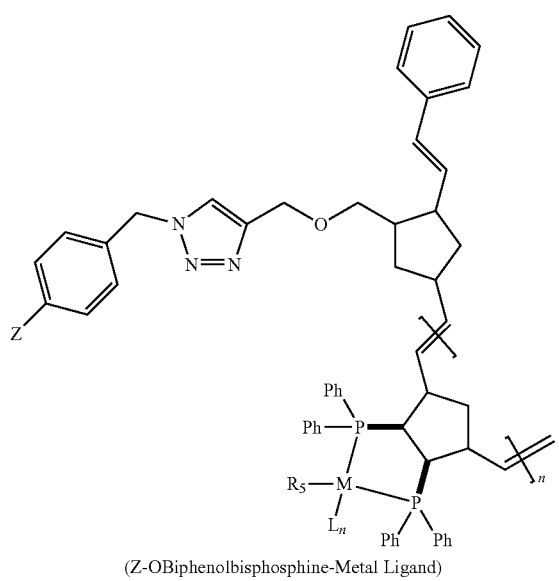

(Z-OBiphenolbisphosphine-Metal Ligand)

Formula 7D
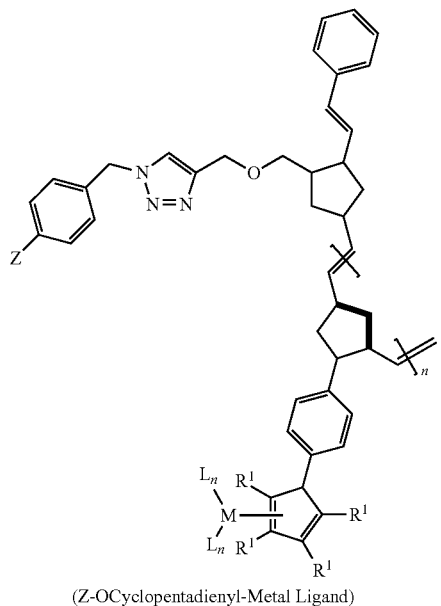
(Z-OCyclopentadienyl-Metal Ligand)
Formula 7E
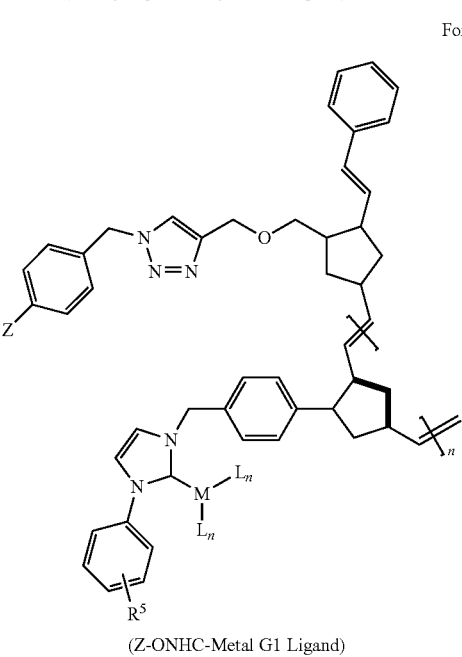
(Z-ONHC-Metal G1 Ligand)
Formula 7F
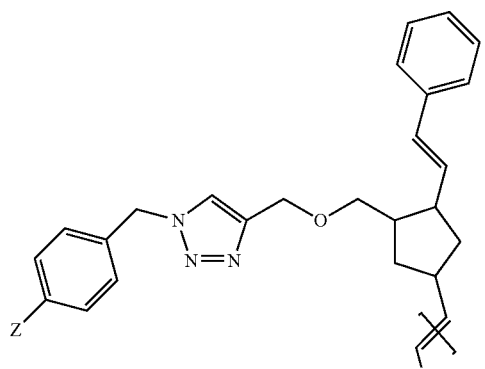
Formula 7G
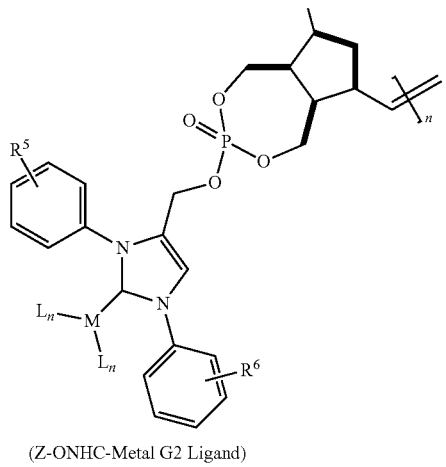
(Z-ONHC-Metal G2 Ligand)
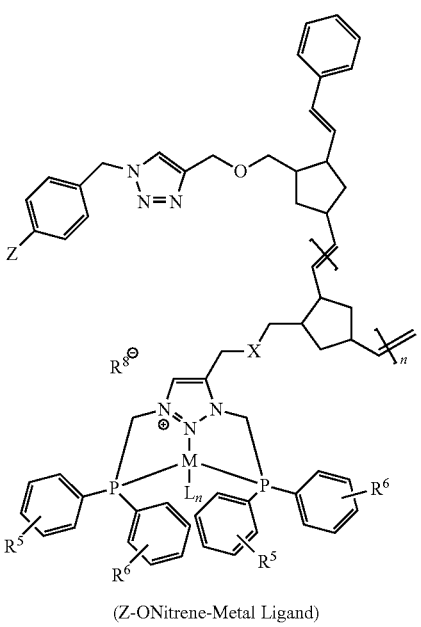
(Z-ONitrene-Metal Ligand)

-continued

Formula 7H

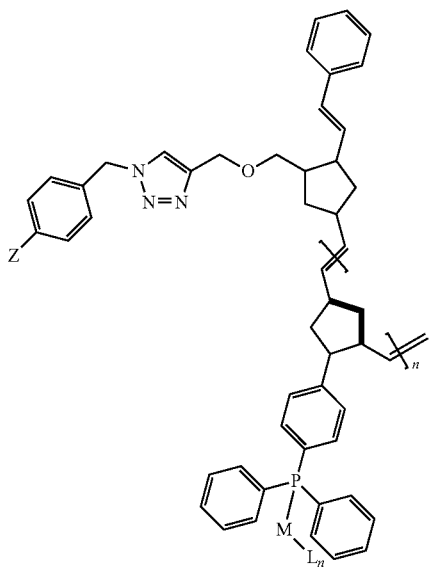

(Z-OTPP-Metal Ligand)

wherein M is a metal bound to the functional group;
$R^3$ is an amino acid side group;
$R^4$, $R^5$, $R^6$, and Ln are each independently as defined for $R^1$ and $R^2$; and
$R^8$ is a negatively charged counter ion,
wherein the polymer backbone is saturated or unsaturated.

9. The magnetic particle-polymer hybrid material of claim 8, wherein the M is a catalytic metal.

10. The magnetic particle-polymer hybrid material of claim 9, wherein the catalytic metal is selected from transition metals, palladium, platinum, gold, ruthenium, rhodium, iridium, alloys thereof, and combinations thereof.

11. The magnetic particle-polymer hybrid material of claim 5, wherein the Z(Q) includes
one of Formulae 8A-8C or derivative or salt thereof;

Formula 8A

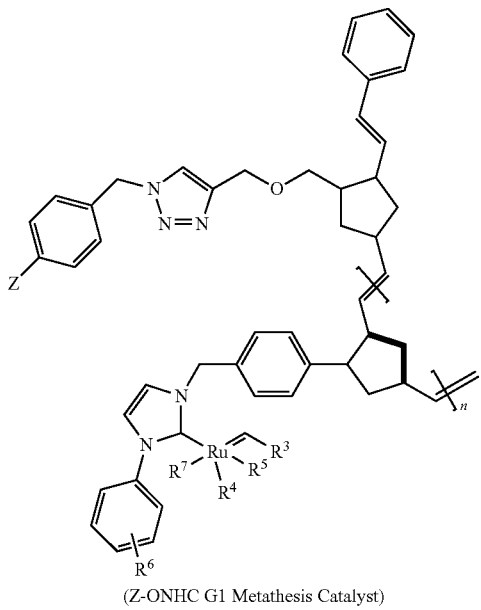

(Z-ONHC G1 Metathesis Catalyst)

-continued

Formula 8B

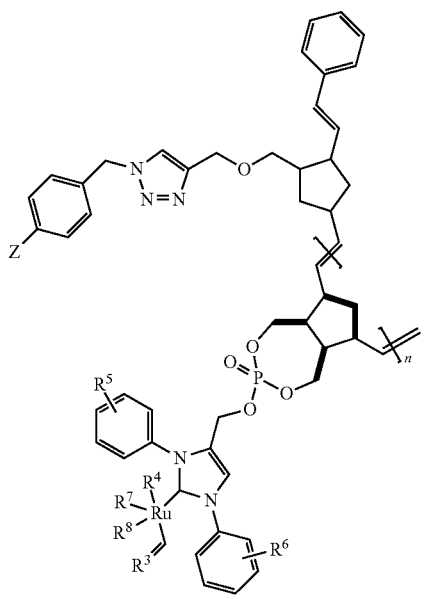

(Z-ONHC G2 Metathesis Catalyst)

Formula 8C

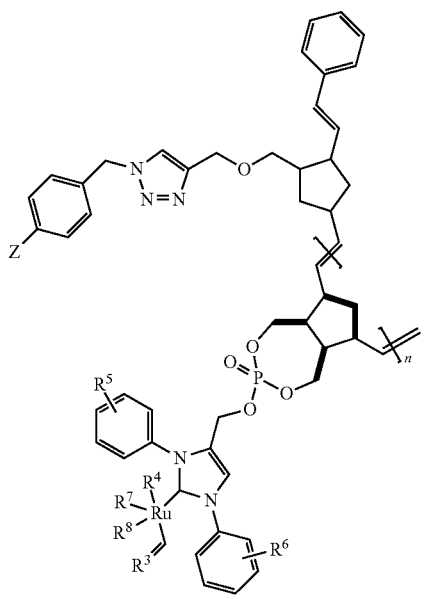

Formula 8C (Z-OCP—Ru Catalyst)

wherein $R^3$, $R^4$, $R^5$, $R^6$, $R^7$, and $R^8$ are each independently as defined herein for $R^1$ or $R^2$ or a phosphine or phosphite,
wherein the polymer backbone is saturated or unsaturated.

12. A method of preparing a magnetic particle-polymer hybrid material, the method comprising:
providing a magnetic particle having one or more triazole-containing linkers with a first norbornene group;
providing a monomer having a second norbornene group and a functional group capable of binding with another substance;
reacting the first and second norbornene groups by ring-opening metathesis polymerization (ROMP) chemistry so as to form a magnetic particle-polymer hybrid material having Formula 1 or derivative or salt thereof:

Z(Y-Triazole-CH$_2$—X—CH$_2$(FP)$_n$)$_m$ (Formula 1)

Z is a magnetic particle smaller than 1 mm;

n and m are independently integers;

Y includes a first linker having an alkyl and/or aryl linked to the magnetic particle;

X is $CH_2$ or a heteroatom;

FP is a functionalized polymer having:

a first structure derived from the first norbornene group compound linked to the magnetic particle through the Y-Triazole-$CH_2$—X—$CH_2$; and one or more monomeric units each including a second structure derived from the monomer where one of the monomeric units is linked to the first structure.

13. The method of claim 12, further comprising preparing the magnetic particle to have the one or more triazole-containing linkers with the first norbornene group.

14. The method of claim 12, further comprising:

providing the magnetic particle;

providing a reagent having a hydroxyl group and an amine group; and reacting the magnetic particle and the reagent so as to form one or more reactive azides linked to the magnetic particle.

15. The method of claim 14, further comprising reacting the reactive azide with a second reagent having the first norbornene group and a first reactive group capable of reacting with the reactive azide so as to form a linker attached to the particle having the first norbornene group as a terminal group.

16. The method of claim 15, wherein reacting the first norbornene group with the monomer is conducted with a catalyst.

17. The method of claim 12, wherein the formed magnetic particle-polymer hybrid material has a structure of $Z(Q)_m$, wherein the Z(Q) includes Formula 3 or 3A or derivative or salt thereof:

(Formula 3)

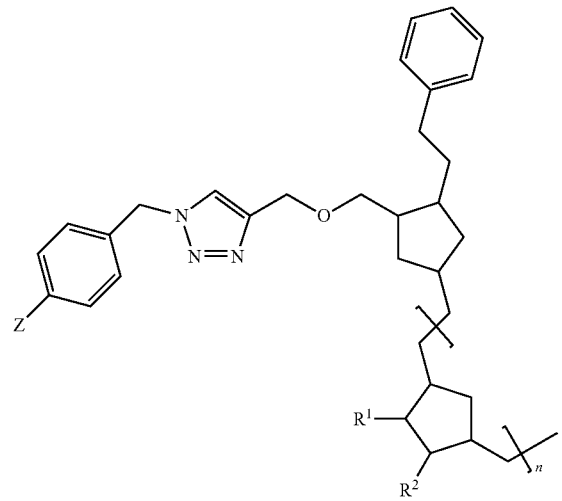

(Formula 3A)

$R^1$ and $R^2$ are independently or in combination selected from hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, heteroaromatics, amines, primary amines, secondary amines, tertiary amines, aliphatic amines, carbonyls, carboxyls, amides, esters, amino acids, peptides, polypeptides, or combinations thereof so long as at least one of $R^1$ and $R^2$ includes the functional group capable of binding with another molecular entity, wherein the polymer backbone is saturated or unsaturated.

18. The method of claim 17, wherein the Z(Q) includes one of Formulae 5A-5N or derivative or salt thereof, wherein R5 is as defined for $R^1$ and $R^2$, and the polymer backbone is saturated or unsaturated:

Formula 5A

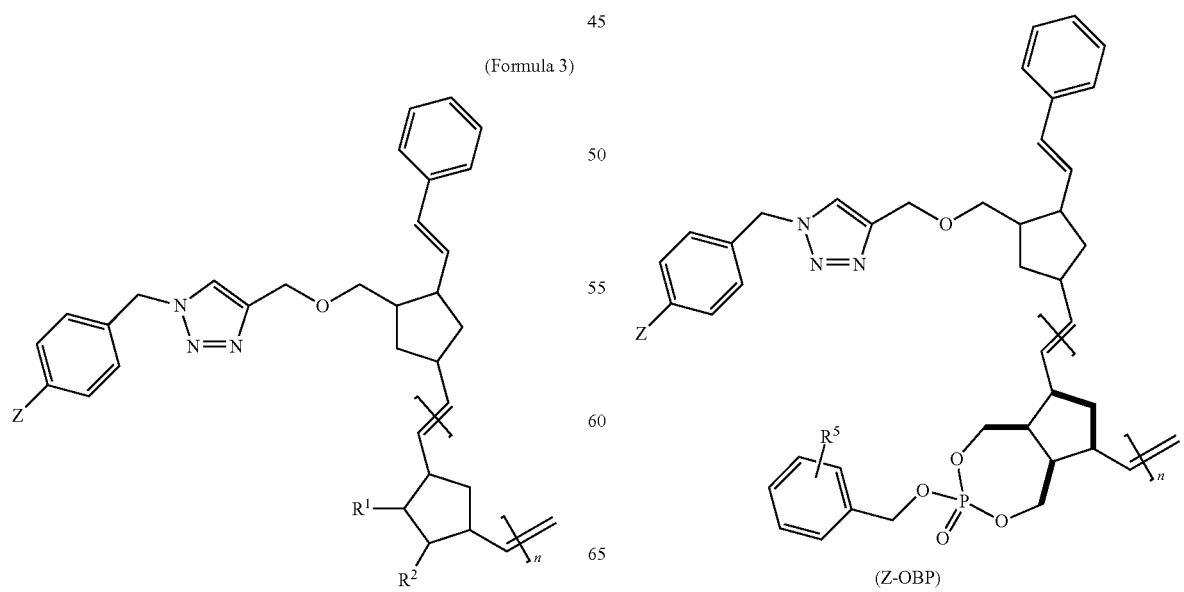

(Z-OBP)

Formula 5B
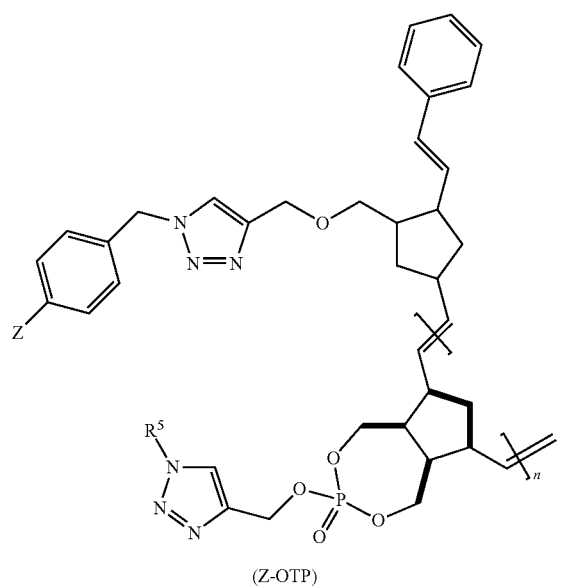
(Z-OTP)
Formula 5C
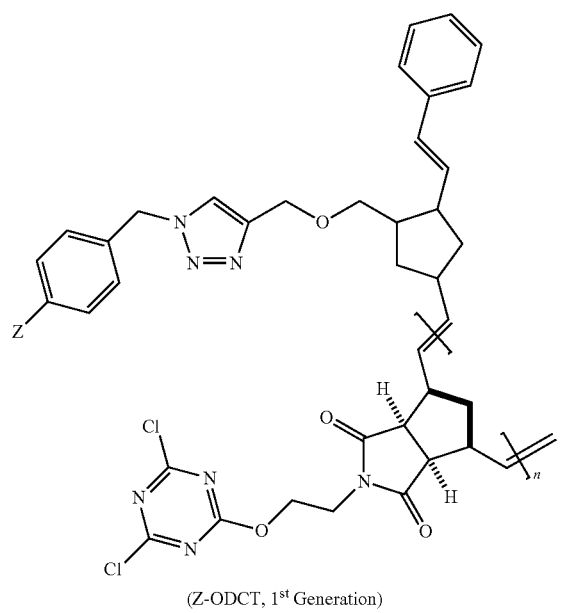
(Z-ODCT, 1st Generation)
Formula 5D1
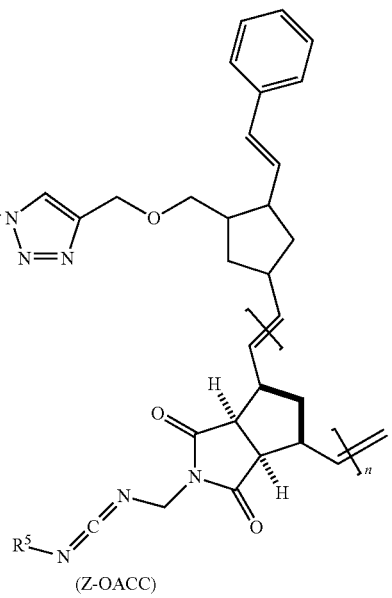
(Z-OACC)
Formula 5E
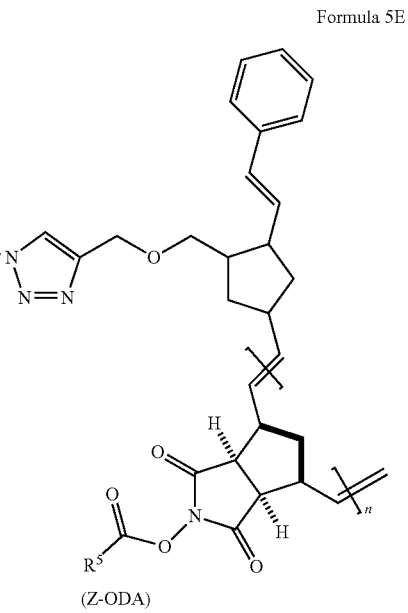
(Z-ODA)

Formula 5F
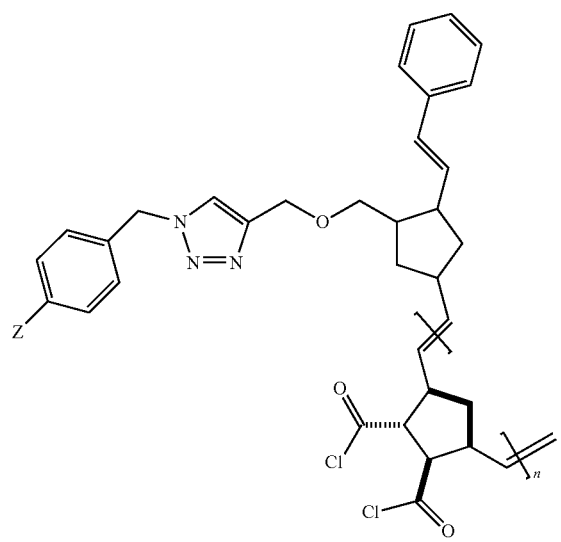
(Z-OBAC)
Formula 5G
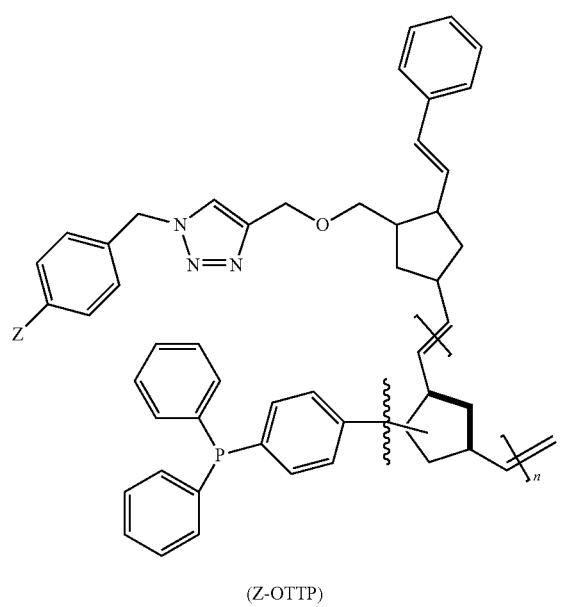
(Z-OTTP)
Formula 5H
(Z-OPy)
Formula 5I
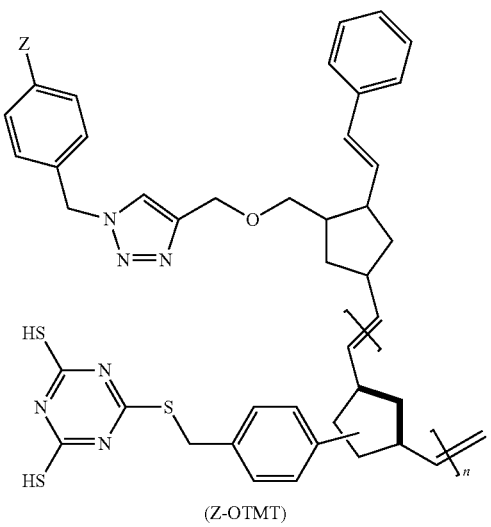
(Z-OTMT)
Formula 5J
(Z-MAm)

Formula 5K
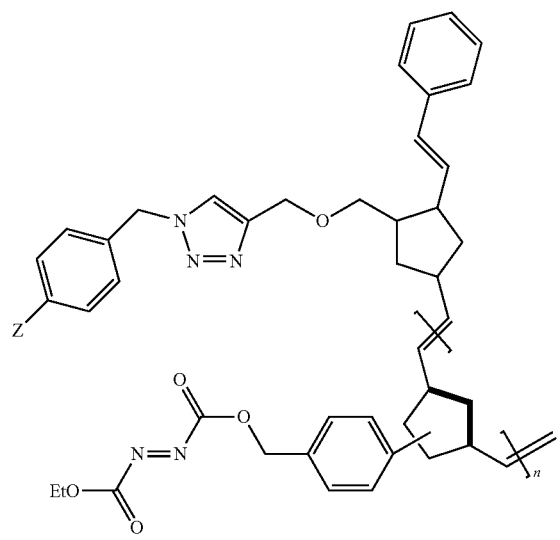
(Z-OBEAD)
Formula 5M
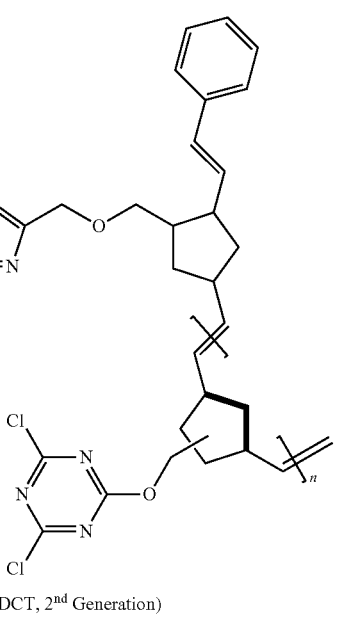
(Z-ODCT, 2nd Generation)
Formula 5L
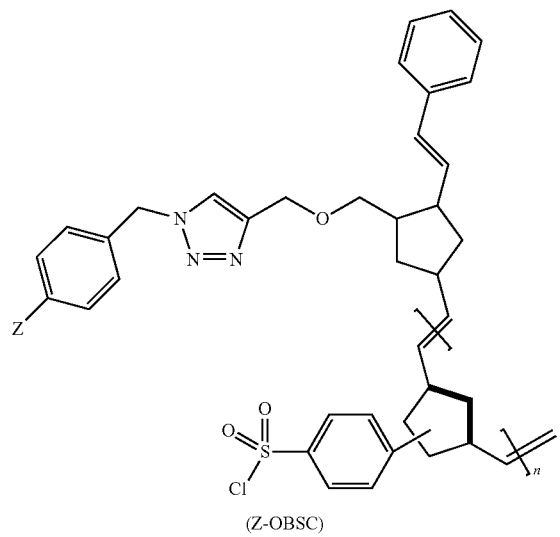
(Z-OBSC)
Formula 5N
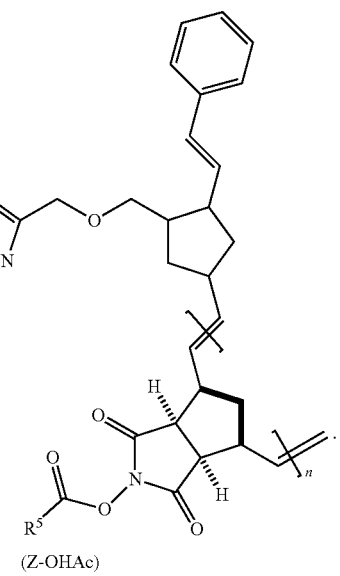
(Z-OHAc)
19. The method of claim 17, wherein the Z(Q) includes one of Formulae 6A-6K or derivative or salt thereof;

Formula 6A
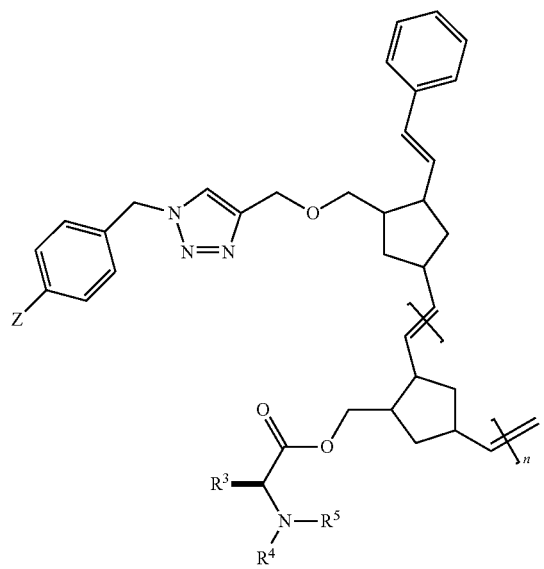
(Z-OAminoester Ligand)
Formula 6B
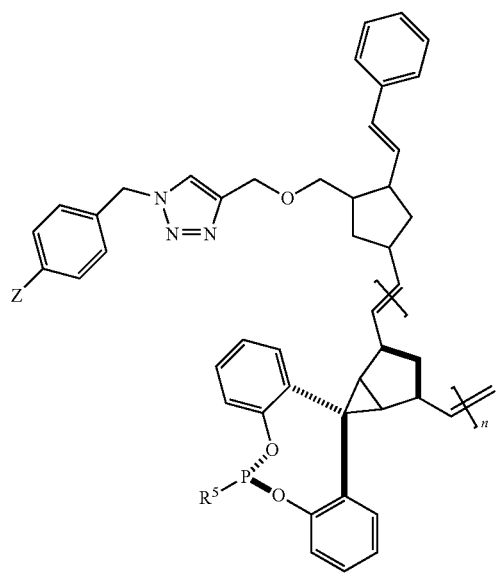
(Z-OBiphenol Phosphine Ligand)
Formula 6C
(Z-OBiphenylbisphosphine Ligand)
Formula 6D
(Z-OCyclopentadienyl Ligand)

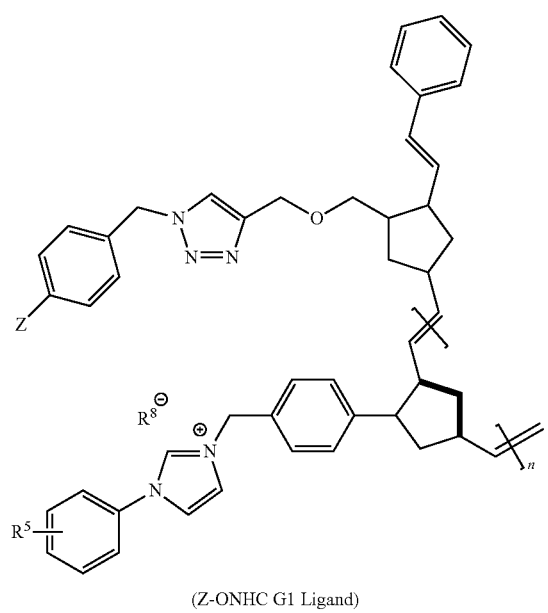
(Z-ONHC G1 Ligand)
Formula 6E
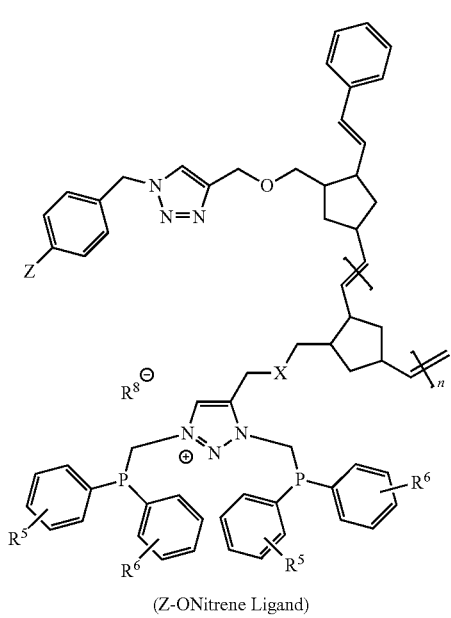
(Z-ONitrene Ligand)
Formula 6G
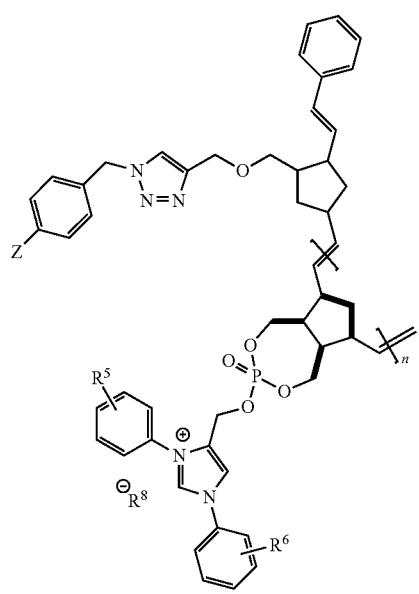
Formula 6F (Z-ONHC G2 Ligand)
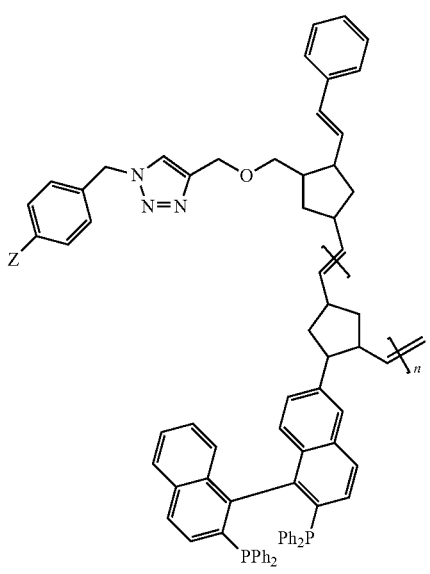
(Z-OBINAP G1 Ligand)
Formula 6H 101
-continued Formula 6I

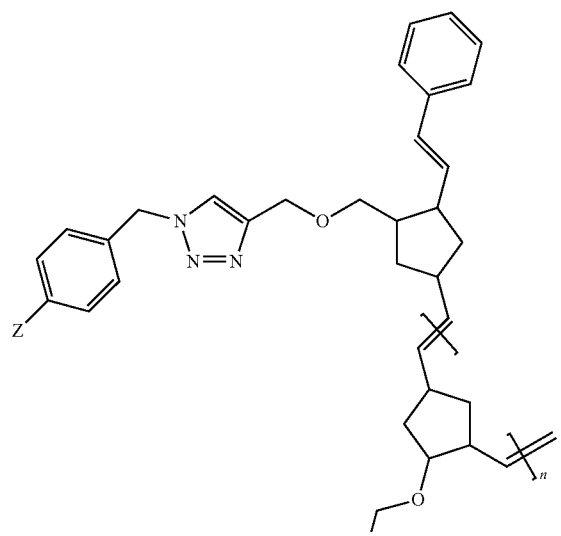

(Z-OBINAP G2 Ligand)

Formula 6J

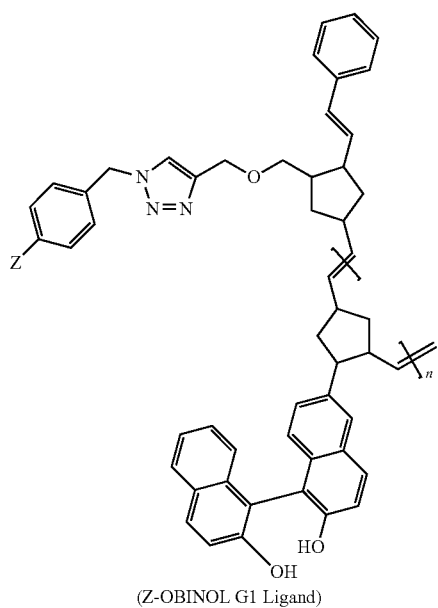

(Z-OBINOL G1 Ligand)

102
-continued

Formula 6K

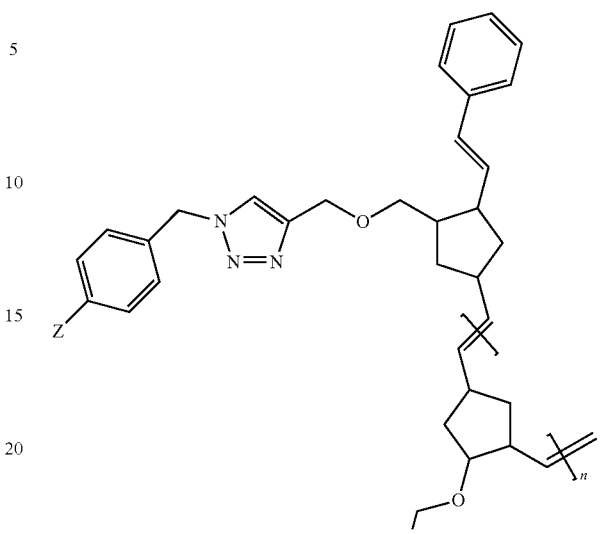

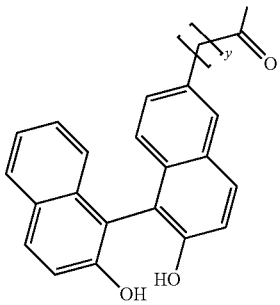

(Z-OBINOL G2 Ligand)

wherein y is an integer;

$R^3$ is an amino acid side group;

$R^4$, $R^5$, $R^6$, and $R^7$, are each independently as defined for $R^1$ and $R^2$; and $R^8$ is a negatively charged counter ion, wherein the polymeric backbone is saturated or unsaturated.

20. The method of claim 17, wherein the Z(Q) includes one of Formulae 7A-7H or derivative or salt thereof;

103
Formula 7A
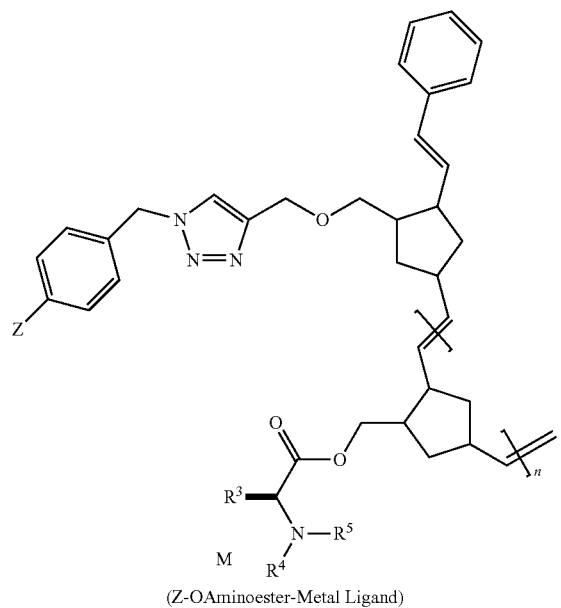
(Z-OAminoester-Metal Ligand)
Formula 7B
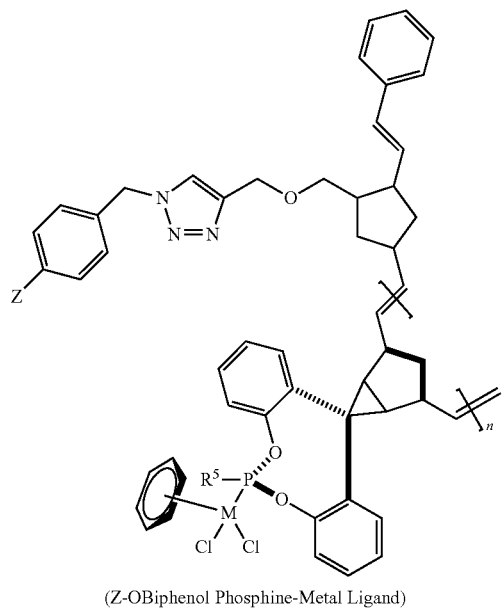
(Z-OBiphenol Phosphine-Metal Ligand)
104
-continued
Formula 7C
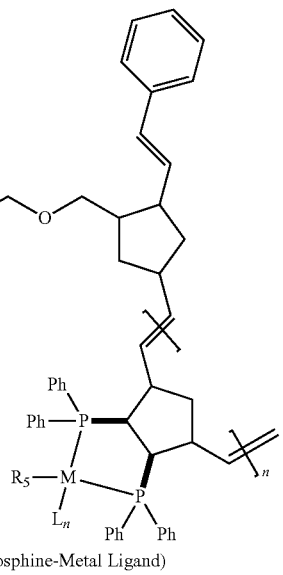
(Z-OBiphenolbisphosphine-Metal Ligand)
Formula 7D
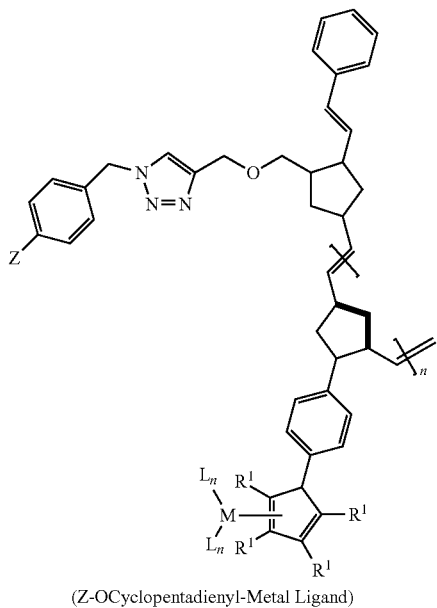
(Z-OCyclopentadienyl-Metal Ligand)

Formula 7E (Z-ONHC-Metal G1 Ligand)

Formula 7F (Z-ONHC-Metal G2 Ligand)

Formula 7G (Z-ONitrene-Metal Ligand)

Formula 7H (Z-OTPP-Metal Ligand)

wherein M is a metal bound to the functional group;

$R^3$ is an amino acid side group;

$R^4$, $R^5$, $R^6$, and Ln are each independently as defined for $R^1$ and $R^2$; and $R^8$ is a negatively charged counter ion, wherein the polymeric backbone is saturated or unsaturated.

21. The method of claim 17, wherein the Z(Q) includes one of Formulae 8A-8C or derivative or salt thereof;

Formula 8A
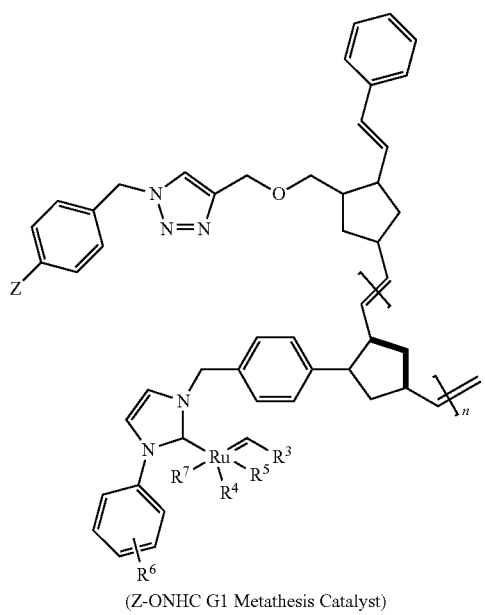
(Z-ONHC G1 Metathesis Catalyst)
Formula 8B
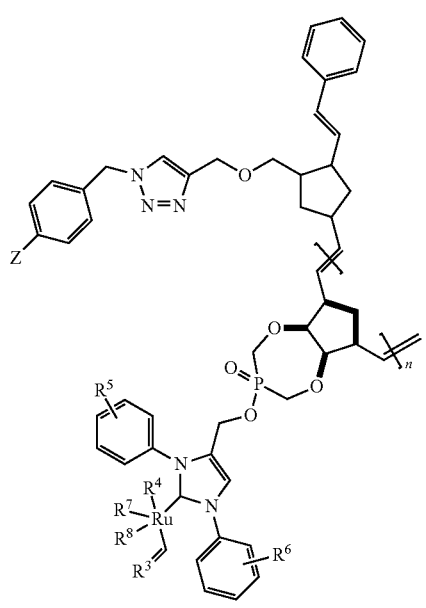
(Z-ONHC G2 Metathesis Catalyst)
Formula 8C
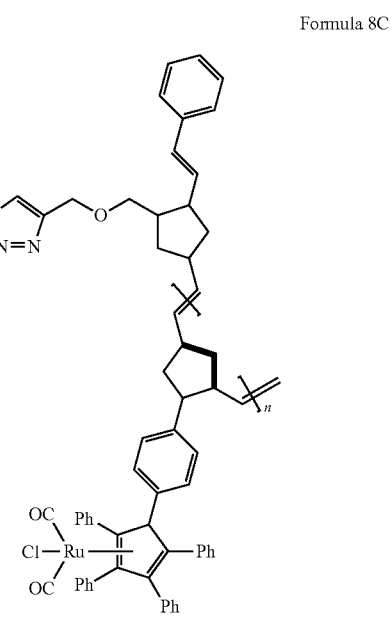
Formula 8C (Z-OCP—Ru Catalyst)
wherein $R^3$, $R^4$, $R^5$, $R^6$, $R^7$, and $R^8$ are each independently as defined herein for $R^1$ or $R^2$ or a phosphine or phosphite,
wherein the polymeric backbone is saturated or unsaturated.
* * * * *